US012432272B2

(12) United States Patent
Erez et al.

(10) Patent No.: US 12,432,272 B2
(45) Date of Patent: Sep. 30, 2025

(54) CROSS-NETWORK DIFFERENTIAL DETERMINATION

(71) Applicant: SYNCHRONY BANK, Stamford, CT (US)

(72) Inventors: Roy Erez, Los Altos, CA (US); Alex Sirota, Los Altos, CA (US); Gabriel Saunkeah, Berkeley, CA (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 18/482,529

(22) Filed: Oct. 6, 2023

(65) Prior Publication Data

US 2024/0098160 A1     Mar. 21, 2024

Related U.S. Application Data

(63) Continuation of application No. 17/821,198, filed on Aug. 22, 2022, now Pat. No. 11,838,382, which is a
(Continued)

(51) Int. Cl.
*G06F 3/0484*     (2022.01)
*G06F 16/248*     (2019.01)
(Continued)

(52) U.S. Cl.
CPC ........ *H04L 67/1097* (2013.01); *G06F 3/0484* (2013.01); *G06F 16/248* (2019.01); *G06F 16/3331* (2019.01); *G06F 16/3338* (2019.01); *H04L 1/0077* (2013.01); *H04L 41/0894* (2022.05); *H04L 41/22* (2013.01); *H04L 43/045* (2013.01); *H04L 61/2528* (2013.01);
(Continued)

(58) Field of Classification Search
CPC ...................................... G06F 3/0484
USPC .......................... 709/203; 715/224
See application file for complete search history.

(56) References Cited

U.S. PATENT DOCUMENTS 6,345,314 B1    2/2002   Cole et al.
7,555,444 B1 *   6/2009   Wilson ................... G06Q 30/02
                                               705/14.41
(Continued)

OTHER PUBLICATIONS

Office Action mailed Jun. 13, 2019 in U.S. Appl. No. 15/919,016.
(Continued)

*Primary Examiner* — Henry Orr
(74) *Attorney, Agent, or Firm* — Polsinelli LLP

(57) ABSTRACT

Provided are systems, methods, and computer-program products for a proxy network that can determine, for a set of objects, an initial differential, where the initial differential is determined using a rules data store of a host network. The proxy network can further determine a supplemental differential for the set of objects. The proxy network can further determine a final differential that is the sum of the initial differential and the supplemental differential. The proxy network can further determine a final sum for the set of objects that is the object value less the final differential. The proxy network can further generate an outbound data packet that includes values corresponding to the set of objects and the final sum. When the host network receives the outbound data packet, the host network can modify an object data store using the values corresponding to the set of objects and the final sum.

21 Claims, 37 Drawing Sheets

Related U.S. Application Data continuation of application No. 17/202,628, filed on Mar. 16, 2021, now Pat. No. 11,463,552, which is a continuation of application No. 15/919,016, filed on Mar. 12, 2018, now Pat. No. 10,985,967.

(60) Provisional application No. 62/470,097, filed on Mar. 10, 2017.

(51) Int. Cl.
| | |
|---|---|
| G06F 16/3331 | (2025.01) |
| G06F 16/3332 | (2025.01) |
| H04L 1/00 | (2006.01) |
| H04L 41/0894 | (2022.01) |
| H04L 41/22 | (2022.01) |
| H04L 43/045 | (2022.01) |
| H04L 61/2521 | (2022.01) |
| H04L 61/5076 | (2022.01) |
| H04L 67/1097 | (2022.01) |
| H04L 67/56 | (2022.01) |
| H04L 67/561 | (2022.01) |
| H04L 67/564 | (2022.01) |
| H04L 67/5682 | (2022.01) |
| H04L 67/2866 | (2022.01) |

(52) U.S. Cl.
CPC .......... *H04L 61/5076* (2022.05); *H04L 67/56* (2022.05); *H04L 67/561* (2022.05); *H04L 67/564* (2022.05); *H04L 67/5682* (2022.05); H04L 67/2866 (2013.01)

(56) References Cited

U.S. PATENT DOCUMENTS

| | | | |
|---|---|---|---|
| 8,060,596 | B1 | 11/2011 | Wootton et al. |
| 9,613,152 | B2 | 4/2017 | Kucera |
| 9,754,098 | B2 | 9/2017 | Li et al. |
| 10,169,815 | B2 | 1/2019 | Buck |
| 10,685,133 | B1 | 6/2020 | Patel |
| 11,244,376 | B1 * | 2/2022 | Van Thomme .... G06Q 30/0633 |
| 2001/0032239 | A1 | 10/2001 | Sashino et al. |
| 2004/0054777 | A1 | 3/2004 | Ackaouy et al. |
| 2004/0249712 | A1 * | 12/2004 | Brown ............... G06Q 30/0217 |
| | | | 705/14.19 |
| 2006/0161704 | A1 | 7/2006 | Nystad et al. |
| 2007/0250621 | A1 | 10/2007 | Hillier |
| 2009/0106085 | A1 * | 4/2009 | Raimbeault ........... G06Q 50/01 |
| | | | 705/14.23 |
| 2009/0216973 | A1 | 8/2009 | Nakajima et al. |
| 2010/0318524 | A1 | 12/2010 | Horstmanshof et al. |
| 2011/0196839 | A1 | 8/2011 | Smith et al. |
| 2011/0252085 | A1 | 10/2011 | Mase et al. |
| 2012/0011165 | A1 | 1/2012 | Coker |
| 2012/0060100 | A1 | 3/2012 | Sherwood et al. |
| 2012/0096072 | A1 | 4/2012 | So et al. |
| 2012/0158831 | A1 | 6/2012 | Beaver et al. |
| 2013/0117151 | A1 * | 5/2013 | Macaisa ............ G06Q 30/0633 |
| | | | 705/26.8 |
| 2013/0159395 | A1 | 6/2013 | Backholm et al. |
| 2013/0238465 | A1 * | 9/2013 | Calixte-Civil ......... G06Q 30/02 |
| | | | 705/26.41 |
| 2013/0304639 | A1 | 11/2013 | Acsay et al. |
| 2014/0074690 | A1 | 3/2014 | Grossman et al. |
| 2014/0101443 | A1 | 4/2014 | Park et al. |
| 2014/0316937 | A1 | 10/2014 | Jiao et al. |
| 2015/0058324 | A1 * | 2/2015 | Kauwe ................ G06F 16/9535 |
| | | | 707/722 |
| 2015/0121179 | A1 | 4/2015 | Saund et al. |
| 2015/0121305 | A1 | 4/2015 | Saund et al. |
| 2015/0309719 | A1 | 10/2015 | Ma et al. |
| 2015/0363481 | A1 | 12/2015 | Haynes |
| 2017/0097621 | A1 | 4/2017 | Ackmann et al. |
| 2017/0124094 | A1 | 5/2017 | Langseth et al. |
| 2017/0295151 | A1 | 10/2017 | Aldis et al. |
| 2018/0088804 | A1 | 3/2018 | Mummidi et al. |
| 2018/0096053 | A1 | 4/2018 | Panwar et al. |
| 2018/0157629 | A1 | 6/2018 | Tuli |
| 2018/0211288 | A1 * | 7/2018 | Sawdy ............... G06Q 30/0219 |
| 2018/0217886 | A1 | 8/2018 | Lahman et al. |
| 2018/0247229 | A1 * | 8/2018 | Thanh-Tam Lam ... G06Q 10/02 |
| 2022/0342760 | A1 | 10/2022 | Resch et al. |

OTHER PUBLICATIONS

Office Action mailed Oct. 9, 2019 in U.S. Appl. No. 15/919,016.
Office Action mailed Jun. 30, 2020 in U.S. Appl. No. 15/919,016.
Notice of Allowance mailed Dec. 17, 2020 in U.S. Appl. No. 15/919,016.
Office Action mailed Feb. 4, 2022 in U.S. Appl. No. 17/202,628.
Notice of Allowance mailed Jun. 2, 2022 in U.S. Appl. No. 17/202,628.
Notice of Allowance mailed Jul. 11, 2023 in U.S. Appl. No. 17/821,198.

\* cited by examiner

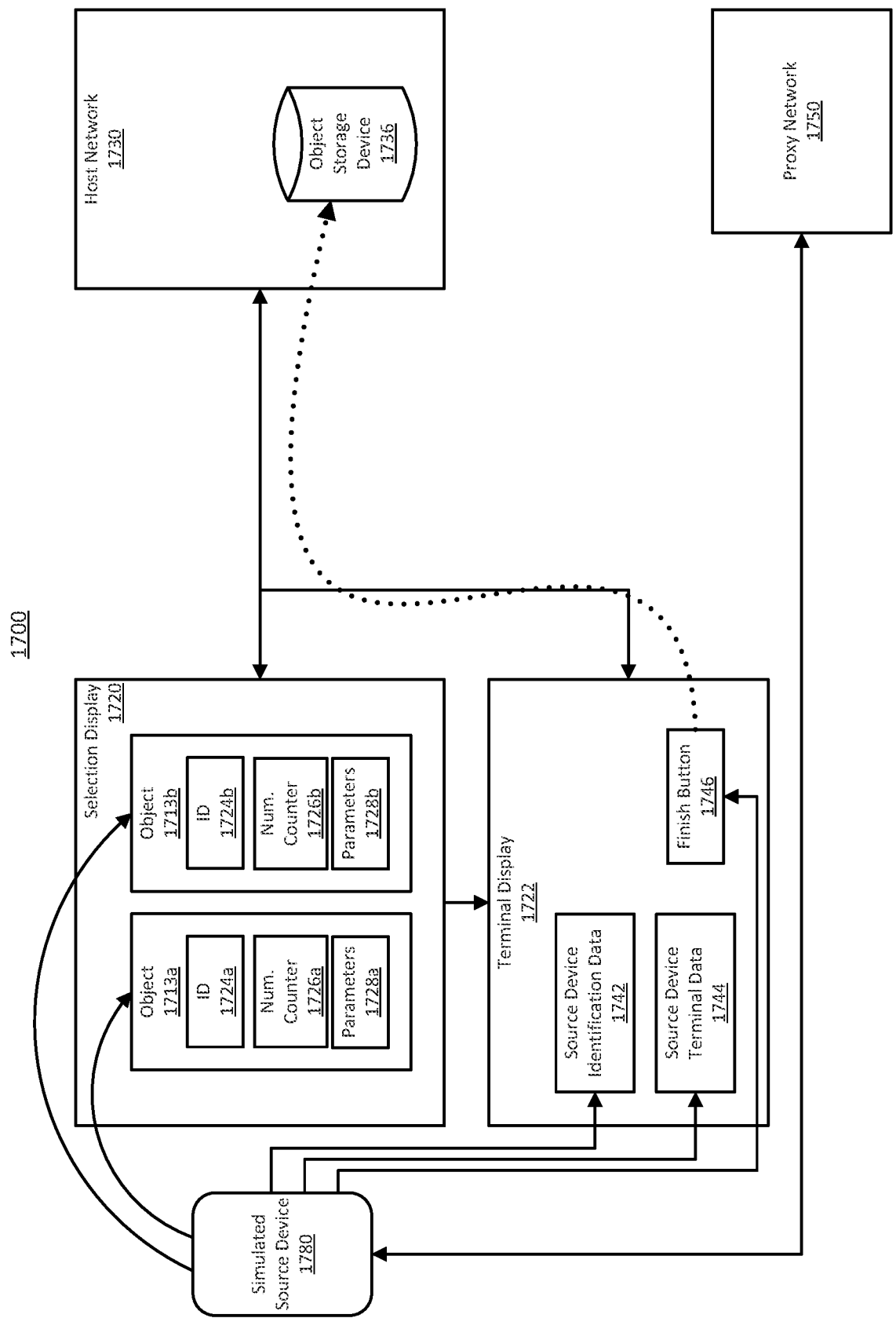

CROSS-NETWORK DIFFERENTIAL DETERMINATION

CROSS-REFERENCE TO RELATED APPLICATION

The present application is a continuation of U.S. patent application Ser. No. 17/821,198 filed Aug. 22, 2022, which is a continuation of U.S. patent application Ser. No. 17/202,628 filed Mar. 16, 2021, now U.S. Pat. No. 11,463,552, which is a continuation of U.S. patent application Ser. No. 15/919,016, filed on Mar. 12, 2018, now U.S. Pat. No. 10,985,967, which claims the benefit of U.S. Provisional Application 62/470,097, filed on Mar. 10, 2017, which are incorporated herein by reference in their entireties.

FIELD

This application relates to updating a storage device in a network, particularly to controlling the updating of the storage device by another network.

BRIEF SUMMARY

A host of objects can cause source devices (e.g., users) to update objects in an object storage device (e.g., database) operated by the host, for example to have the updated object transferred to a source device. The host, however, may not have the hardware and or software infrastructure that can cause one source device to initiate an update of an object and another source device to finish the update. An update of this nature, involving more than one source device, can occur when an instantiating source device wants to transfer an object to another source device, but may not know which object parameters to select so that the object meets the other source device's requirements. Additionally, the instantiating source device may have incomplete information for the other source device (e.g., the instantiating source device may lack a destination to which to transfer the object). Moreover, the instantiating source device may want to be responsible for a terminal result (e.g., sum) that may need to be transferred to the host in order for the update of the object to occur.

In some implementations, provided are systems, methods, and computer-program products for suspended storage device updates. A suspended storage device update can cause an instantiating source device to select an object set, from which a terminating source device can select an object. The terminating source device can also provide any information that may be needed to finish an update of the selected object, information which the instantiating source device may not have.

BRIEF DESCRIPTION OF THE DRAWINGS

Illustrative examples are described in detail below with reference to the following figures:

FIGS. 17A-17B illustrate an example of a system that can be implemented by an proxy network for interfacing with a host network.

DETAILED DESCRIPTION

Figure 1A:
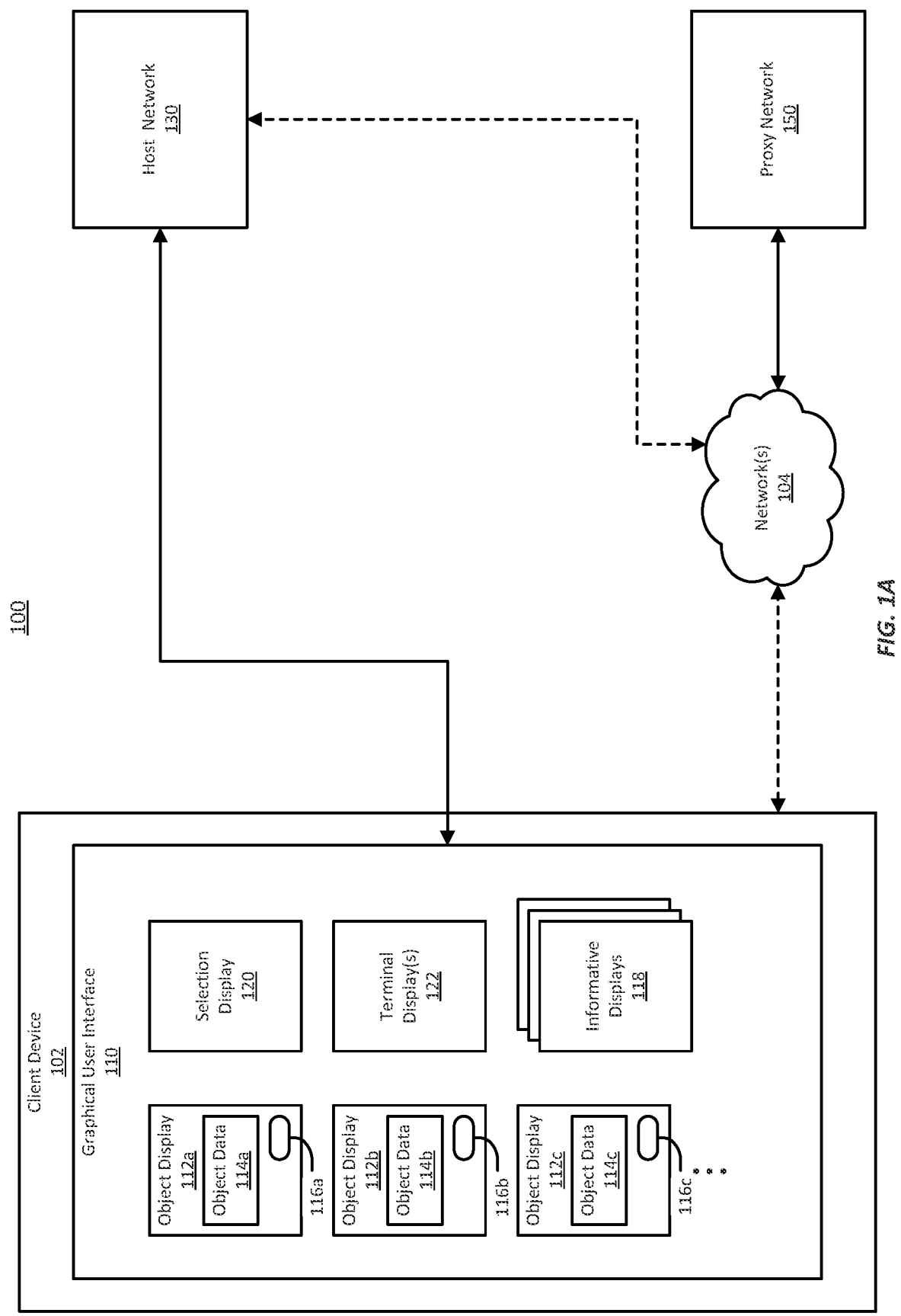
FIGS. 1A-1C illustrate an example of a system in which a host can cause a source device to affect modifications to an object storage device, and cause objects from the storage device to be transmitted to the same source device or another source device.

A host of objects can cause source devices to update objects in an object storage device operated by the host, for example to have the updated object transferred to a source device. The host can, for example, provide a graphical user interface, such as a website, that can cause source device to view objects provided by the host. The graphical user interface can include displays for object categories, object types, and objects. These displays can cause source devices to specify parameters for an object, and thereby specify a particular object. The graphical user interface can further include a selection display, in which a source device can view objects selected by the source device, as well as the parameters the source device selected for each object. The graphical user interface can further include a terminal display, through which a host can provide terminal information, such as a destination address to which the host can transmit the selected objects, and a counter transfer source, from which the host can transfer an equivalent of a terminal result for the selected objects.

Hosts of objects, however, may not have the hardware and or software infrastructure that can cause one source device to initiate an update of an object and another source device to finish the update. An update of this nature, involving more than one source device, can occur when an instantiating source device wants to transfer an object to another source device. The instantiating source device may desire that the other source device be aware of the transmission until the object is received. The instantiating source device might also not know which object parameters to select so that the object meets the other source device's requirements. Additionally, the instantiating source device may have incomplete information for the other source device (e.g., the instantiating source device may lack a destination to which to transmit the object). Moreover, the instantiating source device may want to be responsible for a terminal result that may need to be transferred to the host in order for the update of the object to occur.

In some implementations, provided are systems, methods, and computer-program products for suspended storage device updates. A suspended storage device update can cause an instantiating source device to select an object set, where at least some possible parameters are left unspecified. The object set can, thus include the set of particular objects that correspond to all the possible values for the unspecified parameters. The suspended storage device update can further be initiated without some terminal details, such as a destination address to which objects are to be transmitted. A terminating source device, after the suspended storage device update is initiated, can select an object from the object set, or can select an entirely different object, or can choose to cancel the suspended storage device update. When the terminating source device chooses to continue with the suspended storage device update, the terminating source device can also provide any information that may be needed to finish an update of the selected object, information which the instantiating source device may not have.

On some occasions, a proxy network may be configured to apply rules to certain objects from the host network. For example, the proxy network can be configured to apply a set of rules during certain months of the year, which can modify the sum required to update an object with the host network. In this example, the rules may not be enabled when a user updates the object directly with the host network. In some examples, the user can enter a rule code to active a set of rules. In some examples, when the user interacts with the proxy network, the proxy network can automatically determine rules that may apply.

In order for the proxy network to enable rules maintained by the host network, various barriers need to be overcome. For example, the proxy network may have limited access to data from the host network, including rule data. The proxy network may thus need mechanisms for communicating between the proxy network and the host network to obtain and validate rules. As another example, a second user may complete an object update initiated by a first user days or weeks after the first used initiated the object update. In this example, the host network's rules may have changed, and/or may no longer be valid. In this example, the proxy network may need mechanisms for determining other rules that can be implied instead.

In some cases, it may be desirable to configure the proxy network to have rules that can be applied to objects from the host network, in addition to any rules determined by the host network. Rules configured for the proxy network can, for example, be specified for particular host networks, for particular time frames, for particular users or groups of users, for particular organizations, and so on. To apply rules configured for the proxy network, the proxy network may need mechanisms for determining which rules may apply, and for applying the rules to objects.

In various implementations, provided are methods for a proxy network that can include various engines for communicating between the proxy network and the host network in order to apply rules to an object of the host network. In various implementations, the proxy network can include a rules processing engine. The rules processing engine can be configured to determine rules from a host network that may apply to a set of objects selected by a first user. For example, the rules processing engine may be able to automatically identify rules from a graphical interface of the host network. In various implementations, the rules process engine can also be configured to determine the validity of a set of rules. For example, the rules processing engine can automatically input a rule code in the graphical user interface of the host network. Alternatively or additionally, in other examples, the rules processing engine can find and automatically parse rules from data displayed in the graphical user interface. In various implementations, the rules processing engine may also use an Application Programmers Interface (API) provided by the host network, which may provide access to rules data.

In various implementations, a proxy network can also include a completion engine for applying rules and computing differentials when an object updated is completed. For example, the completion engine can be configured to determine a final sum needed to complete the object update. The completion engine can further be configured to automatically complete the update with the host network.

Figure 1B:
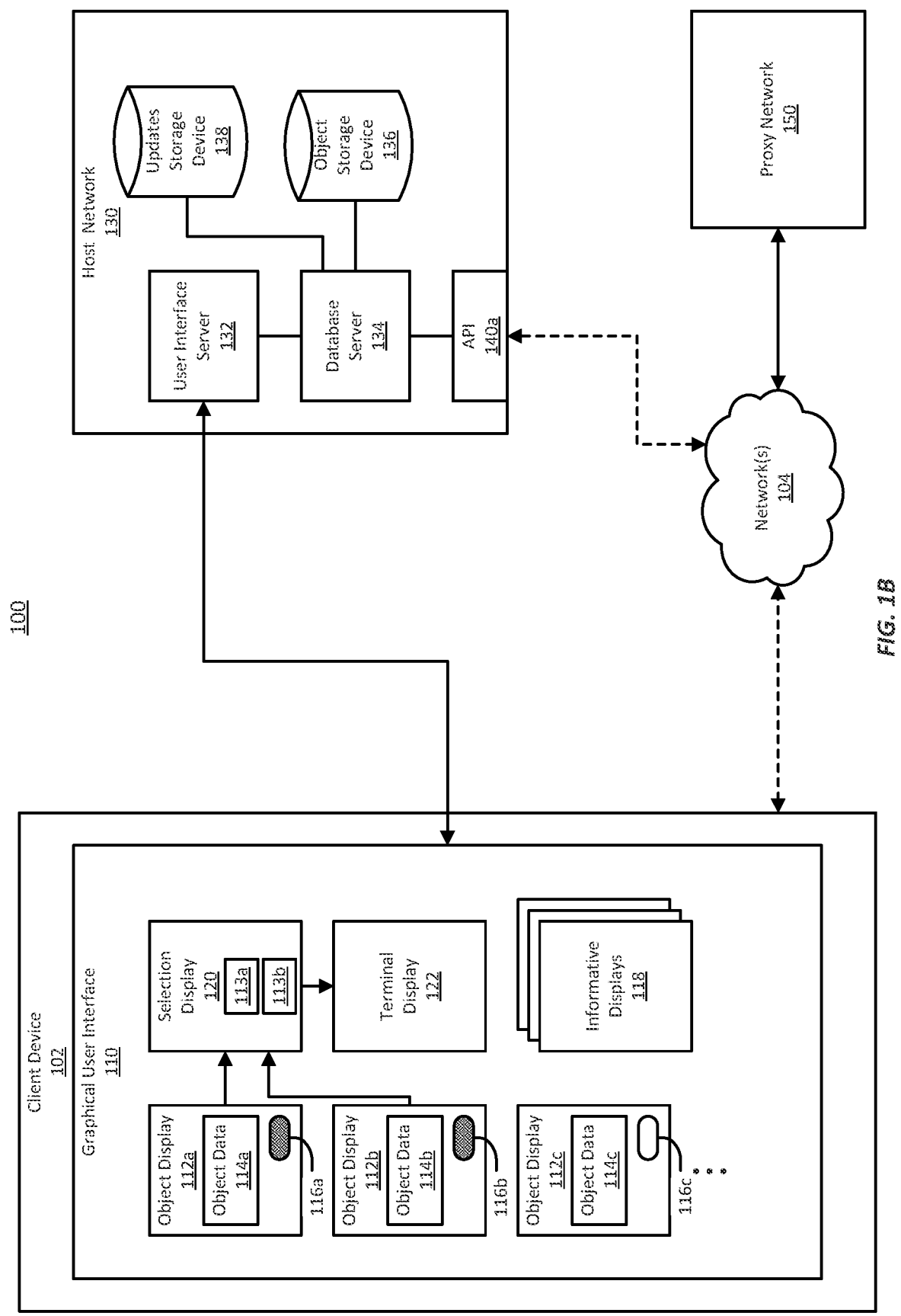
Figure 1C:
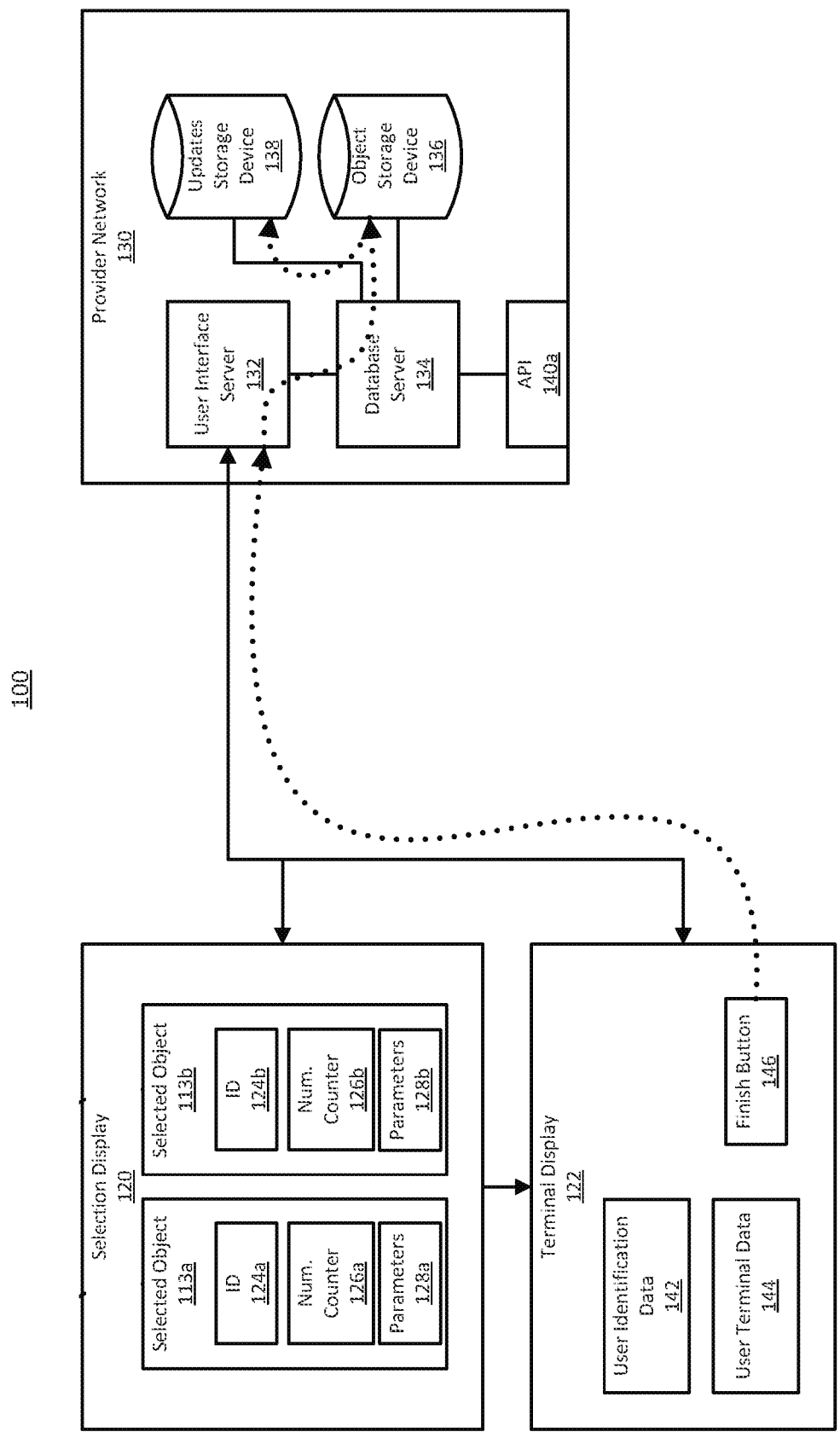

FIGS. 1A-1C illustrate an example of a system 100 in which a host can cause a source device to affect modifications to an object storage device, and cause objects from the storage device to be transmitted to the same source device or another source device. As illustrated in FIG. 1A, the example system 100 includes a host network 130, which is a network is controlled and/or controlled by a host. The host network 130 can include computing systems configured to generate a graphical user interface 110 on a client device 102. In some implementations, the example system 100 can also include an proxy network 150 that is able to communicate with the client device 102 and/or the host network 130 over some other networks 104.

As discussed herein, a host is a producer and/or distributor of objects. The objects can be physical objects, intangible objects such as pecuniary values or intellectual property, and/or services. The host may maintain the host network 130 so that source devices can obtain the objects produced and/or distributed by the host. To cause source devices to obtain objects, computing systems in the host network 130 can be configured to provide a graphical user interface 110. Providing the graphical user interface 110 can include, among other things, storing and maintaining data corresponding to, for example, the structure of the graphical user interface 110 and/or the elements that compose the graphical user interface 110. Providing the graphical user interface can further include transmission of this data to the client device 102, which can use the data to generate the graphical user interface 110 on a display device of the client device 102.

Using the graphical user interface 110, a source device can view and select objects from the host's storage device. The source device can then initiate transmission of the objects from the host to same source device and/or to a different source device. In many cases, and as discussed further below, host network 130 is a closed network, meaning that access to the computing systems and data within the host network 130 may be restricted and/or tightly controlled. For example, the host may cause limited and controlled access to the host network 130 through the graphical user interface 110. In some implementations, the host network 130 may additionally cause limited access using other methods, such as for example by providing Application Program Interfaces (APIs) that includes functions for manipulating the host's storage device. In some implementations, the host's storage device may be referred to as a remote storage device, because the host's storage device is physically, geographically, or logically (in terms of network location) remote from the client device 102.

The graphical user interface 110 can accessed using the client device 102. The example client device 102 can be a computing system capable of providing an graphical display. Examples of such devices include desktop computers, laptop computers, handheld computers, personal digital assistants, smart phones, tablet computers, intelligent personal assistants, terminals, kiosks, televisions, gaming systems, entertainments systems, smart home assistants, and so on. Client devices can also include appliances, such as refrigerators, home security systems, automobiles, and any other device that includes a screen and an input mechanism (e.g., a keyboard, mouse, touchscreen, or other input device). In some implementations, the example client device 102 can be located within the host network 130, such as for example within a firewall or similar security perimeter of the host network 130. In some implementations, the example client device 102 can be located outside of the host network 130, and can communicate with the host network 130 over some private and/or public networks, which can include the Internet. One example of a graphical user interface is a website.

The graphical user interface 110 can include one or more object displays 112a-112c, where each object display 112a-112c illustrates and/or describes one or more of the host's objects. An object display can illustrate and/or describes a type of object or object type, rather than one particular object. An object type describes objects that have a common set of parameters, some of which can be fixed and some of which can be variable. For example, an object type "shirt" can include a fixed parameter called "style" and variable parameters called "size" and "color." In this example, the "shirt" object type can include all sizes and colors that have the same style. As used herein, an object type thus has at least one variable parameter, and describes multiple objects where each object corresponds to a particular combination of fixed and/or variable parameters. Conversely, an object can have the same fixed parameters as an object type, but has a particular value for each variable parameter.

An object display 112a-112c for an object type can illustrate the fixed and/or variable parameters in an object data 114a-114c area. In some implementations, the object data 114a-114c area can include graphical elements source devices can use to select parameters, such as check boxes, radio buttons, and/or drop-down lists. The object data 114a-114c can further include other information related to an object or object type, such as a description, specifications, related objects, and a numerical counter, among other examples.

Using graphical elements in the object data 114a-114c area, a source device can select values for any variable parameters (e.g., size small and the color red). In many cases, the source device can select from only limited set of values for a parameter (e.g. one of size small, medium, or large). By selecting values for the variable parameters (e.g., size small and the color red), the source device can reduce an object type to a particular object from among the possible objects that can be described by the object type.

In some implementations, the object displays 112a-112c can also include other graphical elements, such as buttons 116a-116c. In some implementations, a button 116a-116c in each object display 112a-112c can be configured such that, when activated, the button 116a-116c causes the object specified by the source device (e.g., an object with specified parameters) to be selected. As discussed further below, selecting an object using a particular object display 112a-112c indicates that a source device wants to affect an update of the selected object in host's object storage device, and have the selected object be transmitted. In some implementations, the object displays 112a-112c may be configured so that an object cannot be selected until the source device specifies parameter values for any fixed and/or variable parameters.

In some implementations, the graphical user interface 110 can include a selection display 120, through which a source device can view the objects that have been selected. The selection display 120 can provide a list or array of the selected objects, and may illustrate the parameters that define each selected object. The selection display 120 can further include a summary of the selected objects, such as for example a summation of numerical counters associated with each selected object. In some implementations, a source device can use the selection display 120 to modify the parameters for a selected object (e.g. change a "size" parameter from "medium" to "small". Doing so causes a different object to be selected. In some implementations, the selection display 120 can include buttons or other graphical elements that cause a source device to un-select an object, which may cause the object to be removed from the selection display. Once the source device is satisfied with the selected objects, the source device can initiate and finish an update of the host's object storage device.

In cause a source device to initiate an update of the host's object storage device, the graphical user interface 110 can include one or more terminal displays 122. Using the terminal displays 122, the source device can enter information for finalizing the storage device update. Such information can include, for example, the source device's identification data (e.g., a name and address), a destination for the selected objects (e.g., an address), and terminal data, as discussed further below. One of the terminal displays 122 can include a button or other graphical element that, when activated by the source device, initiates the storage device update. In some implementations, the terminal display 122 and the selection display 120 can be combined into a single display, or can be subdivided into sub-displays.

In some implementations, the graphical user interface 110 can further include some informative displays 118. The host can use the informative displays 118 to provide information to a source device, such as information about the host, the host's policies regarding storage device updates or other communications with the host, contact information for the host, terms of use for the graphical user interface 110, legal information, and so on. In some implementations, the informative displays 118 may include temporary information and/or information that is updated frequently. For example, the information displays 118 can include information about differentials that can be applied to the numerical counter for certain designated objects. In this example, rules may apply to the differentials. Such rules can include, for example, a time period or duration during which the differentials are valid, as well the objects, object types, or other sets of objects to which the differentials apply, among other things. These rules can be included in an informative display 118.

In some implementations, the host network 130 can provide the graphical user interface 110 simultaneously to multiple client devices. Source devices operating different client devices can thus view and select objects in the host's storage device at the same time. In some implementations, updates to the object storage device from different client devices can be serialized to avoid conflicting updates. For example, should two source devices select the same object and initiate a storage device update at about the same time, whichever update reaches the object storage device first will, in most cases, be serviced first. In this example, when there is as single available quantity of the selected object, the source device whose initiation reaches the object storage device second may be informed (e.g., through the graphical user interface 110) that the selected object is no longer available, and/or may be provided with a selection of alternate objects.

In some implementations, the proxy network 150 may be able to communicate with the example client device 102 to affect changes in the host's graphical user interface 110. In some implementations, the proxy network 150 is a distinct network from the host network 130, meaning that the proxy network 150 is controlled by an entity other than the host, or that the proxy network 150 does not share and has a different security perimeter than the host network 130, or that the proxy network 150 does not share hardware and/or software resources with the host network 130, or some combination of these factors. Stated another way, the proxy network 150 may not have free access to the hardware and data resources of the host network 130. The host network 130 may have an API through which the proxy network 150 can access the host network 130, where the API limits or controls the degree to which the proxy network 150 can access the host network 130. The proxy network 150 may be able to access such an API over other networks 104. Alternatively or additionally, the proxy network 150 may be able to access the host network 130 through the graphical user interface 110, in a similar fashion as would a source device affecting changes to the host's storage device, for example.

The other networks 104 of this example can include private and/or public networks that are controlled by neither the host nor the proxy network 150. For example, the networks 104 can include the public Internet. In some implementations, the networks 104 can include a public network controlled by the host, but that is isolated (e.g. has distinct hardware and software, has a distinct IP address space, has a separate security perimeter, etc.) from the host network 130.

FIG. 1B illustrates in greater detail an example of the host network 130. FIG. 1B also illustrates an example of a source device's communication with the graphical user interface 110. In the illustrated example, the host network 130 includes a source device interface server 132 and a storage device server 134. The storage device server 134 may control one or more storage devices, including, in the illustrated example, an object storage device 136 and an updates storage device 138. In some implementations, the operations of the source device interface server 132 and the storage device server 134 can be implemented in a single physical device (e.g., a server computer) or in a combination of physical devices (e.g., a server farm). In some implementations, the host network 130 can also include an API 140a that provides access to the storage devices 136, 138, possibly by way of the storage device server 134, as an example. The host network 130 can include other hardware, software, data, APIs, and/or systems that are not illustrated here.

The object storage device 136 can store information about the objects that the host provides. For example, the object storage device 136 can include an entry for each of the host's objects, possibly including both objects that are currently available and objects which the host does not presently have available. A storage device entry for an object can include the specific parameters for the object (e.g., a size, a color, a numerical counter, and/or other parameters) and information about the object (e.g., a description). In some implementations, each object can also be associated with an identifier, where the identifier is associated with the specific combination of parameters that describe the object. In some cases, multiples of the same object may be available, each of which can be described by the same identifier. In these cases, an entry for an object can include a value indicating the quantity that is available. In some cases, the quantity can be zero to indicate that the object is currently not available. At some times and for some reasons, the host can remove objects from the object storage device 136, can add new objects, can change existing objects, can increase the quantity of a particular object, or make any other changes to the object storage device 136. Changes to the object storage device 136 can by the host, or by authorized agents of the host.

The object storage device 136 can further associate each object with an object type. As noted above, an object type can encompass objects that have one or more common parameters (e.g. all squares of style type "A" that have a particular numerical counter) and one or more variable parameters (e.g., size and color). An object type can encompass multiple different object identifiers. For example, squares of style type "A" may include three sizes and four colors. In this example, the object type of all squares of style type "A" can encompass twelve different identifiers, one for each combination of sizes and colors.

In some cases, the object storage device 136 can further include object classifications, where a classification groups together different object types and/or other classifications. For example, the object storage device 136 can include a classification for all "squares," which can include squares of style type "A" and squares of style type "B" of any color and size. As a further example, the object storage device can include a classification for "circles" that includes all brown circles and all blue circles of any size. For the preceding examples, object storage device can further include a classification "shapes" that includes the "squares" classification and the "circles" classification. In this and other examples, the "squares" and "circles" classifications can be referred to as sub-classifications.

In some implementations, the source device interface server 132 can communicate with the storage device server 134 to obtain current information about the contents of the object storage device 136, and use this information to generate the graphical user interface 110. The source device interface server 132 can include hardware and software systems configured to output, control, and receive input from the graphical user interface 110. For example, the source device interface server 132 can include pre-generated and/or dynamic graphical elements, pre-generated and/or dynamically generated text, display templates, and/or code for arranging graphical elements and/or text into the displays of the graphical user interface 110. As a further example, the object storage device 136 can include graphics and/or text for each object, for object types, and/or for object classifications, which the source device interface server 132 can statically or dynamically add to the graphical user interface 110. As another example, the source device interface server 132 can include hardware and/or software that respond to source device input to the graphical user interface 110 and modify the graphical user interface 110 accordingly. One example of a source device interface server is a web hosting server.

In some implementations, the source device interface server 132 can obtain information about objects in the object storage device 136 through the storage device server 134, and present this information using displays viewable using the graphical user interface 110. For example, the source device interface server 132 can use information from the object storage device 136 to determine a selection of object types to display. In this example, the source device interface server 132 can generate an object display 112a-112c for each selected object type. The object storage device 136 can further provide object data 114a-114c to display in the object displays 112a-112c, including, for example, any fixed or variable parameters. In some implementations, the source device interface server 132 can generate an object display 112a-112c for an object type for which some or all the objects described by the object type are not presently available. In these implementations, the object display 112a-112c can indicate which objects are not available, for example by indicating a quantity of zero for a particular object.

In some implementations, the source device interface server 132 can present information about objects in the object storage device 136 in different ways. For example, the source device interface server 132 can generate a display (not illustrated here) for a particular classification. A classification display can display the sub-classifications and/or object types encompassed by the classification. As another example, the source device interface server 132 can generate a display (not illustrated here) that highlights particular classifications, object types, and/or objects. Highlights, in this context, means that the classification, object type, and/or object is displayed in a prominent fashion, or using graphical elements meant to draw the source device's attention. In some implementations, the graphical user interface 110 can include multi-media displays. For example, an object display 112a-112c can include video, audio, and/or virtual reality.

Generally, the displays provided by the graphical user interface 110 are accessible by source devices. For example, when presented with a display for a classification, the source device can select a sub-classification or an object type. In this example, the source device interface server 132 can update the graphical user interface 110 to present the source device with an array or list of additional sub-classifications and/or object displays 112a-112c, or a particular object display (e.g., a first object display 112a). The source device can then communicate with the updated graphical user interface 110, and cause the graphical user interface 110 to again be modified.

In one example, the source device can navigate the graphical user interface 110 until the graphical user interface 110 displays a particular object display 112a. As noted above, object display 112a can illustrate a particular object type. In this example, the source device can use the object data 114a presentation to select specific parameters, and reduce the object type to a particular object. As noted above, a particular object has a defined set of parameters (e.g., a size, a shape, a color, a style, a numerical counter, or some other parameters). Once the source device has specified any fixed and/or variable parameters, the source device can select a selection button 116a, which can cause the object specified by parameters to be added as a selected object 113a to the selection display 120.

In most cases, hosts configure a graphical user interface, such as the illustrated graphical user interface 110, so that only objects can be selected for storage device update. This means that, until a source device, using an object display 112a-112c, selects values for any variable parameters, the selection button 116a may be disabled. This is because the host network 130 may be configured to update the object storage device 136 only for particular objects, and not for object types or classifications. For example, the storage device server 134 may require an object identifier when an update is initiated through the graphical user interface 110, and, as noted above, an object type may encompass multiple identifiers. Additionally, because, in some implementations, an update of the object storage device 136 can result in the selected objects 113a-113b being transmitted, the host network 130 would need to determine which objects to transmit. In most cases, a source device would not want for all objects defined by an object type to be transmitted.

There may be times, however, when a source device may want to affect an update without specifying the parameters that can reduce an object type to a particular object, so that the source device can specify the parameters later or so that another source device can specify the parameters. In these instances, and as discussed further below, the proxy network 150 cause suspended updates of the host's object storage device 136.

Once a source device has selected one or more objects, including specifying any parameters that define the objects, the source device can view the selected objects 113a-113b in the selection display 120. From the selection display 120, the source device may be able to make changes, including removing selected objects 113a-113b and/or changing the parameters for the selected objects 113a-113b (which, as noted above, changes the selected objects 113a-113b to different objects). To add additional objects, the source device can return to the object displays 112a-112c.

Once the source device is satisfied with the selected objects 113a-113b, the source device can enter the terminal display 122. For example, the source device can activate a button (not illustrated here) that indicates the source device is ready to proceed to the terminal display 122. As discussed further below, using the terminal display 122 the source device can specify any information for effectuating the storage device update that may be required by the host. The source device can then initiate an update of the selected objects 113a-113b in the object storage device 136. In some cases, the update can result in the selected objects 113a-113b being transmitted to the source device or to a different source device.

In some implementations, the host network 130 can record and track storage device updates in the updates storage device 138. For example, the storage device server 134 can store an entry in the updates storage device 138 that records information about the source device's storage device update, including a listing of the selected objects 113a-113b, a time and/or date when the update was finished, and/or a current status for the update, among other things. The updates storage device 138 can also store information about the source device, including the source device's identification information and terminal information. In some cases, the storage device server 134 may configure a source device data set (e.g., a source device name and password) for the source device, and store the source device data set in the updates storage device 138.

In some cases, a storage device update may cause the selected objects 113a-113b to be transmitted to the source device, or may cause the selected objects 113a-113b to be transmitted to another source device, or may cause some other activity to occur, such as initiating delivery of a service to a source device. In these and other examples, the storage device server 134 can update the updates storage device 138 with the current status of the selected objects 113a-113b, including for example whether the selected objects 113a-113b are in transit, the present location of the selected objects 113a-113b while the selected objects 113a-113b are in transit, whether transmission of the selected objects 113a-113b has been finished, and/or whether a service associated with the selected objects 113a-113b has been finished.

In some implementations, a source device may be able to access information in the updates storage device 138 using the graphical user interface 110. For example, the graphical user interface 110 can include displays that cause the source device to look up the current status of an update initiated by the source device.

FIG. 1C illustrates in greater detail an example of an update to the object storage device 136 affected through the graphical user interface 110. Specifically, FIG. 1C includes more detailed examples of the selection display 120 and the terminal display 122 that can be provided by the graphical user interface 110.

As noted above, when a source device selects objects through an object display, the selected objects 113a-113b can be viewed using the selection display 120. Objects can be selected, for example, when the source device activates a "select" button or similar graphical element on an object display. As illustrated in FIG. 1C, a selected object 113a-113b can be displayed with an identifier 124a-124b (ID), a numerical counter 126a-126b, and parameters 128a-128b that are associated with each selected object 113a-113b.

The identifier 124a-124b is an alphanumerical value or a code (e.g., a bar code, a Quick Response (QR) code, or some other kind of code) or a combination of values and codes that can be used to identify a selected object 113a-113b. The identifier 124a-124b can be synonymous with the set of parameters that describe an object. For example, a "circle, size small, color red" can have an identifier of "1434" and a "circle, size small, color blue" can have an identifier of "5678." In some implementations, all objects that have the same parameters can be identified by the same identifier. The identifiers 124a-124b for the selected objects 113a-113b can be used, for example, to identify the selected objects 113a-113b within code of the graphical user interface. As another example, the identifiers 124a-124b can be used by the host network 130 as a key for locating the selected objects 113a-113b in the object storage device 136.

The numerical counter 126a-126b is a fixed number that reflects a number assigned by the host to a selected object 113a-113b. "Fixed" in this context means that the numerical counter 126a-126b cannot be changed by the source device. In some implementations, the numerical counter can be one of the fixed parameters for an object. In some implementations, the host may cause limited modifications to the numerical counter 126a-126b, for example by giving the source device access to differentials that can reduce the numerical counter 126a-126b.

Both fixed and variable parameters can be displayed by the parameters 128a-128b provided in the selection display 120. In the context of the selection display 120, for any variable parameters, the parameters 128a-128b can include the particular values selected by a source device for the variable parameters. For example, a selected object 113a may have a variable parameter called "color" that has possible values "red, blue, yellow." In this example, if the source device selected "yellow," the parameters 128a for the selected object 113a can display "yellow" for the color. In some implementations, from the selection display 120 the source device may be able to change the values for variable parameters 128a-128b (e.g., change the color from "yellow" to "red"). Changing a variable parameter for a selected object 113a-113b can result in the identifier 124a-124b and/or the numerical counter 126a-126b being updated to the identifier 124a-124b and/or numerical counter 126a-126b that corresponds to the modified set of parameters 128a-128b.

Once the source device is satisfied with the contents of the selection display 120, the source device can enter the terminal display 122. The selection display 120 can, for example, include a button or other graphical element (not illustrated here) that, when activated, causes the graphical user interface to display the terminal display 122. Using the terminal display, 122, the source device can provide any information that may be needed to cause an update to the object storage device 136, and possibly also information that may be needed for transmitting the selected objects 113a-113b. Such information can include source device identification data 142 and source device terminal data 144, among other things. The source device identification data 142 can include information about the source device who is causing the storage device update, such as for example the source device's name, an email address, and/or a physical address, among other things. In some implementations, the host network 130 may store the source device identification data 142 and/or source device terminal data 144 in the updates storage device 138. For example, the storage device server 134 may maintain an entry in the updates storage device 138 indexed by the source device's name or email address, and/or by a unique identifier that the source device provides or that the host network 130 generates for the source device.

The source device terminal data 144 can include information required to finish the storage device update. "Finish," in this context, means that the object storage device 136 is modified in some way, possibly including objects being removed. The source device terminal data 144 can be used be the host to modify the object storage device 136. For example, when the selected objects 113*a*-113*b* are to be transmitted to the same source device or to a different source device, the source device terminal data 144 can include a destination address (e.g., a virtual address such as an email address or domain name, or a physical address). In some cases, to finish the storage device update, the host may require that the source device transfer an equivalent of a terminal result to the host before the host will finish the storage device update. The terminal result can be, for example, a sum of the numerical counters 126*a*-126*b* of the selected objects 113*a*-113*b*, one or more fractional counters that the host will transfer to other parties, and/or, when the selected objects 113*a*-113*b* will be transmitted to the source device, a transmission counter. The fractional counters can be computed as a fraction of the sum of the numerical counters 126*a*-126*b*, where the fraction is determined by the party to whom the fractional counter will be transmitted (e.g., a federal, state, or local agency, or some other entity). The transmission counter can be set by transmitter (who may be an entity other than the host) that will transmit the selected objects 113*a*-113*b*, and may be based on a destination address. When the host requires transfer of a terminal result, the source device terminal data 144 can include information that can identify a counter transfer source, from which the terminal result can be transferred to the host.

Once the source device has provided the source device identification data 142 and/or the source device terminal data 144, the source device can trigger a storage device update by activating a "finish" button 146 or a similar graphical element in the terminal display 122. The source device interface server 132 can capture the activation of the "finish" button 146, and then provide a listing of the selected objects 113*a*-113*b*, the source device identification data 142, and the source device terminal data 144 to the storage device server 134.

The storage device server 134 can use this information to update the object storage device 136. In some cases, updating the object storage device 136 can include removing the selected objects 113*a*-113*b* from the object storage device 136. For example, an entry associated with a selected object 113*a*-113*b* can be deleted from the object storage device 136. In some cases, instead of removing the selected objects 113*a*-113*b*, the object storage device 136 can be updated to indicate that the selected objects 113*a*-113*b* are no longer available. For example, a quantity value in the appropriate storage device entry can be decremented and/or set to zero. In some cases, the selected objects 113*a*-113*b* are neither removed nor is a quantity decremented, and instead the object storage device 136 is only updated to reflect that the source device's selection of the objects.

In some cases, the selected objects 113*a*-113*b* can be associated with physical objects. In these cases, an update of the object storage device 136 can cause the associated physical objects to be transmitted to a destination specified by the source device in the source device terminal data 144. In other cases, the selected objects 113*a*-113*b* can be associated with information that is transmitted when the object storage device 136 is updated. Such information can include, for example, an agreement between the source device and the host, an agreement between the source device and another source device, or an agreement to a transfer a value, among other things.

Through the graphical user interface 110, the host can cause source devices to view the contents of, and cause updates to, the host's object storage device 136, in a controlled and restricted fashion. In some cases, the host network 130 may also have an API 140*a* (or a combination of APIs) as an alternate method for entities outside of the host network 130 to access the object storage device 136 and/or the updates storage device 138. An API is a clearly defined method of communication between software components. An API specification can take many forms, but often includes specifications for routines, data structures, object classes, variables, or remote calls.

In the illustrated example, the host can specify the API 140*a* functionality that is available to outside entities, and thus is able to control and limit the manner in which outside entities can access the host network 130. Trusted or authorized outside entities, such as the proxy network 150, may be given some access to the object storage device 136, the updates storage device 138, both storage devices 136, and/or other data or hardware resources in the host network 130. For example, using the API 140*a*, an outside entity such as the proxy network 150 may be able to periodically "pull" (e.g. request) a listing of the current contents of the object storage device 136. Alternatively or additionally, the storage device server 134 may periodically "push" (e.g. send) current listings to receivers such as the proxy network 150. As another example, in some cases, the API 140*a* may provide commands that cause the proxy network 150 to affect updates to the object storage device 136 in the similar way that updates can be caused using the graphical user interface. In some implementations, the proxy network 150 can include automated systems that make use of the host network's API 140*a*.

While the system 100 of FIGS. 1A-1C can cause source devices to affect updates to specific objects in the host's object storage device 136 and sometimes have those objects be transmitted, sometimes a source device may not know which values to specify for an object's parameters, and/or may want another source device to specify the parameter values. For example, a first source device may be selecting an object for transmission to a second source device, and the first source device may not know which parameters to select so that the selected object meets the requirements of the second source device. In this example, the first source device may select a set of objects, but the specific object that is to be updated may not be known until the second source device selects parameter values that reduce the set of objects to a specific object. In this and other examples, the first source device may want to finish a storage device update for the selected object, so that the second source device need not have this responsibility.

In most cases the host network may not be configured to cause the first source device to initiate a storage device where the object to be updated is not known or will be selected at a later time from among a set of objects. For example, the host network may be configured to require a particular object identifier, so that the host network can identify a specific object for updating. Conversely, the first source device may not want to commit to updating all the objects in a set of objects, and then later have to undo the update of the objects that were not selected by the second source device. In this and other examples, the host network may not have the infrastructure in place that causes the first source device to initiate an update of the host's object storage device, where the precise object to update is not known until the second source device (or possibly the first source device or another source device) specifies the parameters that define a specific object.

In some implementations, an proxy network can provide the hardware and software infrastructure to cause a suspended storage device update for a host network. A suspended storage device update is an update of an object storage device that is initiated by a first source device, referred to herein as the instantiating source device, which is finished by a second source device, referred to herein as the terminating source device. In some cases the instantiating source device and the terminating source device may be the same source device. In a suspended storage device update, the object or objects to be updated may not be known when the instantiating source device initiates the suspended storage device update. The object or objects to be updated can be determined when the terminating source device provides input that identifies the object or objects from among an object set. Either the instantiating source device or the terminating source device can provide any terminal data that the host network may require to execute the storage device update and, in some cases, transmit the updated object or objects, though in most cases each source device provides some of the necessary data.

Figure 2A:
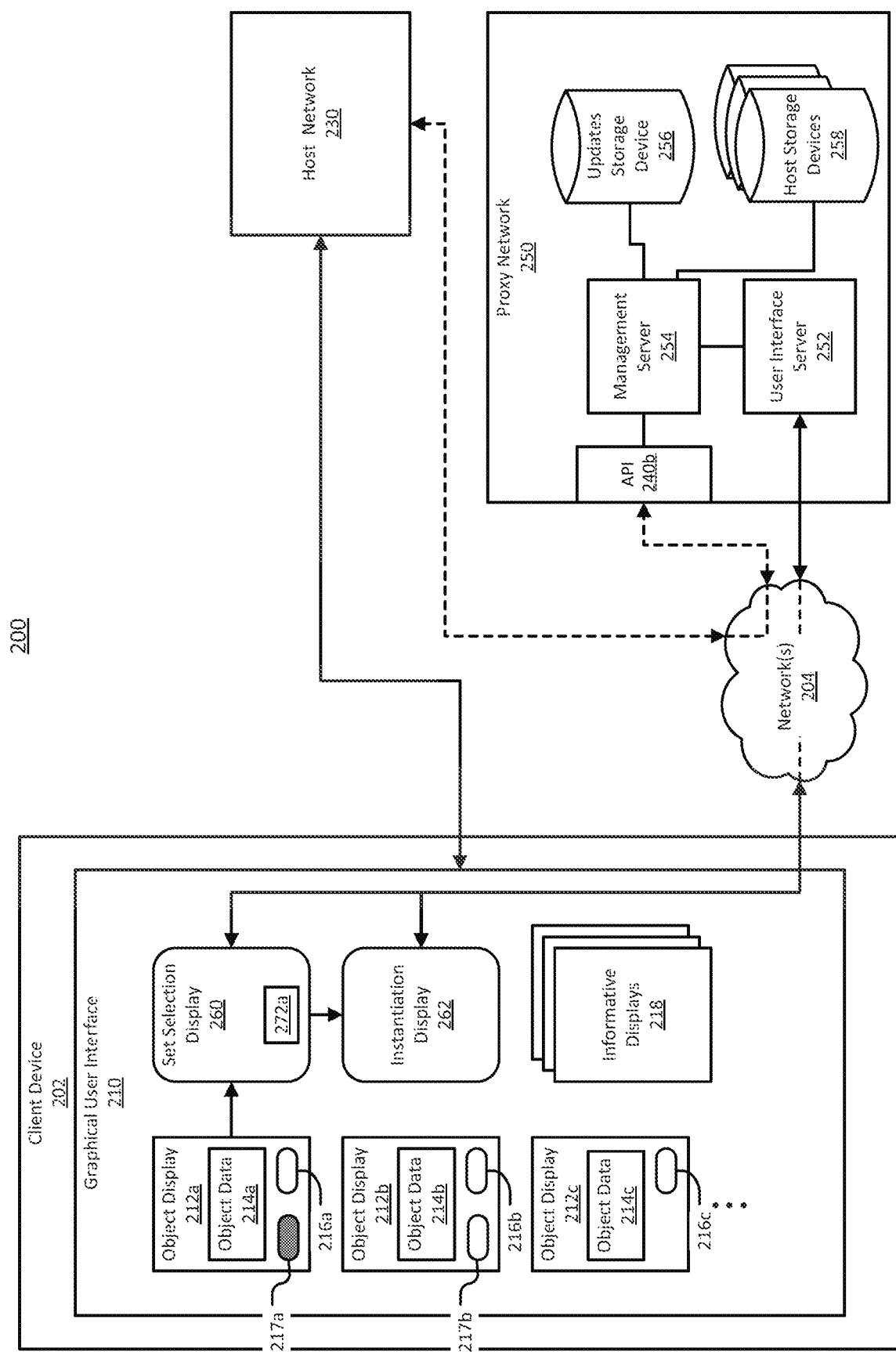
FIGS. 2A-2B illustrate an example of a system in which an proxy network can control suspended storage device updates on behalf of a host network.
Figure 2B:
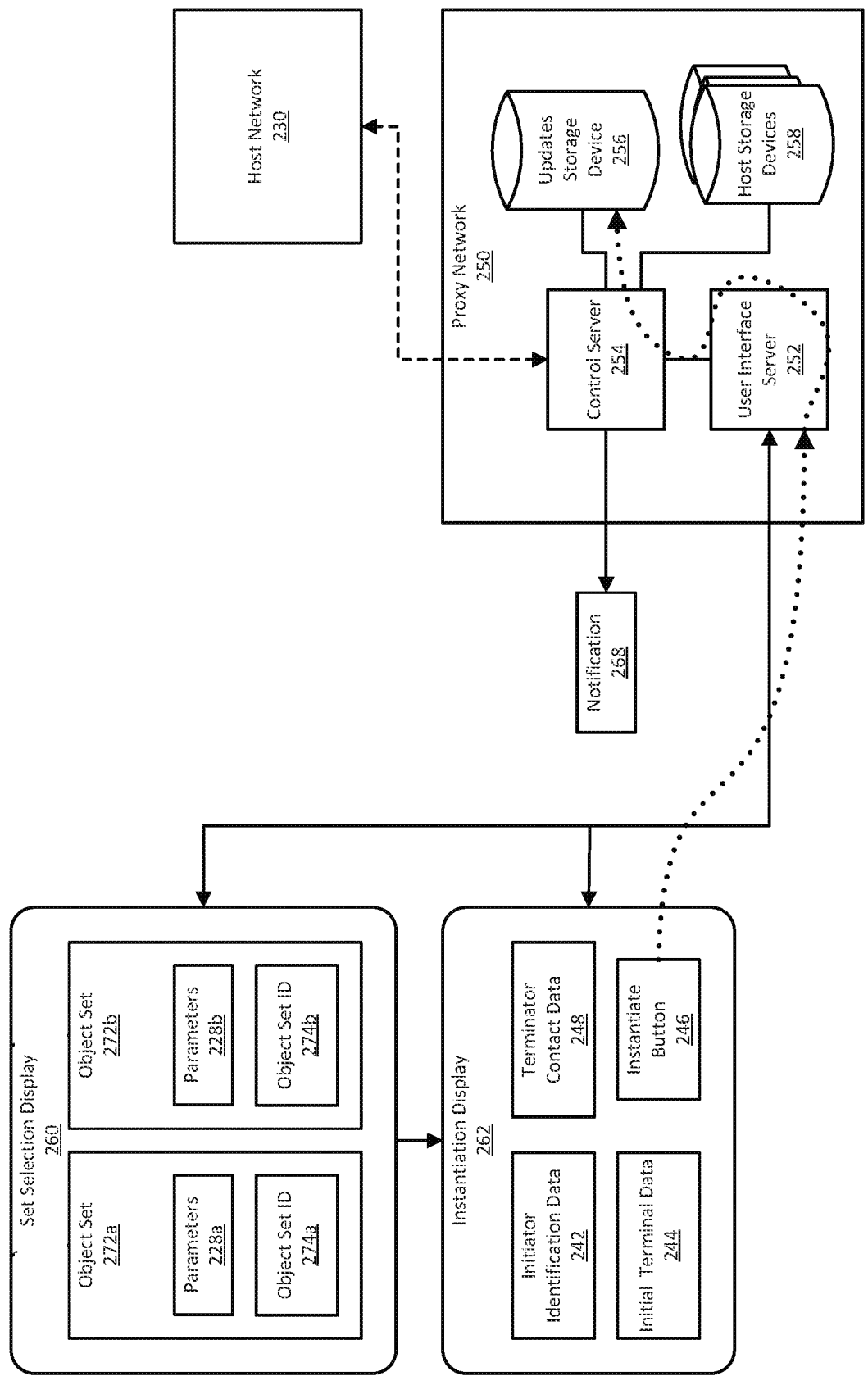

FIGS. 2A-2B illustrate an example of a system 200 in which an proxy network 250 can control suspended storage device updates on behalf of a host network 230. As illustrated in FIG. 2A, the example system 200 can includes a host network 230 configured to provide a graphical user interface 210 on a client device 202. The graphical user interface 210 causes source devices of the client device 202 to view and select objects from the host's object storage device, and to affect updates and transmission of selected objects.

In some implementations, the proxy network 250 manages the initiation and completion of a suspended storage device update. The proxy network 250 can operate in conjunction with the host's graphical user interface 210, so that, in most cases, the host network 230 need not be altered to support suspended storage device updates. The proxy network 250 can, for example, communicate with the client device 202 over one or more networks 204. The proxy network 250 can be authorized by the host to provide suspended storage device updates through the graphical user interface 210. In some cases the proxy network 250 is given limited access to either the host network 230 and/or the graphical user interface 210.

A host can maintain the host network 230 so that source devices can obtain the objects produced and/or distributed by the host. To cause source devices to obtain objects, computing systems in the host network 230 can be configured to provide the graphical user interface 210 on a client device 202. Using the graphical user interface 210, a source device can view and select objects from the host's object storage device. To cause the source device to view objects, the graphical user interface 210 can include object displays 212a-212c. In some implementations, each object display 212a-212c can illustrate and/or describe an object type, though sometimes an object display 212a-212c may illustrate a particular object. Each object display 212a-212c can include object data 214a-214c for an object type, where the object data 214a-214c can include parameters associated with an object type and possibly also other information about the object type. An object display 212a-212c can further include graphical elements, such as buttons 216a-216c that can be used, as discussed above, to select a particular, parameterized object, as well as buttons 217a-217b that can be used select an object set, as discussed further below. In various examples, the graphical user interface 210 can also display various informative displays 218.

FIG. 2A also illustrates an example implementation of the proxy network 250. In the illustrated example, the proxy network 250 includes a source device interface server 252 and a control server 254. The control server 254 may control one or more storage devices, including, in the illustrated example, an updates storage device 256 and one or more host storage devices 258. In some implementations, the proxy network 250 can also include an API 240b (or combination of APIs) through which the proxy network 250 can receive information from the host network 230 and/or other entities. In some implementations, the operations of the source device interface server 252 and the control server 254 can be implemented in a single physical device (e.g. a server computer) or in a combination of physical devices (e.g., a server farm). In some implementations, the physical hardware that supports the proxy network 250 can be provided to the proxy network 250 by a cloud services host (e.g., the hardware and at least some of the software is located in a data center operated by the cloud services host). In some implementations, the proxy network 250 can include additional hardware, software, and/or data that is not illustrated here.

The updates storage device 256 can store suspended storage device updates and information related to suspended storage device updates. For example, for each suspended storage device update, the control server 254 can add an entry to the updates storage device 256. Each entry can be associated with a unique identifier. The entry can include, for example, a listing of one or more sets of objects (also referred to as object sets) associated with the suspended update, information identifying the source device who initiated the suspended update, information identifying a source device who is to finish the suspended update, and/or terminal data, if any has been provided. When a suspended update is finished, the entry for the suspended update can be updated to include any information provided by the terminating source device, such as parameter values and/or additional terminal data. The control server 254 can use the finished suspended storage device update to finish an update of the host's object storage device. Once the suspended data base update has been finished, the entry in the updates storage device 256 man be removed or may be saved for record-keeping purposes.

The host storage devices 258 can store information for or about a host. In some implementations, the proxy network 250 can support suspended storage device updates for multiple hosts, and thus may have a host storage device 258 for each supported host. A host storage device 258 can include, for example, a listing of objects available from the host and information related to the objects (e.g., object identifiers, fixed and variable parameters, numerical counters, a quantity currently available, etc.). The proxy network 250 may maintain this information because the proxy network 250 may not have free access to the host's object storage device, and frequently querying the host network 230 for this information may be cumbersome. Alternatively or additionally, in some cases the host may want only some, and not all, of the host's objects to be available for suspended storage device updates. In these cases, the host storage device 258 for the host may include lists of the host's objects that qualify for suspended storage device updates, and may not have information about all of the host's objects.

The host can determine which object types qualify for suspended storage device updates, and informs the proxy network 250. In some implementations, the host can transmit lists of qualified object types using an API 240b of the proxy network 250. Alternatively or additionally, in some implementations, the host can email, transmit by file transfer protocol (FTP), or otherwise electronically send a list of qualified object types to the proxy network 250. In these implementations, the proxy network 250 can include automated systems that can automatically parse the list and update the host storage device 258 with the data from the list. In some implementations, the host can alternatively or additionally define an object classification, where objects that are included by the classification all qualify for suspended storage device updates.

The source device interface server 252 can use the data stored in the host storage devices 258 to generate and inject displays and graphical elements into the graphical user interface 210. In some implementations, the source device interface server 252 can launch an application, referred to herein as an proxy application, which runs on the client device 202 and injects displays and/or graphical elements into the graphical user interface 210. In some implementations, the source device interface server 252 can inject displays and/or graphical elements directly, without assistance from the proxy application.

In some implementations, injection of displays and graphical elements can be triggered when an instantiating source device views one of the object displays 212a-212c. In some implementations, the object display 212a-212c can include a small amount of code (e.g., a short Javascript) that sends information about the object type illustrated in the object display 212a-212c to the proxy network 250. Using this information, the proxy network 250 can (using, for example, the control server 254) query the appropriate host storage device 258 (for example, over one or more networks 204) and determine whether the object type is qualified for a suspended storage device update. In some implementations, the small amount of code or some other information can be dynamically added to an object display 212a, 212c, such that the host does not need to modify the object displays 212a-212c. For example, the source device interface server 252 can add the code as the graphical user interface 210 generates an object display 212a-212c for viewing. In some implementations, instead of code embedded into the object displays 212a-212c, the source device interface server 252 can inject a process onto the client device 202 when the graphical user interface 210 is loaded. In these implementations, the process can watch for object displays 212a-212c being loaded for viewing, can extract from the object display 212a-212c the object type that is being illustrated, and can send information identifying the object type to the proxy network 250.

In some implementations, injection of the displays and graphical elements can be triggered when the instantiating source device views a display for a particular object classification or sub-classification, such as a classification defined specifically for objects that qualify for a suspended storage device update.

When an object type is qualified for suspended storage device updates, the proxy network 250 can add a button or some other graphical element to the appropriate object display, which indicates this qualification. In the illustrated example, the first object display 212a and the second object display 212b have had such injected buttons 217a-217b added. The object type illustrated by a third object display 212c does not qualify for suspended storage device updates, and thus the third object display 212c does not include an injected button. In most cases the injected buttons 217a-217b are added and the existing graphical elements in the object displays 212a-212b are not modified, or are modified only to make room to add the injected buttons 217a-217b. For example, the original buttons 216a-216c for selecting an object are not removed from the object display 212a-212b. As discussed above, these buttons 216a-216b may only cause selection of specific objects, that is, objects for which a source device has specified values for any variable parameters. Any action associated with these buttons 216a-216b may thus be disabled until values are specified for all variable parameters.

In contrast, the injected buttons 217a-217b can cause an instantiating source device to select an object set instead of a particular object. That is, the instantiating source device can leave some or all variable parameters unspecified, and use the injected buttons 217a-217b to select a set of objects that correspond to the possible values for any unspecified the parameters. When the instantiating source device leaves all variable parameters unspecified, the object set can include all objects that correspond to an object type. When the instantiating source device specifies values for at least some variable parameters, then the object set can include fewer than all of the objects that can be described by an object type. In some examples, the instantiating source device may specify values for all variable parameters, and use the injected buttons 217a-217b to cause a particular object to be updated. In these examples, the selected object set can include just the particular object. The object set can otherwise be treated the same as when the object set includes multiple objects.

When the instantiating source device activates an injected button 217a-217b, such as the injected button 217a that has been added to the first object display 212a, an object set 272a can be selected and display in a set selection display 260. In some implementations, the proxy network 250 injects the selection display 260 into the graphical user interface 210, using, for example, the source device interface server 252 and/or code or a process injected into the graphical user interface 210. As with the selection display discussed above, the instantiating source device can added multiple object sets to the set selection display 260, for example by returning to the object displays 212a-212b and selecting another object set. Using the set selection display 260, the instantiating source device can make changes to the selected object set 272a, including, for example, specifying values for variable parameters, un-specifying values for variable parameters, removing selected object sets, and/or adding object sets.

Once the instantiating source device is satisfied with the selected object sets 272a, the instantiating source device can proceed to an instantiation display 262 that can be injected into the graphical user interface 210 by the proxy network 250. For example, the instantiating source device can activate a button (not illustrated here) that indicates that the instantiating source device is ready to proceed to the instantiation display 262. As discussed further below, the instantiating source device can use the instantiation display 262 to input information that can be used to identify and/or locate a terminating source device. The initiation source device can also input information that can be used to finish a storage device update once the terminating source device has entered any necessary information for completing the update. In some implementations, the instantiation display 262 and the set selection display 260 can be combined into a single display, or can be subdivided into sub-displays.

The parameter selection display 260, instantiation display 262, and graphical elements (e.g., the injected buttons 217a-217b) injected into the graphical user interface 210, as well as any application or process launched to support suspended storage device updates (e.g., the proxy application, discuss below), can be modified for a particular host. For example, injected graphics and displays can be made to mimic the look and feel of the graphical user interface 210, including using the same colors, backgrounds, borders, fonts, shapes, and/or graphics, as well as similar layouts and templates. In this example, the injected graphics and displays can appear as an integrated part of the graphical user interface 210. As another example, the proxy application can be linked to the host storage device 258 for the particular host, so that the proxy application can obtain data specific to the host (e.g., lists of object types that qualify for suspended storage device updates), and/or can track any specific requirements desired by the host.

FIG. 2B illustrates in greater detail an example of instantiation of a suspended storage device update affected through the graphical user interface 210. Specifically, FIG. 2B includes more detailed examples of the set selection display 260 and the instantiation display 262 that can be injected into the graphical user interface 210 by the proxy network 250.

As noted above, when an instantiating source device selects an object set 272a-272b, the source device can view the selected object set 272a-272b using the set selection display 260. Each selected object set 272a-272b, can be displayed with any associated parameters 228a-228b, including any fixed parameters, variable parameters for which the instantiating source device has selected a value, and/or variable parameters for which the instantiating source device has not selected a value. Each selected object set 272a-272b can also be associated with an object set identifier 274a-274b, which identifies the each object set 272a-272b.

Using the set selection display 260, a instantiating source device can make changes to the selected object sets 272a-272b, such as for example selecting and/or modifying values for any variable parameters 228a-228b, adding other object sets, and/or removing object sets, among other things. In some implementations, the parameter selection display 260 can include graphical elements that can cause the instantiating source device to designate primary and alternate object sets. An alternate object set can be presented to the terminating source device as an alternative to the primary object set. In some implementations, the proxy network 250 can alternatively or additionally display objects, object types, and/or object classes that may be related to, associated with, or correlating to the object sets 272a-272b selected by the instantiating source device. The set selection display 260 can further include a button or other graphical element (not illustrated here) that the instantiating source device can activate to proceed to the instantiation display 262.

In the instantiation display 262, the instantiating source device can provide information that can be used by the proxy network 250 to instantiate a suspended storage device update and, ultimately, finish the suspended update. Such information can include instantiation identification data 242, initial terminal data 244, and terminator contact data 248, among other things. The instantiation identification data 242 can include information about the instantiating source device, such as for example the instantiating source device's name, an email address, and/or a physical address, among other things. The initial terminal data 244 can include at least some information that can be used to finish the storage device update when the suspended storage device update is finished. For example, the selected object sets 272a-272b may be associated with an approximated result that represents an approximation of a number the host may assign to objects that can be derived from the object set. In this example, the initial terminal data 244 can include a counter transfer source for the instantiating source device, from which the host can transfer—when the suspended storage device update is finished—an equivalent of the approximated result to the host's systems.

The terminator contact data 248 can be used to notify the terminator that the suspended storage device update has been initiated. The terminator contact data 248 can include, for example, an email address, a physical address, a source device name for a network service, an identifier for an assembly network (e.g., media) server, a name and/or address of an agent of the terminating source device, or some other information that can be used to reach the terminating source device. In some implementations, the instantiating source device need not provide detailed information for the terminator contact data 248. For example, when the instantiating source device does not have the terminating source device's email address or physical address, the instantiating source device can supply an assembly network identifier (e.g., the terminating source device's source device name for the assembly network system) or some other information that is associated with the terminating source device.

Once the instantiating source device has entered any information requested by the instantiation display 262, the instantiating source device can activate an instantiate button 246, or a similar graphical element, that informs the proxy network 250 to instantiate a suspended storage device update. In some implementations, the selected object sets 272a-272b, the instantiation identification data 242, the initial terminal data 244, and terminator contact data 248 can be captured by the source device interface server 252. The source device interface server 252 can provide this data to the control server 254, which can store this data in an entry in the updates storage device 256.

In some implementations, the control server 254 can generate and associate a unique update identifier with each suspended storage device update. The control server 254 can, for example, use the update identifier to locate an entry for a suspended storage device update in the updates storage device 256. The entry can further record the instantiation identification data 242, initial terminal data 244, and the terminator contact data 248, among other things.

In some implementations, the control server 254 can transmit the update identifier in a notification 268 to the terminating source device. For example, the control server 254 can automatically generate an email to an email address, cause a postcard or letter to be mailed to a physical address, post a message to an assembly network service, and/or otherwise use the terminator contact data 248 to notify the terminating source device of the suspended storage device update. As discussed further below, the terminating source device can then use the update identifier to finish the suspended storage device update.

In some implementations, proxy network 250 may conduct communications with the host network 230 when a suspended storage device update is instantiated. For example, the proxy network 250 may verify the availability of objects described by the selected object sets 272a-272b, may request object identifiers for objects that can be described by the selected object sets 272a-272b, may reserve objects so described, may reserve a numerical counter for use when the suspended storage device update is finished, or may execute some other communication.

In some implementations, a suspended storage device update can be instantiate dby multiple instantiating source devices. In these implementations, the selection display 260 and/or the instantiation display 262 can include graphical elements (not illustrated here) that can cause a first instantiating source device to identify other instantiating source devices. For example, the first instantiating source device may be able to provide email addresses for other instantiating source devices. Alternatively or additionally, the first instantiating source device can, for example, request a link that the first instantiating source device can send to other instantiating source devices. In this example, the link, when activated, can launch the selection display 260, which can display the selected object sets 272a-272b selected by the first instantiating source device. In some implementations, other instantiating source devices can add, remove, and/or modify object sets. In some implementations, one or more other instantiating source devices may need to approve the selected object sets 272a-272b before a suspended storage device update can be instantiated. In some implementations, all instantiating source devices need to approve the selected object sets 272a-272b before the suspended storage device update can be instantiated.

In some implementations, a suspended storage device update can be instantiated with multiple terminating source devices. For example, the terminator contact data 248 in the instantiation display 262 can include graphical elements for inputting terminator contact data for multiple source devices. As another example, when the suspended storage device update is instantiated, the instantiating source device can be provided with a link that the instantiating source device can send to multiple terminating source devices. In this example, the link, when activated, can launch the selection display 260. In some implementations, each terminating source device can independently finish a suspended storage device update, and an object may be transmitted to each terminating source devices that does so. In these implementations, multiple objects, which may be the same or may be an alternative object selected by a particular terminating source device, may be updated and possibly also transmitted. In some implementations, one or more terminating source devices may have to provide input before a suspended storage device update can be finished. For example, each terminating source device may have to express approval for the selected object.

In some implementations, object sets from multiple host networks can be added to the selection display 260. For example, the selection display 260 and/or instantiation display 262 can include graphical elements (not illustrated here) that, when activated, can launch the graphical user interface of another host network. In this example, when the instantiating source device selects an object set to add to the set selection display 260, the proxy network 250 can prepopulate the selection display 260 with object sets previously selected by the instantiating source device. As another example, the selection display 260 and/or instantiation display 262 can include a graphical element (not illustrated here) that can cause the instantiating source device to save or store the selected object sets 272a-272b. In this example, when the instantiating source device triggers the selection display 260 from the host's graphical user interface 210 of another host network, the instantiating source device can enter some information (such as an email address or source device name) that can cause the proxy network 250 to find the stored selections. In this example, the proxy network 250 can then populate the selection display 260 with the previously selected object sets 272a-272b.

Figure 3:
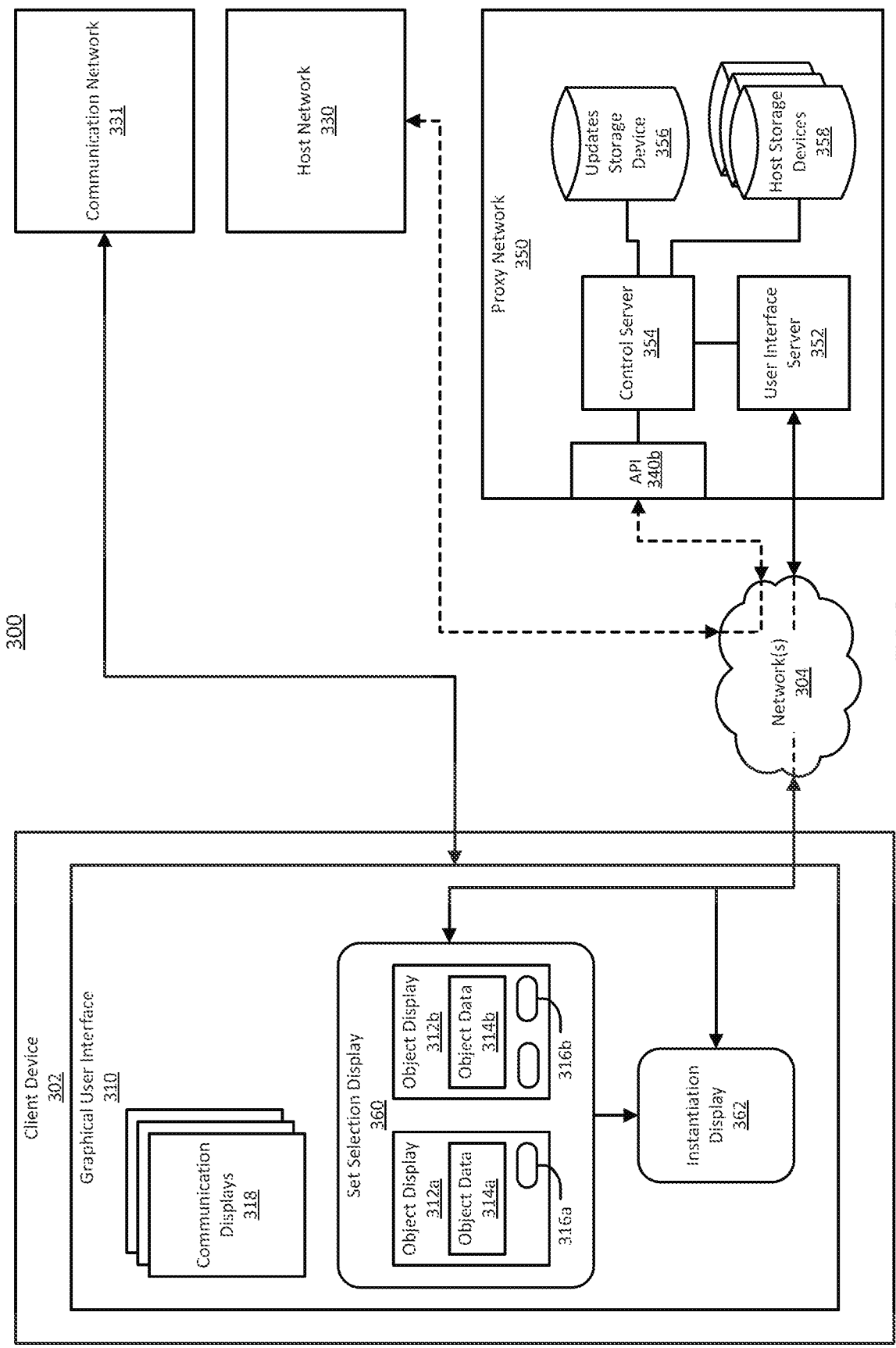
FIG. 3 illustrates an alternate example of a system in which an proxy network can control suspended storage device updates on behalf of a host network.

FIG. 3 illustrates an alternate example of a system 300 in which an proxy network 350 can control suspended storage device updates on behalf of a host network 330. In the example of FIG. 3, an communication network 331 can provide a graphical user interface 310 on a client device 302. An proxy network 350 can inject displays into the graphical user interface 310, where the displays can cause source devices to instantiate a suspended storage device update for objects provided through a host network 330. In some examples, the proxy network 350 communicates with the client device 302 over one or more networks 304 in order to manipulate the graphical user interface 310.

In some examples, the graphical user interface 310 can cause source devices to communicate, as defined by the communication network 331. For example, the communication network 331 can be an assembly network, and the graphical user interface 310 can include communication displays 318 that can cause source devices to provide data about themselves and/or to view data about others. As another example, the communication network 331 can be a I/O network, where source devices can store text and load text stored by others. As another example, the communication network 331 can be a family history network, where source devices can record and/or investigate personal family histories. In these and other examples, the communication displays 318 can include displays that are associated with specific source device data sets.

In some implementations, with authorization from the communication network 331, the proxy network 350 can inject graphical elements into one or more of the communication displays 318 provided by the graphical user interface 310. The graphical elements can be added based on criteria defined by the communication network 331, the host network 330, and/or the proxy network 350. For example, the communication network 331 or the host network 330 may require that the graphical elements appear a certain number of times, on a certain number of communication displays 318, at certain times of the day, week, or year, for pre-determined periods of time, or based on some other constraint. Alternatively or additionally, the proxy network 350, for example using a control server 354, may obtain information about source devices of the communication network 331, and use this information to determine whether and/or when to inject the graphical elements. For example, data from the communication network 331 may indicate that a particular source device in another source device's network is having an event. In this example, prior to the event, the proxy network 350 can inject a graphical element into communication displays 318 that may be viewed by the other source device, so that this source device can source device the graphical elements to instantiate a suspended storage device update.

In some implementations, activating the injected graphical elements can activate the set selection display 360 of the proxy network 350. In some implementations, the graphical elements may be associated with a particular host network 330, so that the set selection display 360 can cause a source device of the communication network 331 to view objects provided by the host network 330. In some implementations, the set selection display 360 may display a list of host networks, from which the source device can select a host network whose objects the source device wishes to view. In these and other implementations, the set selection display 360 can present the source device with object displays 312a-312b, where proxy network 350 obtains the data for the object displays 312a-312b for the host network 330 and/or from a host storage device 358 for host network 330. The object displays 312a-312b an include object data 314a-314b for objects being displayed, included graphical elements displaying fixed and/or variable parameters. The object display 312a-312b can also include buttons 316a-316b or other graphical elements (such as check boxes) that can cause the source device to select an object set for inclusion in a suspended storage device update. The set selection display 360 can further include graphical elements that can cause the source device to activate an instantiation display 362.

In some implementations, the proxy network 350 can include a source device interface server 352 that can be configured to inject the graphical elements, set selection display 360, and instantiation display 362 into the graphical user interface 310. The source device interface server 352 can coordinate with a control server 354, which can be configured to obtain data from the host network 330. For example, the proxy network 350 can include an API 340*b*, through which the host network 330 can push object data to the proxy network 350. In this example, the proxy network 350 can store the object data in a host storage device 358. In some implementations, the proxy network 350 can include host storage devices 358 for different host networks.

In some implementations, the source device interface server 352 can further capture inputs into the set selection display 360 and/or instantiation display 362. These inputs can correspond to selection of object sets, instantiation identification data, initial terminal data, and/or terminator contact data for a suspended storage device update. The source device interface server 352 can pass this information to the control server 354 for storing in an updates storage device 356.

Figure 4:
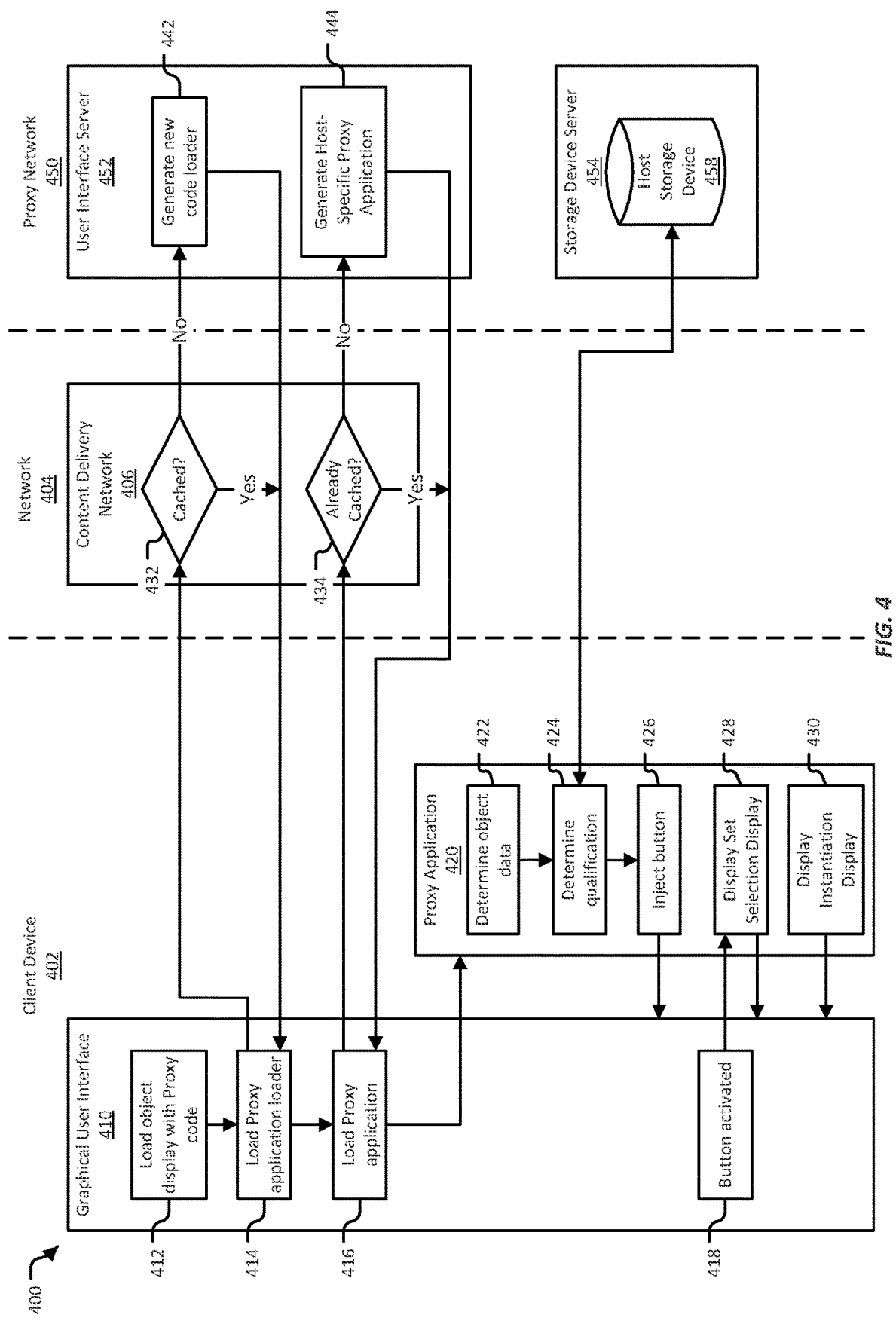
FIG. 4 illustrates an example of a process for initiating a suspended storage device update.

FIG. 4 illustrates an example of a process 400 for initiating a suspended storage device update. In some implementations, the example process 400 includes operations conducted at a client device 402, operations that can occur at systems in a network 404 and operations that occur at an proxy network 450. In some implementations, the client device 402 is able to communicate with the network 404 for some purposes, including to obtain a graphical user interface 410 from a host's network. The proxy network 450 can also communicate with the client device 402 over the network 404.

At the client device 402, an instantiating source device can view a host's objects using the graphical user interface 410. In some implementations, object displays in the graphical user interface 410 can include a small amount of code, referred to here as proxy code, inserted by the proxy network 450 (with the permission of the host). In some implementations, the proxy code can be inserted dynamically, that is, when the object display is generated by the graphical user interface 410. In some implementations, the proxy code is statically integrated. In each of these implementations, the proxy code is embedded into the code that can be used to generate the graphical user interface 410.

When the instantiating source device selects a particular object display for viewing, at step 412, the graphical user interface 410 can load the particular object display, and also the proxy code. When loaded, at step 414, the proxy code attempts to launch an proxy application loader. To do so, the proxy code can check, at step 432, whether the proxy application loader is cached in a content delivery network 406 on the network 404. A content delivery network is a system of distributed servers that delivers multi-media content, such as webpages and other web content, to client devices. This system can increase the speed of delivery of content, particularly for host networks that routine experience high traffic.

In some implementations, the content delivery network 406 of FIG. 4 can keep a cached copy of the proxy application loader. When, at step 432, the content delivery network 406 has a cached copy, the content delivery network 406 can provide the cached copy of the proxy application loader to the client device 402. Cached data can expire, however. By causing cached data to expire, the content delivery network 406 can remove data that has not been needed for some time, and thus free space for more recently requested data. Alternatively, the proxy application loader may not yet have been stored in the content delivery network 406. For example, neither the illustrated client device 402 nor another nearby client device may have, through the graphical user interface 410, attempted to load the proxy application loader.

When, at step 432, the cached copy of the proxy application loader is not found in the content delivery network's cache, the content delivery network 406 can, at step 442, request that the proxy network 450 generate a new proxy code loader. Generation of a new code loader can be handled by a source device interface server 452 in the proxy network 450. In some implementations, the source device interface server 452 can generate the proxy code loader that references the latest version of the proxy application 420, which is discussed further below. The source device interface server 452 can then provide the proxy code loader to the client device 402.

The proxy application loader's purpose is to, at step 416, load an proxy application 420. To do so, the proxy application loader can check, at step 434, whether the proxy application 420 is already cached in the content delivery network 406. In some implementations, the proxy network 450 can request that the content delivery network 406 keep copies of the proxy application 420 (and, in some cases, the proxy application loader) as long as possible. For example, the content delivery network 406 can request a maximum expiration time, so that the proxy application 420 and/or proxy code loader are removed from the cache only when the maximum expiration time is reached. In these implementations, delays in generated the proxy application 420 on the client device 402 can be minimized. When the content delivery network 406 has a cached copy of the proxy application 420, the content delivery network 406 can provide this copy to the client device 402.

When the content delivery network 406 does not have a cached copy of the proxy application 420, the content delivery network 406 can request a copy from the proxy network 450. In some implementations, the source device interface server 452 in the proxy network 450 can, at step 444, generate a host-specific proxy application. Host-specific in this context means that the proxy application includes, for example, graphics that are the same as or similar to the graphics of the host's graphical user interface 410, any preferences or configuration requirements specified by the host, and/or a link to the host storage device 458 for the host, among other things. Once the content delivery network 406 has a copy of the proxy application 420, the content delivery network 406 can provide the proxy application 420 to the client device 402.

Once loaded, the proxy application 420, at step 422, can determine object data for the object display requested at step 412. The object data can include, for example, a description of an object type illustrated by the object display, any fixed or variable parameters associated with the object type, and possibly also object identifiers associated with the object type.

The proxy application 420 can next, at step 424, determine whether the object type qualifies for a suspended storage device update. The proxy application may, for example, query the storage device server 454 in the proxy network 450. The storage device server 454 can look up the object type in the appropriate host storage device 458. When the host storage device 458 indicates that the object type does not qualify for a suspended storage device update, or the object type is not found in the host storage device 458, the proxy application 420 can take no further action. The instantiating source device then has the option executing an ordinary update of a specific object in the host's object storage device, instead of initiating a suspended storage device update.

When the host storage device 458 indicates that the object type does qualify for suspended storage device update, the proxy application 420, at step 426, can inject a button or other graphical element into the graphical user interface 410. The injected button can indicate to the instantiating source device that the object type qualifies for a suspended storage device update. Injecting a button (or other graphical element), in this context, means that the button is added to the existing graphical elements of the object display that was loaded at step 412. Injecting the button can include, for example, adjusting a template that the graphical user interface 410 uses to generate the object display. In some implementations, the object display is modified with the injected button before the object display is presented to the source device. In some implementations, the object display is refreshed (e.g., re-generated) in order to add the injected button to the object display.

When, at step 418, the instantiating source device activates the button injected at step 426, the proxy application 420, at 328, can display a set selection display in the graphical user interface 410. An object set selected by the instantiating source device can be loaded into the set selection display. Using the set selection display, the instantiating source device can indicate (e.g., by activating a button or other graphical element) a desire to initiate a suspended storage device update object set. At step 430, the proxy application 420 can then display the instantiation display in the graphical user interface 410. In the instantiation display, the instantiating source device can provide any information that may be needed to initiate and, at a later time, finished the suspended storage device update. The instantiating source device can further initiate the suspended storage device update by activating a button or other graphical element in the instantiation display.

Figure 5:
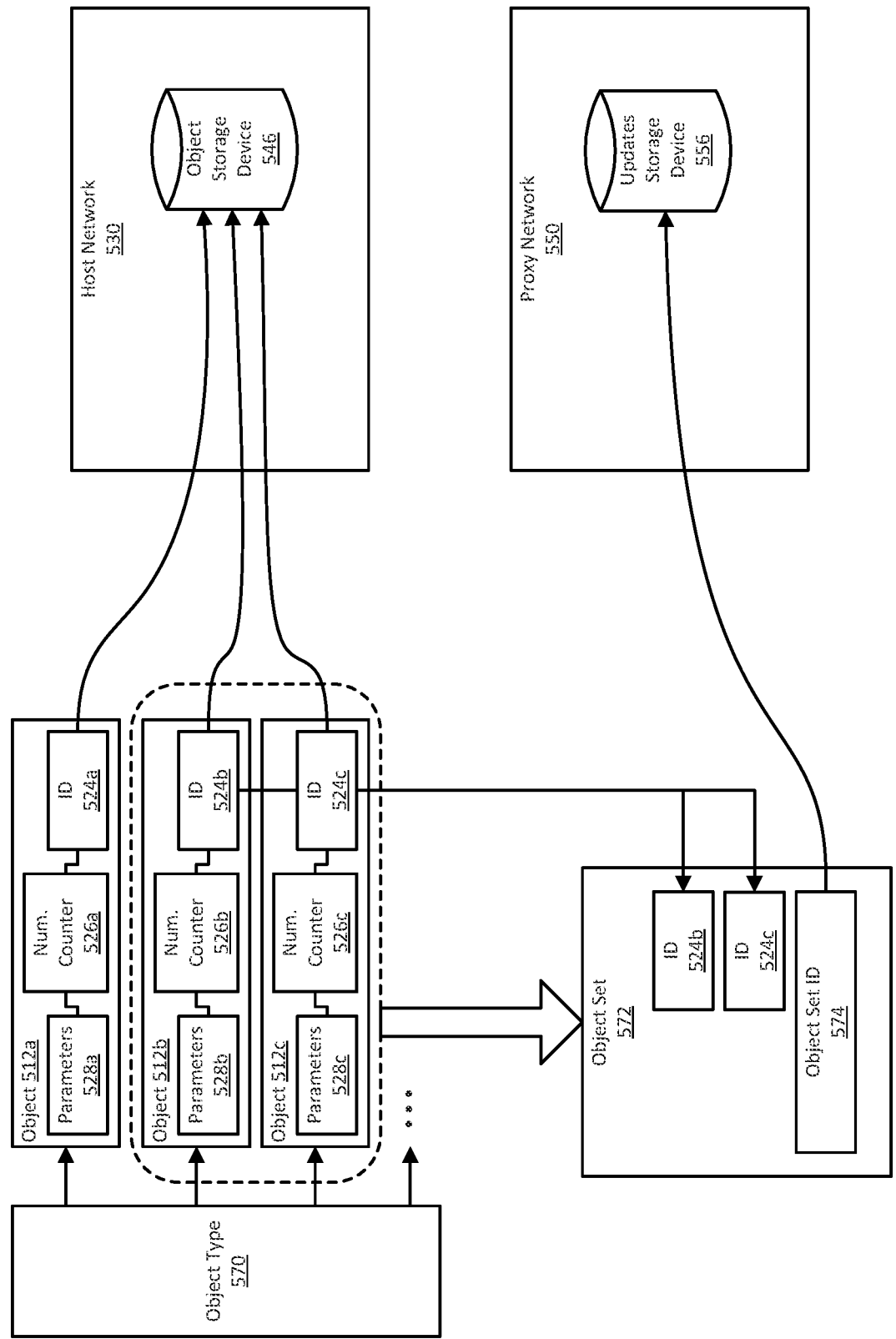
FIG. 5 illustrates an example of the relationship between an object type, objects associated with the object type, and an object set.

FIG. 5 illustrates an example of the relationship between an object type 570, objects 512a-512c associated with the object type 570, and an object set 572. As discussed above, an object type 570 can be associated with a set of parameters, some of which may be fixed while others can be variable. For example, an object type "circles" can have a fixed parameter called style and having the value "A", a variable parameter called size (having three possible values "small," "medium," and "large"), and a variable parameter called color (having two possible values "blue" and "red"). The objects 512a-512c associated with an object type 570 can include all the objects that can be described by all variations of the fixed and variable parameters. Using the previous example, the object type "circles" can include an object having the parameters "A," "small," and "red," corresponding to the fixed style parameter and the variable size and color parameters, respectively. As another example, the object type "circles" can also include an object having the parameters "A," "small," and "blue," and an object having the parameters "A," "medium," and "red." In this example, the object type "circles" can be associated with a total of six objects, each having a different set of fixed and variable parameters. In some implementations, an object can be associated with more than one object type.

Each object 512a-512c associated with an object type 570 can thus be described by set of parameters 528a-528b. In some implementations, the objects 512a-512c can also be associated with a numerical counter 526a-526c and an object identifier 524a-524c, among other things. The numerical counter 526a-526c represents a number assigned to each object 512a-512c by the host. In some cases, the numerical counter 526a-526c is the same for all of the objects 512a-512c that can be described by an object type 570. In some cases the numerical counter 526a-526c is different for different objects 512a-512c included within an object type 570. In most cases, the numerical counter 526a-526c cannot be changed by the source device and/or the host may provide some fixed options for adjusting the numerical counter 526a-526c.

The object identifier 524a-524c for each object 512a-512c can be used by a host to uniquely identify the objects 512a-512c. The host can associate the object identifiers 524a-524c with the set of parameters 428a-428c that describe an object 512a-512c, so that all objects that have the same parameters have the same object identifier.

Each object 512a-512c that is associated with an object type 570 can have a corresponding entry in an object storage device 546 operated by a host network 530. In some cases, systems in the host network can locate and object 512a-512c in the object storage device 546 using the object identifier 524a-524b that is associated with each object 512a-512c. An object's entry in the object storage device 546 can include information such as the object's parameters 428a-428c, the object's numerical counter 526a-526c, a textual description of the object, a visual description of the object (e.g., a picture), the object's object type 570 (or possible object types), other classifications for the object 512a-512c, and/or other relationships between an object 512a-512c and other objects in the object storage device 546.

As discussed above, the proxy network 550 can cause an instantiating source device to initiate an update of the host's object storage device 546 without specifying values for all of the variable parameters that an object type 570 may have. For example, the instantiating source device can specify "small" for a "size" parameter, but may not want to select a value for a "color" parameter. Without the assistance of the proxy network 550, the instantiating source device would have to specify the "color" parameter so that the host network 530 can be informed of which object 512a-512c to update in the object storage device 546. Alternatively, the instantiating source device can specify multiple values for the "color" parameter, but this would cause multiple objects (e.g., one for each selected color) to be updated in the object storage device 546. Additionally, the instantiating source device would have to commit to finalizing the update of the multiple objects, and should the terminating source device select only one of the multiple objects, the update of the remaining multiple objects would have to be undone.

With the support of the proxy network 550, in the preceding example the instantiating source device can instead leave the "color" parameter unspecified, such that objects 512b-512c corresponding to the value "small" for the "size" parameter and having any value for the "color" parameter are selected. In the illustrated example, the selected objects 512b-512c include some but not all of the objects 512a-512c that can be described by the object type 570. For example, objects have the value "medium" or "large" for the "size" parameter are excluded. In other examples, the selected objects can include all of the objects that can be described by the object type 570. For example, in the preceding example, should the instantiating source device leave the "size" as well as the "color" parameters unspecified, the selected objects can be selected.

In some implementations, the proxy network 550 can generate an object set 572 for the selected objects 512*b*-512*c*. To capture or record the selection, in some implementations the object set 572 can include the object identifiers 424*b*-424*c* for each selected object 512*b*-512*c*, and/or other information that can be used to identify the selected objects 512*b*-512*c*. The object set 572 can also include other information, such as an update identifier, which can be used by the proxy network 550 to associate the object set 572 with a particular suspended storage device update and/or a particular instantiating source device. In some implementations, the object set 572 can be implemented using a data structure, a storage device entry, a text file, a file formatted using eXtensible Markup Language (XML) or JavaScript Object Notation (JSON) or some other format, or some other structure or format.

In some implementations, the object set 572 can also include an object set identifier 574, generated by the proxy network 550. The object set identifier 574 can uniquely identify the particular group of objects 512*b*-512*c* that match the instantiating source device's selection. In some implementations, the object set identifier 574 can also be associated with the instantiating source device and/or an update identifier. In these and other implementations, the object set identifier 574 can remain the same even when the instantiating source device changes the selected objects 512*b*-512*c* by selecting different parameter values. In some implementations, the proxy network 550 can use the object set identifier 574 to store and locate the object set 572 in an updates storage device 556 operated by the proxy network 550.

Figure 6:
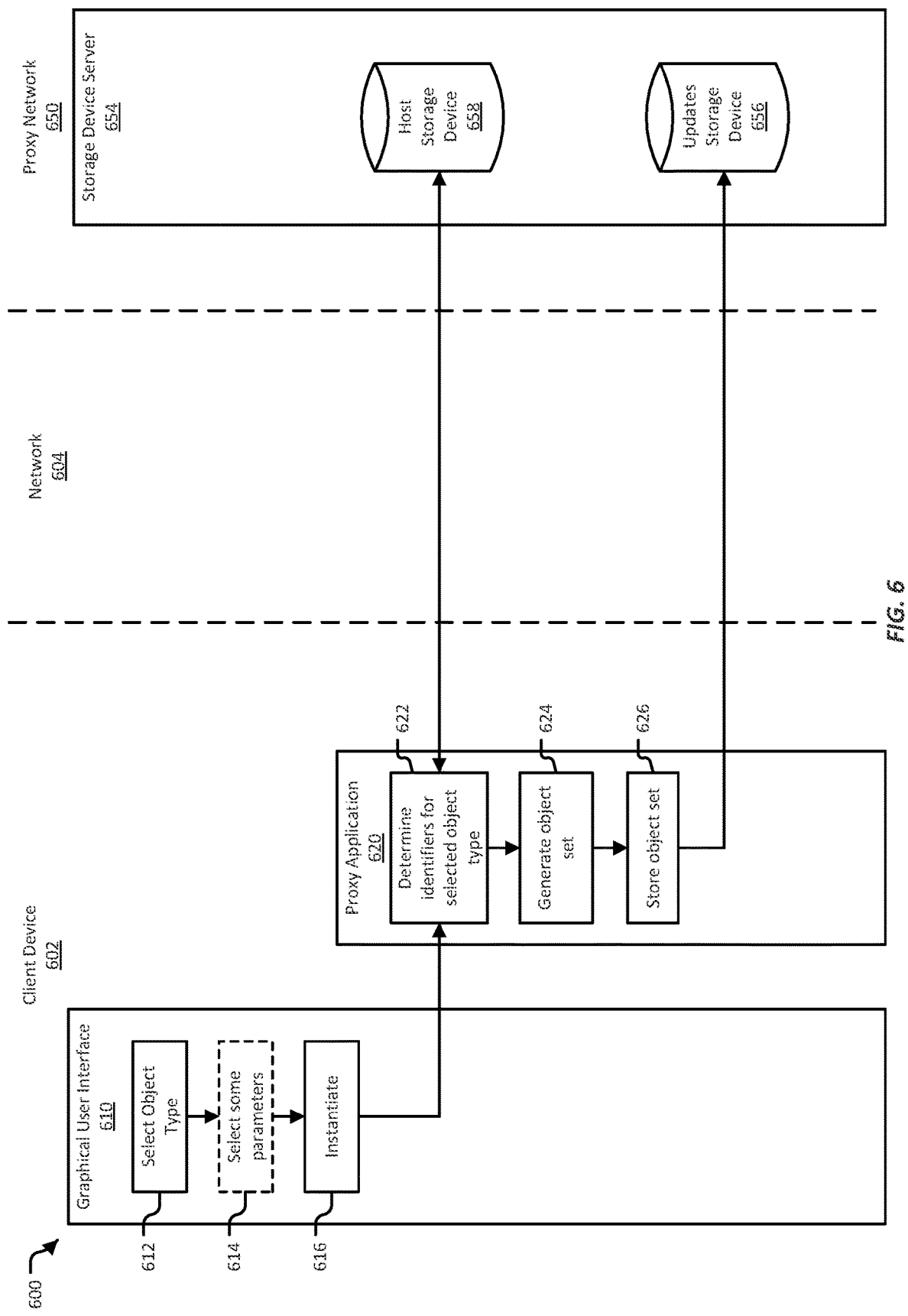
FIG. 6 illustrates an example of the process for representing one or more objects using an object set.

FIG. 6 illustrates an example of the process 600 for representing one or more objects using an object set, so that the objects in the object set can be retrieved and identified. The example process 600 includes a client device 602 in communication with an proxy network 650 over an intermediate network 604. The client device 602 can display a graphical user interface 610 provided by a host so that source devices can view and obtain the host's objects.

Using the graphical user interface 610, an instantiating source device can, at step 612, select an object type to view. The object type can encompass an object that the instantiating source device wants to have updated, but for which the instantiating source device may want to select the exact parameters. At step 614, the instantiating source device can optionally select values for at least some variable parameters associated with the object type. Step 612 is optional, however, and the instantiating source device can leave all variable parameters unspecified. Once satisfied with the selection of the object type and possibly any parameter values, the instantiating source device can, at step 616, initiate a suspended update for the objects that can be described by selected object type and parameter values.

The initiation of the suspended update can be received by an proxy application 620 executing on the client device 602. As discussed above, the proxy application 620 can be launched by or on behalf of the proxy network 650. In some implementations, some or all of the operations illustrated in this example as executed by the proxy application 620 can alternatively or additionally be executed by servers within the proxy network 650.

At step 622, the proxy application can determine object identifiers for the objects that correspond to the object type and any specified parameter values. In some implementations, the proxy application 620 can, for example, query an appropriate host storage device 658 in the proxy network 650. In this example, the appropriate host storage device 658 is one that stores information for the host of the graphical user interface 610. The host storage device 658 can provide the object identifiers and/or other information about the selected objects. In some implementations, a storage device server 654 in the proxy network 650 can be configured to control queries to, and responses from, the host storage device 658. In some implementations, the proxy application 620 can, alternatively or additionally, query the host network for object identifiers that correspond to the selected objects.

In some implementations, the proxy application 620 can, at step 622, also verify whether each of the selected objects is available. For example, the proxy application 620 can query the host storage device 658 in the proxy network 650 or query the host network to determine whether the host's object storage device has the selected objects available for updating. In some implementations, the proxy application 620 can include an object's current availability in an object set.

At step 624, the proxy application 620 can generate an object set that can represent the object or objects that correspond to the object identifiers determined at step 622. As discussed above, the object set can record or encode the object identifiers and/or other information about the corresponding objects. In some implementations, the proxy application 620 can also generate an object set identifier for the object set, which the proxy network 650 can use to reference the object set. In some implementations, the proxy application 620 can request an object set identifier from the proxy network 550.

At step 626, the proxy application can store the object set in the updates storage device 656 operated by the proxy network 650. In some implementations, a storage device server 654 of the proxy network 650 can control storing of the object set. In some implementations, additional information can be stored with the object set, as discussed further below.

As discussed above, before a host will finish an update of the host's object storage device, the host may require that an equivalent of a terminal result be transferred to the host. The terminal result can be, for example, a sum of the numerical counters for selected objects, one or more fractional counters that the host will transfer to other parties, and/or, when the selected objects will be transmitted to a source device, a transmission counter.

In many cases, the instantiating source device of a suspended storage device update provides the terminal data for finalizing the update once the terminating source device has reduced an object set associated with the suspected storage device update to one or more specific objects. The terminal result that the instantiating source device is committing to may need to be known at the time that the instantiating source device initiates the suspended storage device update. For example, the instantiating source device may need to know the terminal result or the terminal result may need to be reserved from the source device's counter transfer source. But because the specific objects that will be updated may not be known at the time the instantiating source device initiates the suspended storage device update, the host may not be able to generate the terminal result at this time. For example, each of the objects in the object set associated with the suspended storage device update may have a different numerical counter, and without the numerical counter, any fractional counters cannot be computed. Additionally, the instantiating source device may not be able to provide a destination address to which objects are to be transmitted, in which case the host may not be able to determine a transmission counter.

Figure 7:
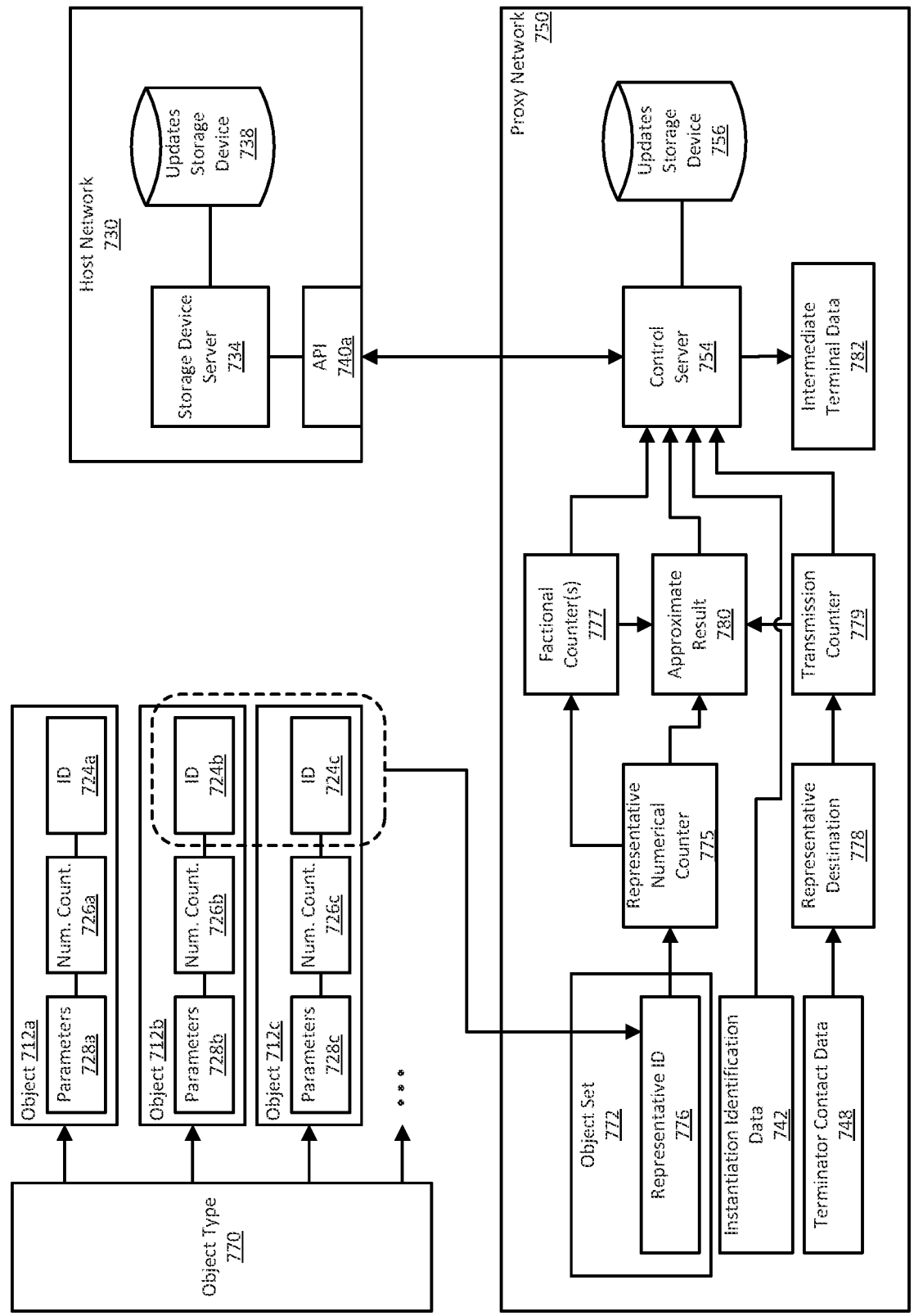
FIG. 7 illustrates an example of an proxy network and mechanisms the proxy network can use to determine an approximate sum.

In these and other cases, an proxy network can include mechanisms for determining an approximated result. FIG. 7 illustrates an example of an proxy network 750 and mechanisms the proxy network 750 can use to determine an approximated result 780. The approximated result 780, along with an associated object set 772, can, in some implementations, form components of a suspended storage device update, which can be stored in an updates storage device 756 operated by the proxy network 750. In some implementations, a server, such as a control server 754, of the proxy network 750 can implement the mechanisms illustrated in FIG. 6 and discussed below.

As discussed previously, an instantiating source device can select an object type 770, which can describe one or more objects 712a-712c. Each object includes a set of parameters 728a-728b that can describe each object 712a-712c. Some of the parameters can be fixed, such that each of the objects 712a-712c have the same value for the parameters. Some parameters can be variable, such that some of the objects 712a-712c have different values for the parameters. The objects 712a-712c can further include a numerical counter 726a-726c, which describes a number assigned to each object 712a-712c by the host. The objects 712a-712c can also include an object identifier 724a-724c, which the host can use to identify each object 712a-712c. In some cases, the object identifiers 724a-724c are associated a particular configuration of parameters 728a-728b, so that every object that has the same set of parameter values has the same object identifier.

The instantiating source device's selection of parameter values can correspond to a set of objects 712b-712c from among all objects that can be described by the selected object type 770. In some implementations, the proxy network 750 can generate an object set 772 to describe this set of objects 712b-712c.

In some implementations, in order to determine an approximated result 780, the proxy network 750 can determine a representative identifier 776 for the object set 772. The representative identifier 776 is an object identifier that is representative of the objects 712b-712c that are described by the object set 772. For example, in the illustrated example, the object set 772 encompasses two of the objects that are associated with the object type 770. In this example, the proxy network 750 can examine the object identifiers 724b-724c for the two objects 712b-712c and can select the object identifier 724b-724c of the object 712b-712c that best represents all of the objects 712b-712c. For example, the first object's object identifier 724b may best represent both objects 712b-712c. "Best represents," in this context, can mean that the selected object 712b has a set of parameters 728b that are the most common among the objects 712b-712c described by the object set 772. Alternatively or additionally, the first object 712a may have a numerical counter 726b that is the average counter from among the numerical counters 726b-726c for the objects 712b-712c described by the object set 772. Alternatively or additionally, the numerical counter 726b may be the median counter from among the numerical counters 726b-726c, or can be the most common. Alternatively or additionally, the two objects 712b-712c may have the same numerical counter 726b-726c, in which case the object identifier 724b of the first of the two objects 712b-712c may be select on a random basis, because the object identifiers 724b has a higher counter, because the object identifiers 724b has a lower counter, or for some other reason. In some cases, the representative identifier 776 may be for an object that is not within the set of objects 712b-712c described by the object set 772, but that nevertheless has parameters and/or a numerical counter that are the most common or average from among the group of objects 712b-712c. For example, the representative identifier 776 may be the identifier 724a for the first object 712a illustrated in the example of FIG. 7. In some implementations, the proxy network 750 can use the representative identifier 776 as the object set identifier for the object set 772. In some implementations, the representative identifier 776 and the object set identifier are different.

In some implementations, the proxy network 750 can use the representative identifier 776 to also determine a representative numerical counter 775. The representative numerical counter 775 can stand in for the numerical counter of an object in determining the approximated result 780. The representative numerical counter 775 can be, for example, the numerical counter 726b-726c of the object 712b-712c whose object identifier 724b-724c was selected as the representative identifier 776. Alternatively, the representative numerical counter 776 can be the average of the numerical counters 726b-726c for the objects 712b-712c in the object set 772. Alternatively, the representative numerical counter 775 can be the highest, lowest, median, or most common counter from among the numerical counters 726b-726c. In some implementations, the proxy network 750 can present the representative numerical counter 775 to the instantiating source device, using the displays injected into the host's graphical user interface. The representative numerical counter 775 can be a component of the approximated result 780.

In some implementations, the proxy network 750 can determine the representative numerical counter 775 independently from the representative identifier 776. For example, the representative numerical counter 775 can be an actual average counter from among the numerical counters 726b-726c for the objects 712b-712c in the object set 772. As another example, the representative numerical counter 775 can be an actual highest, actual lowest, or actual median counter from among the numerical counters 726b-726c. Alternatively, as another example, the representative numerical counter 775 can be computed or determined using the numerical counters 726a-726b of all the objects 712a-712c that can be described by the object type 770.

In some implementations, the proxy network 750 can use the representative numerical counter 775 to determine one or more fractional counters 777. In some cases, the suspended storage device update, when finished, can result in fractional counters 777 being transferred to other entities. Frequently, a fractional counter 777 can be determined using publically available or established tables, and can be based on the representative numerical counter 775. For example, the fractional counter 777 can be 8.25% of the representative numerical counter 775. The fractional counter 777 can alternatively or additionally be based on the instantiating source device's location or the terminating source device's location. For example, the fractional counter 777 can be associated with the instantiating source device's city or state. In these and other examples, in some implementations, the proxy network 750 can determine the fractional counter 777 using the instantiation identification data 742, supplied by the instantiating source device through displays inserted into the host's graphical user interface. The proxy network 750 can further present the fractional counter 777 to the instantiating source device, using the inserted displays.

Alternatively or additionally, in some implementations, the control server 754 can request fractional counters 777 from the host network 730. For example, the control server 754 can transmit the representative numerical counter 775 and the instantiation identification data 742 to the host network 730 using an API 740a of the host network 730. Internally, the host network 730 can compute the fractional counter 777 using, for example, location-based data stored in the host network's updates storage device 738. In some implementations, a system such as the storage device server 734 operated in the host network 730 can determine the fractional counter 777.

In addition to any fractional counters 777, in some cases a transmission counter 779 can also be added to the representative numerical counter 775. The transmission counter 779 can be transferred to an entity that will transmit an object from the host and to a recipient. The transmission counter 779 can be based on the location to which the object will be transmitted. In some implementations, the proxy network 750 can use terminator contact data 748 to approximate the transmission counter 779, where the terminator contact data 748 is provided by the instantiating source device through displays injected into the host's graphical user interface. As an example, when the terminator contact data 748 includes a precise address, the proxy network 750 can compute the transmission counter 779 using the precise address. Alternatively or additionally, the proxy network 750 can send the precise address the host network 730, for example using an API 740a of the host network 730, for the host to compute and return the transmission counter 779. Since the host may better be able to determine the transmission path of the object, the host may be able to more accurately compute the transmission counter 779.

Sometimes, however, the terminator contact data 748 may not include a precise address. In these cases, the proxy network 750 can instead determine a representative destination 778. The representative destination 778 can approximate the destination to which to transmit the object. The proxy network 750 can use whatever location data is available in the terminator contact data 748 (e.g., an email address, the domain name of an email address, a assembly network identifier, etc.). Alternatively or additionally, the proxy network 750 can use the terminator contact data 748 to search public storage devices for an approximate location of the terminating source device. In some cases, the representative destination 778 may be relatively precise, such as precise address, while in other cases the representative destination 778 may be general, such as a city, state, or country.

In some implementations, the proxy network 750 can use the representative destination 778 to determine the transmission counter 779. For example, the transmission counter 779 can be based on standardized tables provided by transmitting entities. Such tables can provide the transmission counter 779, given the transmission path to be taken by an object. Alternatively or additionally, the proxy network 750 can provide the representative destination 778 to the host network 730, for the host network to determine the transmission counter 779. In some implementations, the proxy network 750 can provide the transmission counter 779 to the instantiating source device.

In some implementations, any fractional counters 777 and/or transmission counter 779 can be added to the approximated result 780. This approximated result 780 can be presented the instantiating source device, using displays inserted in the host's graphical user interface. In some implementations, the instantiating source device must agree to the approximated result 780 before the instantiating source device can initiate the suspended storage device update. In some implementations, the approximated result 780 becomes locked in once the instantiating source device has agreed to it, in which case the approximated result 780 will be the counter that will be transferred from the instantiating source device upon terminal of the suspended storage device update. That is, as discussed further below, though the actual terminal result of an object that is selected by a terminating source device may be different from the approximated result 780, in these implementations the proxy network 750 will accommodate the difference, and no more or less than the approximated result 780 will be transferred from the instantiating source device.

The approximated result 780 can be stored in the intermediate terminal data 782. Other information, such as the instantiation identification data 742 and terminator contact data 748, can also be stored in the intermediate terminal data 782. In some cases, the representative numerical counter 775, any fraction counters 777, and the transmission counter 779 can be separately stored in the intermediate terminal data 782. The representative destination 778 can also be stored in the intermediate terminal data 782. The intermediate terminal data 782 can be associated with the object set 772 to form a suspended storage device update. The suspended storage device update can be stored in the updates storage device 756 operated by the proxy network 750.

Figure 8:
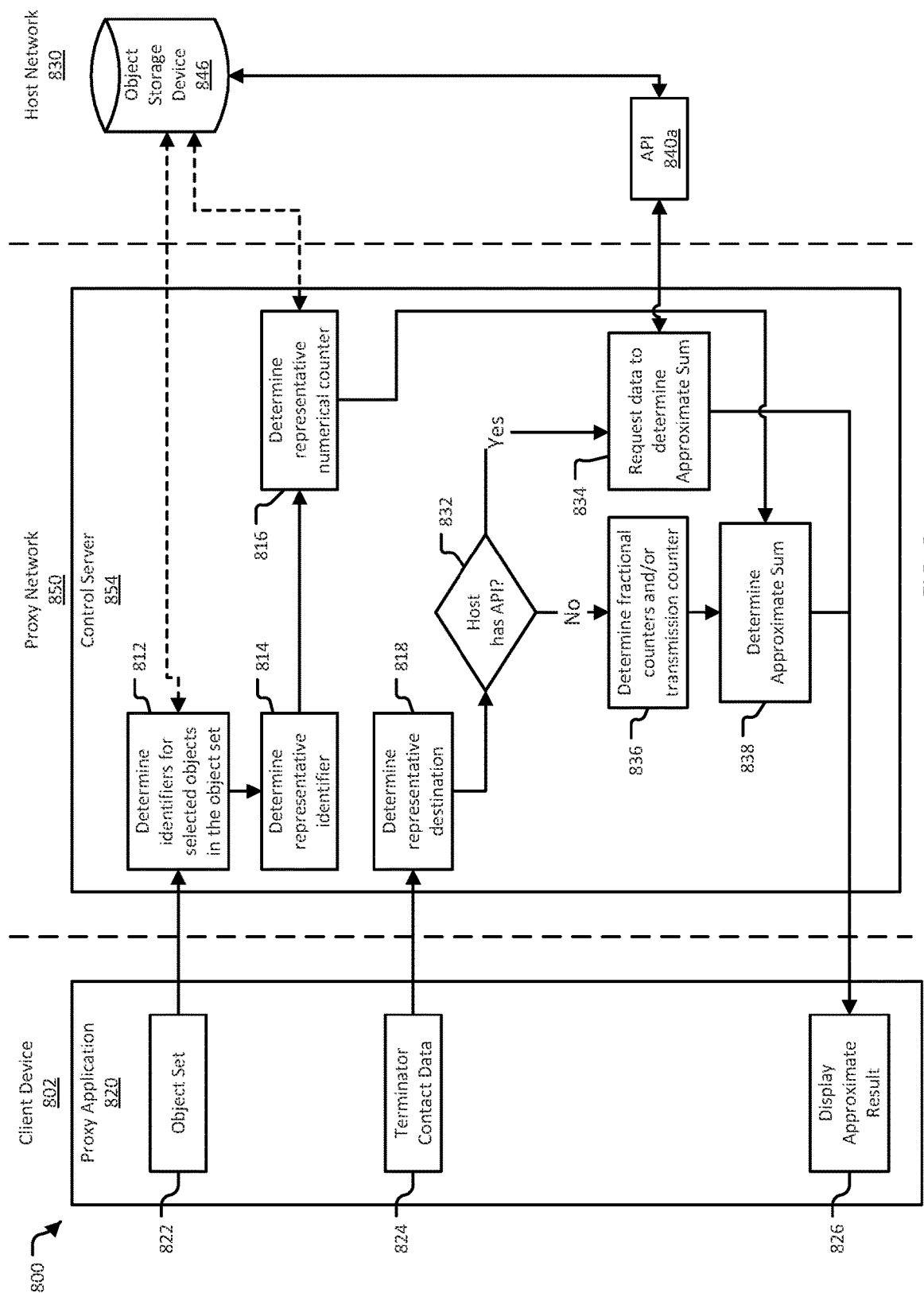
FIG. 8 illustrates an example of a process for determining intermediate terminal data.

FIG. 8 illustrates an example of a process 800 for determining intermediate terminal data. In some implementations, the example process 800 includes steps executed at a client device 802 in communication with an proxy network 850. The proxy network 850 can also be in communication with a host network 830. In some implementations, the host network 830 can provide a graphical user interface, not illustrated here, on the client device 802. The graphical user interface can cause source devices to initiate storage device updates of the host's object storage device 846 in order to obtain the host's objects.

In some implementations, the proxy network 850 can cause an proxy application 820 to execute on the client device 802. As discussed above, the proxy application 820 can cause an instantiating source device to initiate a suspended storage device update, where the instantiating source device might not specify specific objects to update in the host's object storage device 846, and can leave the task of specifying the objects to a terminating source device. In some implementations, the proxy application 820 is controlled by and/or communicates with a control server 854 in the proxy network 850.

In the example process, at step 822, the instantiating source device can specify an object set using the proxy application 820. For example, as discussed above, the instantiating source device can select an object type and leave variable parameters associated with the object type unspecified. The resulting set of variable parameters, along with any fixed parameters, can encompass one or more objects that can be described by the object type. In some implementations, the control server 854 can treat these objects as an object set.

At step 812, the control server 854 can determine object identifiers for the objects that fall within the object set. As noted above, objects in the host's object storage device 846 can be located in the object storage device 846 using an object identifier. At step 812, the control server 854 can determine which objects correspond to the object set determined at step 822, and further can determine the host's object identifiers for these objects. In some implementations, the control server 854 can communicate with the host network 830, and obtain the object identifiers from the host's object storage device 846. In some implementations the control server 854 can obtain the object identifiers from object data stored in the proxy network 850.

At step 814, the control server 854 can determine a representative identifier. As discussed above, the representative identifier can be an object identifier for an object that best represents the objects in the object set. In some cases, the representative identifier corresponds to an object in the object set. In some cases, the representative identifier corresponds to an object that is not in the object set.

At step 816, the control server 854 can determine a representative numerical counter. As discussed above, the representative numerical counter can represent the numerical counters of the objects in the object set. For example, the representative numerical counter can be an average, a median, a highest, or a lowest counter from among the numerical counters of the objects in the object set. In some implementations, the control server 854 can communicate with the host network 830 to obtain object information for determining the representative numerical counter. In some implementations, the control server 854 can determine the representative numerical counter using object data stored in the proxy network 850.

Returning to the client device 802, at step 824, the proxy application 820 can receive as input terminator contact data. As discussed above, the terminator contact data can include information that the proxy network 850 can use to inform a terminating source device that the suspended storage device update has been initiated. In some cases, the terminator contact data includes a destination to which an object form the object storage device 846 can be transmitted once the suspended storage device update is finished. In some cases, the destination information in the terminator contact data is sufficient to transmit an object. In some cases, the terminator contact data does not include a destination address to which an object can be transmitted. In these cases, the control server 854 can, at step 816, determine a representative destination. As discussed above, the representative destination can be based on the data provided for contacting the terminating source device, information obtainable from service hosts (e.g., email hosts, assembly network hosts, etc.), and/or public records. The representative destination can include can include a precise destination (e.g., one that can receive an object), or a generalized destination, such as geographical region.

At step 832, the control server 854 can determine whether the host network 830 has an API 840*a* that is accessible to the proxy network 850. In some implementations, the host network 830 can provide an API 840*a* that other networks, such as the proxy network 850, can use to obtain data related to object storage device 846 updates. For example, when the host network 830 has an API 840*a*, then, at step 834, the control server 854 can request data to determine an approximated result. The API 840*a* can, for example include functions that cause the control server 854 to provide the representative numerical counter (determined at step 816) and/or the representative destination (determined at step 818) to the host network 830. Through the API 840*a*, the host network 830 can respond with the approximated result, where the approximated result may include one or more factional counters and/or a transmission counter.

Returning to step 832, when the control server 854 determines that the host network 830 does not have an API 840*a*, at step 836, the control server 854 can itself determine any fractional counters and/or any transmission counter. The control server 854 can, for example, use information such as the instantiating source device's location and charts or tables to determine any fractional counters. As a further example, the control server 854 can use the representative destination to estimate the transmission counter. Alternatively or additionally, the control server 854 can use charts or tables provided by transmitters to determine a transmission counter. In some cases, the transmission counter may be based on the representative numerical counter. In some cases, the transmission counter is based on the sum of the representative numerical counter and any fractional counters. In some cases, a fractional counter may be based on the sum of the representative numerical counter and the transmission counter.

Having determined any fractional counters and/or transmission counters, the control server 854 can, at step 838, determine an approximated result. Generally, the approximated result is the sum of the representative numerical counter, any fractional counters, and/or a transmission counter. At step 826, the control server 854 can cause the approximated result to be displayed to the instantiating source device. In some implementations, the instantiating source device can be informed that, when the suspended storage device update is finished, the approximated result will be transferred from the instantiating source device's counter transfer source to the host. When the instantiating source device agrees to the approximated result, the suspended storage device update is initiated.

In some implementations, at the time the suspended storage device update is initiated, an equivalent of the approximated result can be transferred from the counter transfer source specified the instantiating source device to a destination specified by the proxy network 850. In these implementations, the proxy network 850 can temporarily hold the transferred counter, and transfer the counter to the host network 830 when the suspended storage device update is finished. In some implementations, the proxy network 850 can use the transferred counter to obtain a pre-set counter from the host network 830. A pre-set counter is not associated with any particular object, and can be used in place of a counter transfer source when updating an object in the host's object storage device 846 (in some cases, in conjunction with a counter transfer source). In some cases, the pre-set counter is associated with the host network 830. In some cases, the pre-set counter is associated with a type or class of objects. In some implementations, a pre-set counter can be associated with an identifier or code that the host network 830 can use to identify a pre-set counter, and/or to control the use of the pre-set counter. In some cases, pre-set counters have a timeout counter, measured in days, weeks, months or possibly years, after which the pre-set counter becomes invalid.

In some implementations, the equivalent of the approximated result is transferred from instantiating source device's counter transfer source only when the suspended storage device update is finished.

Once a suspended storage device update has been initiated, a terminating source device can be notified of the suspended storage device update, so that the terminating source device can complete the information needed for the suspended storage device update. The terminating source device can further cause the suspended storage device update to be finished.

Figure 9:
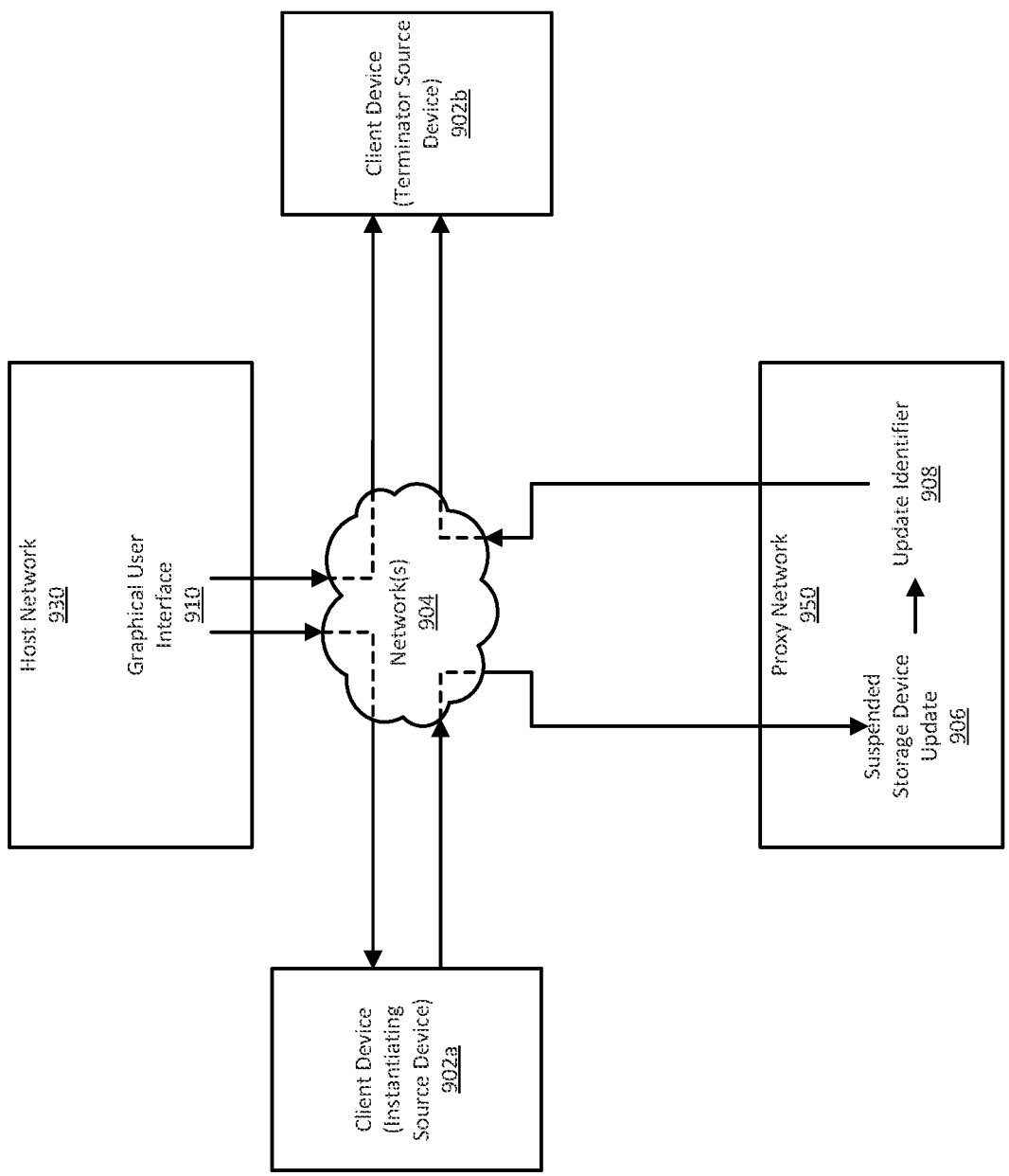
FIG. 9 illustrates an example of communications between an instantiating source device's client device, a host network, an proxy network, and a terminating source device's client device.

FIG. 9 illustrates an example of communications between an instantiating source device's client device 902*a*, a host network 930, an proxy network 950, and a terminating source device's client device 902*b*. As discussed above, the host network 930 can generate a graphical user interface 910 on the instantiating source device's client device 902*a*. In some implementations, the host network 930 can generate code, text, and/or graphics for the graphical user interface 910 to the instantiating source device's client device 902a over one or more networks 904. As also discussed above, the proxy network 950 can insert displays into the graphical user interface 910, over other networks 904. Using the displays, the instantiating source device can initiate a suspended storage device update 906, which can be stored in the proxy network 950.

When the suspended storage device update 906 is initiated, proxy network 950 can generate an identifier for the suspended storage device update 906, referred to herein as update identifier 908. The update identifier 908 can be an alphanumeric string, a bar code or QR code, an encoded or encrypted value, and/or a link, such as a pointer to a location on the Internet. In some implementations, the proxy network 950 can use the update identifier 908 to locate the suspended storage device update in an updates storage device of the proxy network 950.

In some implementations, the proxy network 950 can send the update identifier 908 in a notification to the terminating source device. The notification can include other information, such as information identifying the initiator, a description of the object set associated with the suspended storage device update, a message from the initiator, and/or a message generated by the proxy network 950. In some implementations, the notification can be sent as soon as the suspended storage device update is initiated. In some implementations, the notification can be sent on a specific date and/or at a specific time.

In some implementations, the proxy network can use terminator contact data to send the notification, including the update identifier 908, to the terminating source device. As discussed above, the terminator contact data can include a physical address, a virtual address, an email address, a source device name, a source device data set identifier, or a pointer to an source device data set, such as a source device data set for a gaming or assembly network service. The terminating source device can receive the notification at the terminating source device's client device 902b. In some cases, the terminating source device's client device 902b is the same device as the instantiating source device's client device 902a.

In some cases, the terminating source device may not respond to the notification. In these cases, in some implementations, the proxy network 950 can be configured to periodically resend the notification. For example, the proxy network 950 can resend the notification every day, once a week, after a month, or after some other time interval. In some implementations, after a predetermined period of time has passed, during which the terminating source device has not used the update identifier 908, the proxy network 950 may cancel the suspended storage device update. That is, the proxy network 950 can remove the suspended storage device update from the proxy network's updates storage device, can release any counters locked with the host, and/or can notify the instantiating source device that the suspended storage device update has been terminated without having been finished. In some cases, an equivalent to an approximated result associated with the suspended storage device update can also be returned to the instantiating source device.

When the terminating source device does respond to the notification, in some implementations, the terminating source device can use the update identifier 908 in the notification to navigate the terminating source device's client device 902b to the host's graphical user interface 910. For example, the update identifier 908 can include a link, a script, an executable, or some other method for launching the graphical user interface 910 or otherwise presenting the graphical user interface 910 on the terminating source device's client device 902b. In some implementations, the terminating source device can independently navigate to the host's graphical user interface 910, and can enter the update identifier 908 to gain access to the suspended storage device update.

Figure 10A:
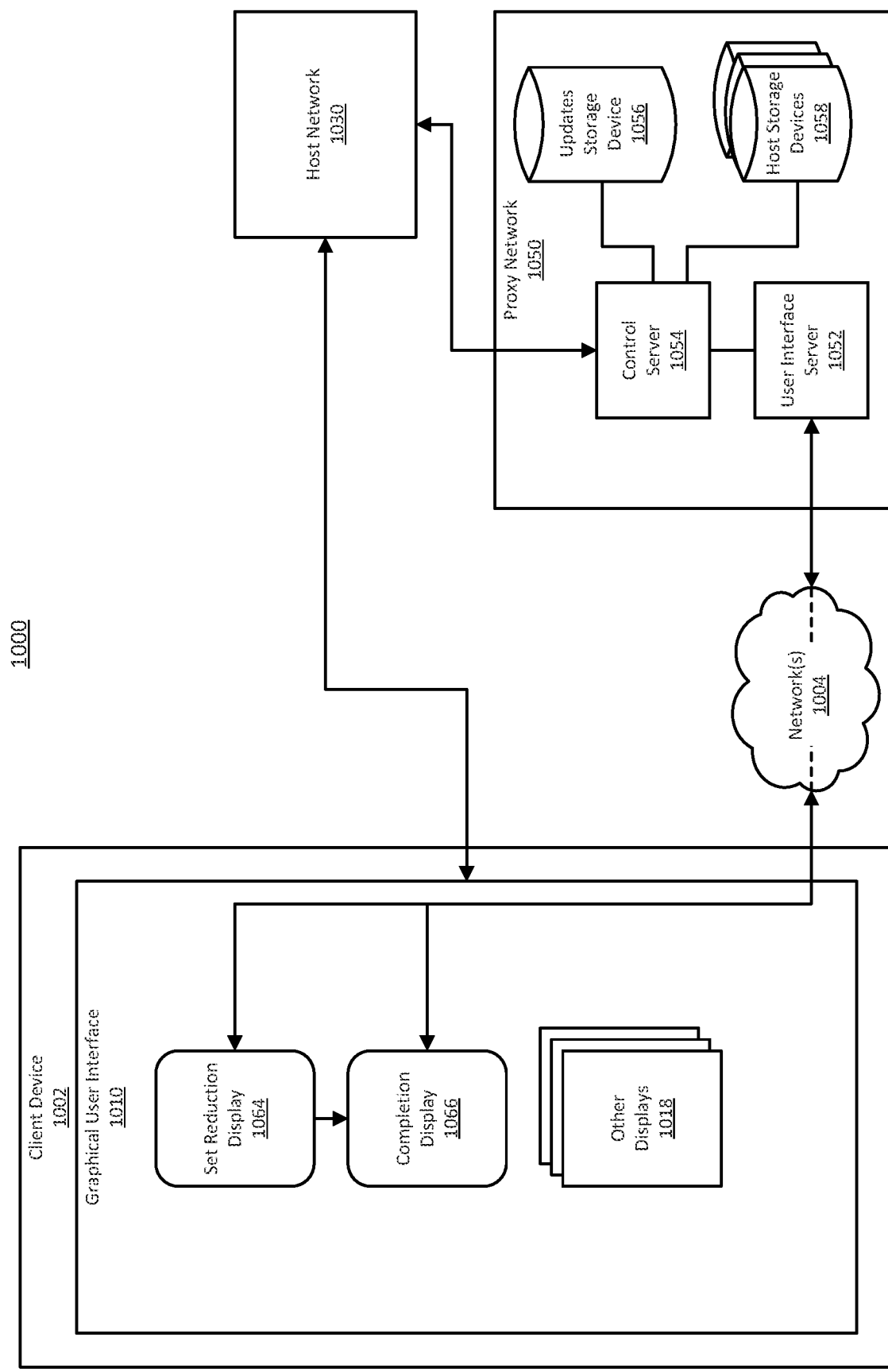
FIGS. 10A-10B illustrate an example of a system in which an proxy network can cause a terminating source device to finish a suspended storage device update for an object in an object storage device of a host network.
Figure 10B:
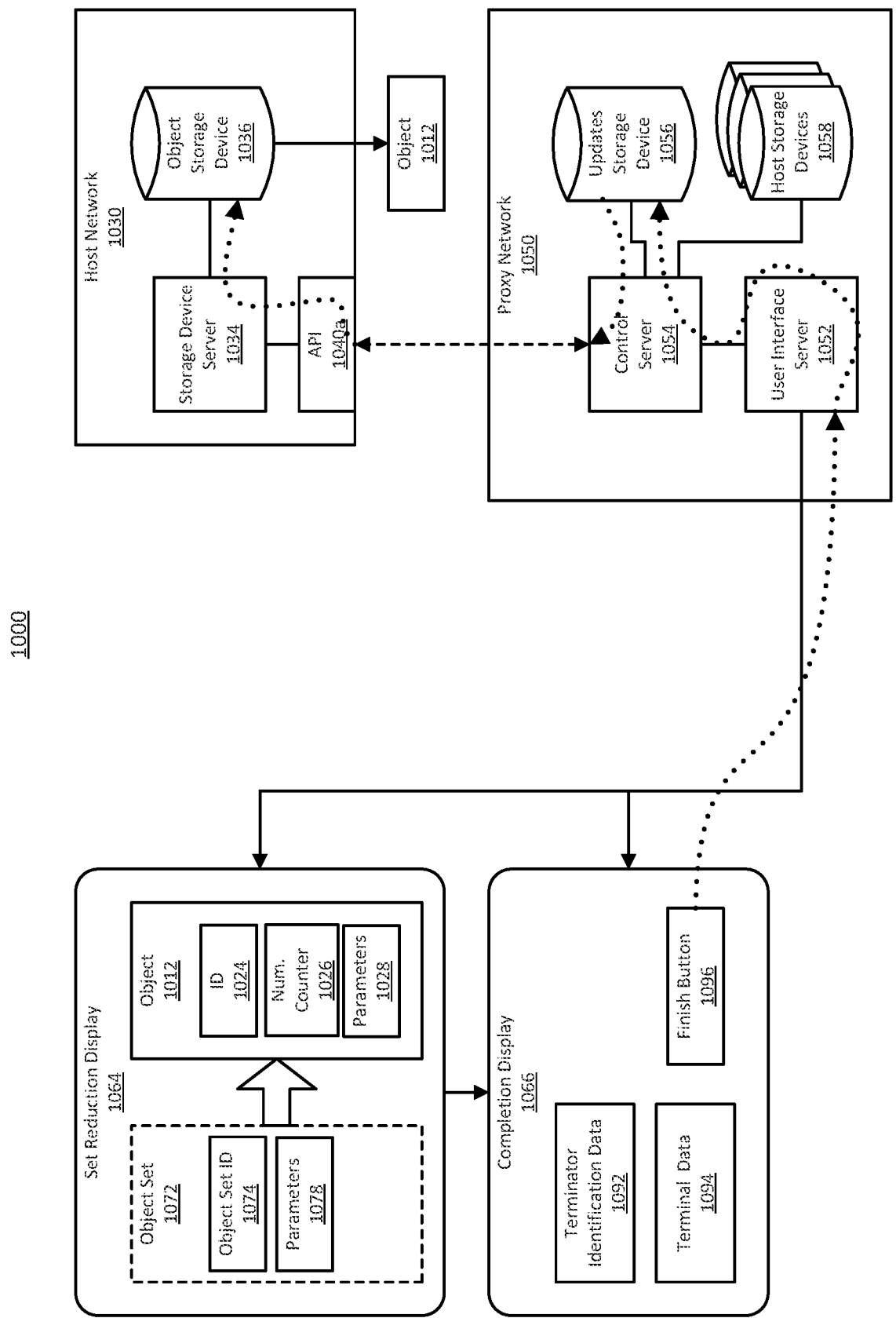

When the terminating source device uses an update identifier to navigate to a host's the graphical user interface, in some implementations, the proxy network can inject displays into the graphical user interface, where the displays cause the terminating source device to finish the suspended storage device update. FIGS. 10A-10B illustrate an example of a system 1000 in which an proxy network 1050 can cause a terminating source device finish a suspended storage device update for an object in an object storage device 1036 of a host network 1030. As illustrated in FIG. 10A, the system 1000 includes a host network 1030 that can provide a graphical user interface 1010 on a client device 1002. The client device 1002 can cause source devices of the client device 1002 to view and select objects from the host's object storage device, and to affect updates and transmission of the selected objects.

As noted above, the update identifier can be an link, script, program, or executable, which, when activated, can cause the graphical user interface 1010 to be launched or loaded on the client device 1002. Alternatively or additionally, the update identifier can be a code that can be entered into a field provided by the graphical user interface 1010. Alternatively or additionally, the update identifier can be a barcode or QR code that, when scanned, can launch or load the graphical user interface 1010. In some implementations, activation, input, scanning, or some other use of the update identifier can notify the proxy network 1050 that the update identifier has been activated, upon which the proxy network 1050 can inject displays into the graphical user interface 1010. Alternatively or additionally, in some implementations, the terminating source device can activate or load the graphical user interface 1010 without using the update identifier. In these implementations, the graphical user interface 1010 can include a field into which the terminating source device can enter the update identifier.

The displays injected into the graphical user interface 1010 can give the terminating source device access to the suspended storage device update that is associated with the update identifier. Using the injected displays, the terminating source device can provide information that the instantiating source device did not provide, such as parameter values and/or additional terminal data. The terminating source device's input can make the suspended storage device update "complete;" that is, together with the instantiating source device's inputs, the proxy network 1050 may have enough information to finish or execute an update of the host's object storage device 1036.

The injected displays can include a set reduction display 1064 and a completion display 1066. In some implementations, the set reduction display 1064 and the completion display 1066 can be combined into one display, or can be subdivided into sub-displays. To inject or insert the displays into the graphical user interface 1010, in some implementations, the proxy network 1050 can include a source device interface server 1052. The source device interface server 1052 can, for example, identify a host storage device from among host storage devices 1058 for multiple hosts. The host storage device can include graphical elements, text, layouts, and other information that the source device interface server 1052 can use to generate displays that match or coordinate with the look and feel of the graphical user interface 1010, so that the injected displays integrate seamlessly into the graphical user interface 1010. In some implementations, the proxy network 1050 communicates with the client device 1002 over one or more intermediate networks 1004.

The set reduction display 1064 can be configured to display the object set that was selected by the instantiating source device. In cases where the instantiating source device selected multiple object sets, each of the multiple object sets may be displayed at the same time, the multiple object sets may be displayed in groups, or the terminating source device may be able to view each object set individually. The set reduction display 1064 can include other information, such as a textual and/or visual description of the objects in an object set, some of the instantiation identification data, a message from the instantiating source device, a message from the host, a description of other objects that may be related to the objects in the object set, and so on. In many cases, some information can be withheld or hidden. For example, numerical counters of objects in the object set may be not displayed. As another example, the approximated result computed for the suspended storage device update, and any counters that may be included in the approximated result, may not be displayed. In some implementations, the instantiating source device may want to remain anonymous, in which case only a message from the instantiating source device, an alias for the instantiating source device, or no information about the instantiating source device may be displayed.

To populate the set reduction display 1064, in some implementations, the proxy network 1050 can include a control server 1054 that can look up the suspended storage device update in an updates storage device 1056 operated by the proxy network 1050. In some implementations, the control server 1054 and the source device interface server 1052 can be implemented using one physical sever or multiple physical servers. The control server 1054 can find the suspended storage device update using, for example, the update identifier. The control server 1054 can provide information in the suspended storage device update to the source device interface server 1052, such as textual and/or graphical information that the source device interface server 1052 can use to display an object set in the set reduction display 1064.

The set reduction display 1064 can direct the terminating source device to select values for parameters associated with an object set, in order to reduce the object set to a specific object. In some implementations, the terminating source device can change variable parameters for which the instantiating source device has selected counters. In some implementations, the terminating source device can add other objects to the set reduction display 1064, for example by navigating to object displays and other displays 1018 provided natively (e.g., not by the proxy network 1050) by the graphical user interface 1010. In these implementations, when the sum of the numerical counter of the additional objects is greater than the approximated result for the object set, the terminating source device may be prompted (for example, in the completion display 1066) to provide a counter transfer source, from which an equivalent to the additional numerical counter can be transferred to the host. That is, the terminating source device may be responsible for any additional numerical counter of the additional objects. Alternatively or additionally, in some implementations, the proxy network 1050 may send a notification to the instantiating source device, so that the instantiating source device can be responsible for the additional numerical counter. In these implementations, the instantiating source device can be prompted to approve of the additional numerical counter before the instantiating source device commits to the additional numerical counter.

In some implementations, the terminating source device can reject an entire object set. For example, the object set may include no objects that meet the terminating source device's requirements. In these implementations, the terminating source device may be able to cancel the suspended storage device update. When the terminating source device cancels the suspended storage device update, the instantiating source device can be notified. In some implementations, the instantiating source device can cause the suspended storage device update can be removed from the proxy network's updates storage device 1056, or can select a different object set. In some cases, when the suspended storage device update is canceled, the approximated result for the suspended storage device update can be returned to the instantiating source device.

In some implementations, instead of canceling the suspended storage device update, the terminating source device can navigate to object displays and other displays 1018 provided natively (e.g., not by the proxy network 1050) by the graphical user interface 1010, to select new objects. In these implementations, the proxy network 1050 may notify the terminating source device when the sum of the numerical counters for new objects the terminating source device is selecting exceeds the approximated result originally associated with the suspended storage device update. When the numerical counters of the new objects exceeds the approximated result, the terminating source device can be prompted to provide a counter transfer source from which to transfer an equivalent of the additional counter, and/or the additional counter can be requested from the instantiating source device.

When selecting new objects, in some implementations, the terminating source device can be presented with a modified version of the set reduction display 1064. Instead of displaying the object set or sets that were selected by the instantiating source device, the set reduction display 1064 can instead display the new objects. In some implementations, the new objects can be displayed with the terminating source device's selection of parameter values and/or with the numerical counter of the new objects. In some implementations, the approximated result for the suspended storage device update may now be displayed, so that the terminating source device can be informed that the sum of the numerical counters of the new objects exceeds the approximated result.

When the terminating source device is satisfied with the objects in the set reduction display 1064, the terminating source device can initiate terminal of the suspended storage device update, for example by activating a button (not illustrated here) in the set reduction display 1064. The terminating source device can then be presented with the completion display 1066. In the completion display 1066, the terminating source device can provide any additional information that may be needed to finish the suspended storage device update. This additional information can include, for example, identification information for the terminating source device. When the object or objects selected by the terminating source device are to be transmitted, the additional information can include a destination for the objects.

Once the terminating source device has provided any information requested in the completion display 1066, the terminating source device can finish the suspended storage device update, for example by activating a finish button (not illustrated here) in the completion display 1066. The terminating source device's information and object selections can be obtained from the completion display 1066 and be transmitted to the proxy network's control server 1054. The control server 1054 can then communicate with the host network 1030 in order to cause an actual update of the host's object storage device. In some cases, the host network 1030 can include an API through which the proxy network 1050 can effectuate the storage device update. When the host network 1030 does not include an API, the proxy network 1050 can use other mechanisms, discussed further below.

Once the host's object storage device has been updated, the suspended storage device update is considered done. In some implementations, the proxy network 1050 can generate a notification to the instantiating source device to inform the instantiating source device that the suspended storage device update has been executed. In some implementations, the proxy network 1050 can subsequently remove the suspended storage device update form the updates storage device 1056.

FIG. 10B illustrates in greater detail an example of the set reduction display 1064 and the completion display 1066. FIG. 10B also illustrates an example of communication between the proxy network 1050 and the host network 1030 for translating a suspended storage device update into an actual update of the host's updates storage device 1038.

As noted above, the set reduction display 1064 can display an object set 1072 selected by the instantiating source device of the suspended storage device update. When the suspended storage device updated includes multiple object sets, the set reduction display 1064 can display the multiple object sets either at the same time, sequentially, or using sub-displays. The display for the object set 1072 can include information about the object set 1072, such as the objects included in the object set 1072, a textual and/or visual description of the object set 1072, and/or parameters for the object set 1072. The object set 1072 can include an object set identifier 1074, which may or may not be displayed. In some implementations, the proxy network 1050 can use the object set identifier 1074 to identify the specific objects in the object set 1072, as discussed further below.

The parameters 1078 for the object set 1072 can include fixed parameters and/or variable parameters, where the variable parameters can be specified or unspecified. Fixed parameters include parameters that the host has determined cannot be changed. Variable parameters that have been specified have values that were selected by the instantiating source device. Variable parameters that are unspecified were left unspecified by the instantiating source device. As discussed above, a specific object can be described by a specified set of parameter values. The objects in the object set 1072 thus correspond to each of the objects that can be described by the different values that are possible for an unspecified parameter. In most cases, the possible values for a variable parameter are limited.

In some implementations, the terminating source device can be prompted to specify values for any unspecified parameters. By selecting values for the unspecified parameters, the terminating source device can reduce the object set 1072 to a specific object 1012. That is, the set reduction display 1064 can identify an object 1012 in the object set 1072 that has the parameters 1028 that are specified by the terminating source device. The object 1012 can have an object identifier 1024, a numerical counter 1026 and other information, such as a description and/or an illustration. The object identifier 1024 and numerical counter 1026 might not be displayed to the terminating source device.

As noted above, in some implementations, the terminating source device can reject the objects in the object set 1072, and select alternative objects. For example, the terminating source device can view object displays provided by the graphical user interface 1010, and add different objects to the set reduction display 1064. In some implementations, once the set reduction display 1064 has been activated, the proxy network 1050 can dynamically modify the host network's object displays, to hide some information. For example, the source device interface server 1052 can modify the object displays to remove any numerical counter associated with an object being displays. Alternatively or additionally, the source device interface server 1052 can replace a numerical counter with a difference between the numerical counter of the object being displayed and the representative numerical counter determined for the suspended storage device update. Alternatively or additionally, the source device interface server 1052 can emphasize or highlight objects that have a numerical counter that is equal to the representative numerical counter.

As another example, in some implementations, the proxy network 1050 can display alternative objects specified by the instantiating source device and/or related, associated, or correlating objects determined by the proxy network 1050. The set reduction display 1064 can be configured so that the terminating source device can select and add one or more of these objects to the set reduction display 1064.

In some implementations, the terminating source device can add other objects to the set reduction display 1064, instead of or in addition to rejecting the object set 1072. For example, the terminating source device can view object displays in the graphical user interface 1010. In some implementations, the proxy network 1050 can also hide information when the terminating source device is viewing object displays to add objects to the set reduction display 1064.

In some implementations, the terminating source device or can reject all the objects in the object set 1072, for example by removing the object set 1072 from the set reduction display 1064 or selecting a graphical element that indicates rejection. In some implementations, the terminating source device can reject the object set 1072 and cancel the suspended storage device update. For example, the set reduction display 1064 can include a button to cancel the suspended storage device update, or can assume the suspended storage device update will be canceled if all objects and object sets are removed from the set reduction display 1064. When the suspended storage device update is canceled, the proxy network 1050 can notify the instantiating source device and/or remove the suspended storage device update from the proxy network's updates storage device 1056.

When the terminating source device chooses to go forward with the suspended storage device update, the terminating source device can express this desire be activating a button (not illustrate here) that activates the completion display 1066. The completion display 1066 can prompt the terminating source devices for any additional information that may be required to finish the suspended storage device information. This additional information can include, for example, terminator identification data 1092 and/or terminal data 1094. The terminator identification data 1092 can include information that can be used to identify the terminating source device, such as a name, an email address, and/or a physical address, among other things. The terminal data 1094 can include any information needed to finish the suspended storage device update that may not have been provided by the instantiating source device. For example, the terminal data 1094 can include a destination (e.g., a physical address, an email address, a domain name, a source device data set, etc.) for the selected object 1012 when the object 1012 is to be transmitted.

When the terminating source device has added objects to the set reduction display 1064 and/or has selected objects that were not in the object set 1072, the terminal result of the objects in the set reduction display 1064 may be more than the approximated result that was computed for the suspended storage device update. In these situations, in some implementations, the terminal data 1094 can prompt the terminating source device to enter information identifying a counter transfer source, from which the difference between the terminal result and the approximated result can be transferred. In some implementations, the terminal data 1094 can include buttons or other elements that can cause the competing source device to request that the instantiating source device be responsible for the difference. In some implementations, the instantiating source device can specify, when initiating the suspended storage device update, that the instantiating source device will be responsible for any difference.

In some cases, the terminal result of the objects in the set reduction display 1064 may be less than the approximated result. In these cases, the completion display 1066 may prompt the terminating source device to add objects to the set reduction display 1064 until terminal result is equal to the approximated result. In some implementations, the completion display 1066 can include graphical elements through which the terminating source device can choose to receive the remaining counter as a pre-set counter, which can be used at a later time to obtain objects from the host. In some implementations, the terminating source device can choose to return the remaining counter to the instantiating source device.

Once the terminating source device has entered any required information into the completion display 1066, the terminating source device can finish the suspended storage device update by activating a finish button 1096 or similar graphical element included in the completion display 1066. When the finish button 1096 is activated, the terminating source device's selection of objects and the information entered by the terminating source device in the completion display 1066 can be transmitted to the control server 1054 by way of the source device interface server 1052, which can capture the terminating source device's entries. In some implementations, the control server 1054 can add the terminating source device's information to the suspended storage device update and, now having a complete set of information, can execute a storage device update with the host network 1030.

In the illustrated example, the host network 1030 includes an API 1040*a* through which external entities, such as the proxy network 1050, can have limited access to the host's object storage device 1036. The API 1040*a* can include, for example, a command or set of commands that the proxy network 1050 can use to identify one or more objects for updating and provide any terminal data that the host may need to update the objects. In some cases, commands received through the API 1040*a* are transmitted to a storage device server 1034 operated by the host network 1030. The storage device server 1034 can validate any requests to update the object storage device 1036. The storage device server 1034 can further execute the update.

In some cases, the object 1012 selected by the terminating source device is to be transmitted, either to the terminating source device or another source device. In these cases, the object 1012, or an entry for the object 1012, may be removed from the object storage device. In some cases, the object 1012 may be transferred to a transmitter, who can execute transmission of the object to the source device who is to receive the object.

Figure 11:
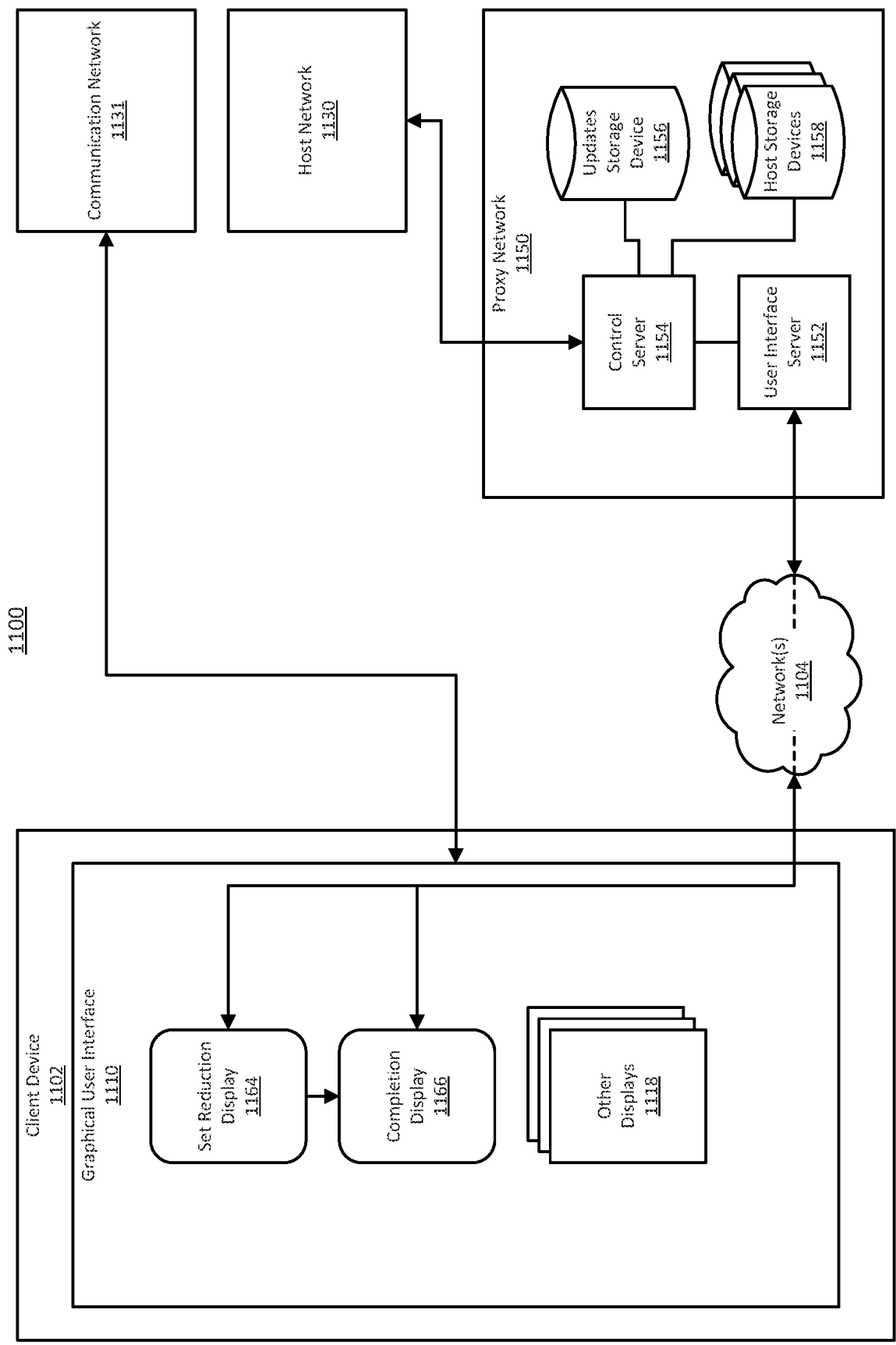
FIG. 11 illustrates an alternate example of a system in which an proxy network can control suspended storage device updates on behalf of a host network.

FIG. 11 illustrates an alternate example of a system 1100 in which an proxy network 1150 can control suspended storage device updates on behalf of a host network 1130. In the example of FIG. 11, an communication network 1131 can provide a graphical user interface 1110 on a client device 1102. An proxy network 1150 can inject displays into the graphical user interface 1110, where the displays can cause source devices to initiate a suspended storage device update for objects provided through a host network 1130. In some examples, the proxy network 1150 communicates with the client device 1102 over one or more networks 1104.

In some examples, the graphical user interface 1110 can cause source devices to communicate, as defined by the communication network 1131. For example, the communication network 1131 can include communication displays 1118, through which source devices of the communication network 1131 can communicate, including exchanging messages, photographs, videos, audio-video data, other data, and so on. In some cases, the communication displays 1118 can passively provide data to source devices of the 1131. In some cases, the communication displays 1118 cause a source device to communicate with systems and processes provided by the communication network 1131 and/or causing source devices to communicate with each other.

In some implementations, when a source device of the communication network 1131 receives a notification of a suspended storage device update, in some implementations, the source device may receive the notification through the communication network 1131, for example as a message posted to an communication display 1118. In these implementations, when the source device activates a link or process associated with the notification, the proxy network 1150 can inject a set reduction display 1164 into the graphical user interface 1110 of the communication network 1131. The proxy network 1150 can further populate the set reduction display with data from a suspended storage device update associated with the notification. Using the set reduction display 1164, the source device can reduce an object set associated with the suspended storage device update to a particular object. The source device an further activate a completion display 1166 to finish an update of the particular object.

In some implementations, the proxy network 1150 can include a source device interface server 1152 that can be configured to inject the set reduction display 1164 and completion display 1166 into the graphical user interface 1110. The source device interface server 1152 can coordinate with a control server 1154, which can use data associated with the notification to look up a suspended storage device update in an updates storage device 1156. The control server 1154 can provide information from the suspended storage device update to the source device interface server 1152, which can use the data to populate the set reduction display 1164. In some implementations, the control server 1154 can also obtain information about other objects, such as objects that may be related to the object set, from the host network 1130 and/or a host storage devices 1158 operated by the proxy network 1150. In these implementations, the source device interface server 1152 can also display some of these other objects in the set reduction display 1164 and/or completion display 1166.

In some implementations, the source device interface server 1152 can further capture inputs into the set reduction display 1164 and/or completion display 1166. These inputs can correspond to parameter selections that reduce an object set to a particular object. Alternatively or additionally, the inputs can correspond to selection of alternative and/or additional objects. The inputs can also include terminator identification data and terminal data. The source device interface server 1152 can pass this information to the control server 1154, which can use the data to generate an update of the source device's selected object. In some implementations, the control server 1154 can send the update to the host network 1130.

Figure 12:
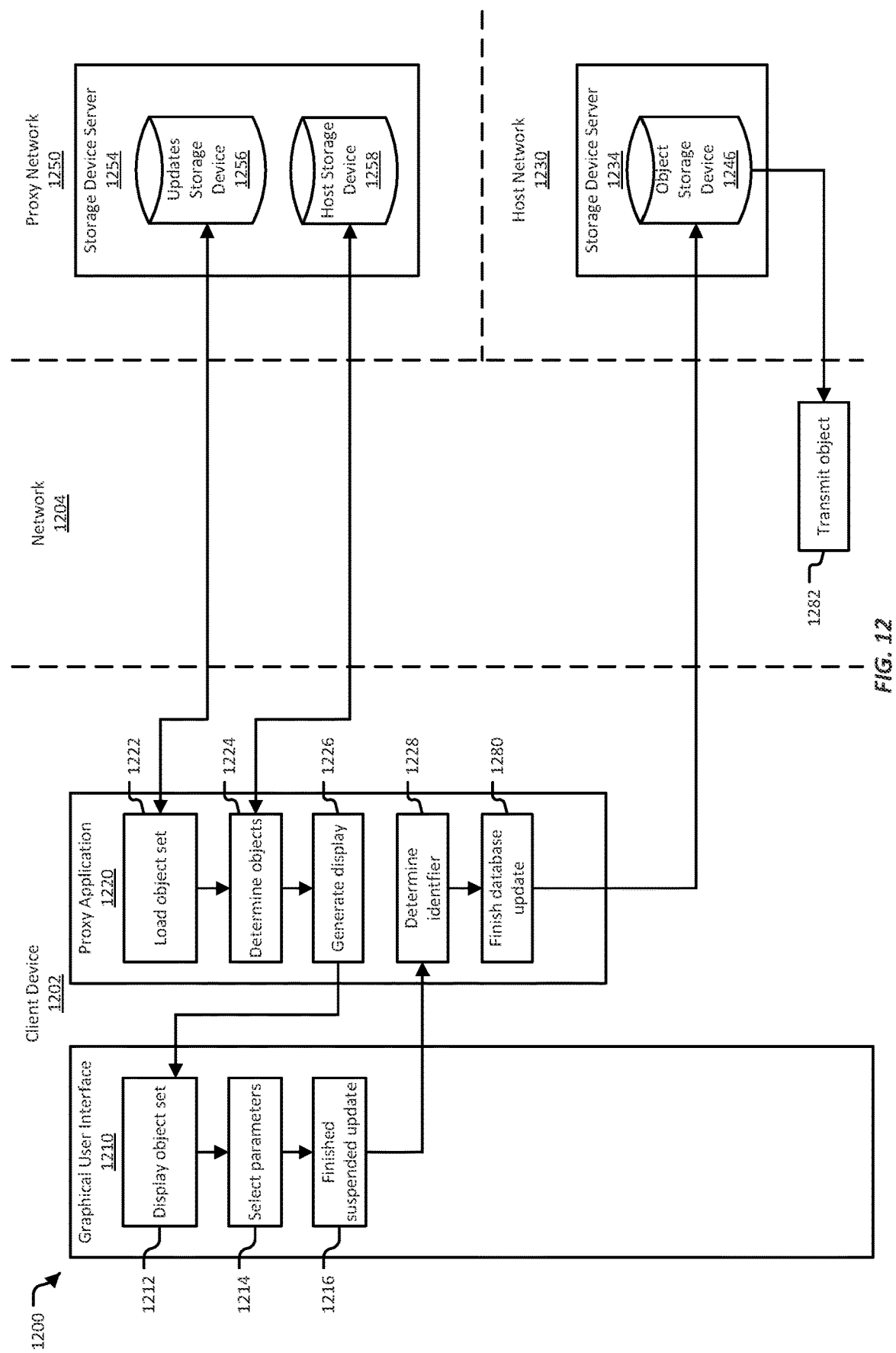
FIG. 12 illustrates an example of a process for completing and finalizing a suspended storage device update.

FIG. 12 illustrates an example of a process 1200 for completing and finalizing a suspended storage device update. In some implementations, the example process 1200 includes operations conducted at a client device 1202 and operations that can occur at an proxy network 1250. The proxy network 1250 can communicate with the client device 1202 over an intermediate network 1204. In some implementations, the client device 1202 can obtain a graphical user interface 1210, over the network 1204, from a host network 1230.

In some implementations, when a terminating source device activates an update identifier, either by activating the update identifier itself or by entering the update identifier into the client device 1202, the update identifier can cause an proxy application 1220 to be started. For example, the update identifier or the graphical user interface 1210 can launch an proxy code loader, which can launch the proxy application 1220. In some cases, the client device 1202 can obtain the proxy code loader and/or the executable for the proxy application 1220 from a content delivery network. Alternatively or additionally, in some cases the client device 1202 can obtain the proxy code loader and/or the proxy application 1220 from the proxy network 1250.

At step 1222, the proxy application 1220 can load an object set. Specifically, the proxy application 1220 can send the update identifier to the proxy network 1250, where a storage device server 1254 can use the update identifier to look up a suspended storage device update in an updates storage device 1256. From the suspended storage device update, the proxy application 1220 can extract an object set that was selected by an instantiating source device.

As discussed previously, the object set can include an object set identifier. In some implementations, in order to make a storage device entry for the suspended storage device update a minimal size (e.g., in terms of bits or bytes or some other memory subdivision), the object set may include no other information about the objects in the set other than the object set identifier. In these implementations, at step 1224, the proxy application 1220 can determine the objects that correspond to the object set. The proxy application 1220 can, for example, query a host storage device 1258 operated by the proxy network 1250, where the host storage device 1258 includes information for a specific host. In this example, the storage device server 1254 can search host storage device 1258 using the object set identifier, and extract a list of specific object identifiers. In some implementations, the object set can include the parameters that describe the objects in the set, in which case the proxy network 1250 may be able to search the host storage device 1258 using the parameters. In some implementations, the proxy network 1250 may communicate with the host network 1230 to obtain the object identifiers for the objects in the object set.

In some implementations, the object set can include at least the object identifiers for the objects that are included in the object set. In these implementations, at step 1224, the proxy application 1220 can query the host storage device 1258 for information about the objects that are associated with each object identifier. Alternatively or additionally, the proxy application 1220 can query the host network 1230 directly.

At step 1226, the proxy application 1220 can generate a set reduction display and populate the set reduction display with a textual and/or visual description of the objects in the object set, as well as other information. The other information can include, for example, the identity of the instantiating source device, a message from the instantiating source device, a message from the host, a display of other objects that may be related to the objects in the object set, or some other information. the set reduction display can also include parameters for the object set, including parameters that have specified values and parameters that do not have specified values. At step 1212, the graphical user interface 1210 can display the object set and other information to the terminating source device.

At step 1214, the terminating source device can select values for parameters that are not specified. The terminating source device can optionally also change parameter values that were set by the instantiating source device. When the terminating source device selects values for any unspecified parameters, the object set can be reduced to a specific object. That is, selection of parameter values can narrow down the object set to an object whose parameters match the terminating source device's selection. In some cases, the parameter values may result in selection of an object that was not originally in the object set. As noted above, the terminating source device can also add objects to the set reduction display, and/or replace the object set with one or more different objects.

At step 1216, the terminating source device can finish the suspended storage device update by providing information that may be needed to finish or execute an update of object selected by the terminating source device, which the instantiating source device may not have provided. Such information can include, for example, a destination for the object when the object will be transmitted. The terminating source device can further activate a button or other graphical element that can signal to the proxy application 1220 to finish the suspended storage device update.

At step 1228, the proxy application 1220 can determine an object identifier for the object that matches the parameter values selected by the terminating source device. At step 1280, the proxy application 1220 can execute steps to finish the suspended storage device update. These steps can include, for example, generating an update request that includes the object identifier, the instantiating source device's initial terminal information, the terminating source devices terminating terminal information, and/or other information. In some implementations, the proxy application 1220 can send the update request directly to the host network 1230, where a storage device server 1234 can use the request to update the host's object storage device 1246. In some implementations, the proxy application 1220 can send the information for the update request to the proxy network 1250, and the proxy network 1250 can transmit the request to the host network 1230.

Once the host network 1230 has processed the update request, the object storage device 1246 may be modified. Modifying the object storage device can include changing a status for the object to "no longer available" or reducing a quantity of the object. In some cases, modifying the object storage device 1246 can include removing the updated object, or an entry for to the updated object, from the object storage device 1246. In some cases, at step 1282, the object can be transmitted over the intermediate network 1204 to a destination specified by the instantiating source device or the terminating source device. In some cases, a transmitter, such as a common carrier, can physically transmit the object.

To update an object in a host's object storage device, the host can require that source device have a source device data set with the host's network, or at least a source device identifier, such as an email address, source device name, or a physical address. A source device data set can include information specific to a particular source device, such as a source device name, password, a physical address, and/or other personal data. In some cases, a source device data set can also store a source device's activity with respect to the host's network. Often, the source device data set is secure, and not viewable without the source device name, password, and possibly also other security information. When a source device executes an ordinary update of the object storage device (e.g., an update of a specific object or objects, such as in the example of FIGS. 1A-1C), the source device can provide a source device identifier, the source device can use an existing source device data set with the host (e.g., a source device data set operated by the host's network), or can generate a new source device data set with the host. In most cases, a source device data set includes source device identifiers such as email addresses and physical addresses.

When executing a suspended storage device update, the instantiating source device can provide a source device identifier and/or establish a source device data set with the host. For example, once the terminating source device has finished the suspended storage device update, the proxy network can send a notification to the instantiating source device. Upon receiving the notification, the instantiating source device can then revisit the suspended storage device update, using displays provided by the proxy network, to take additional actions. For example, the instantiating source device can approve or disapprove an update of the particular object or objects selected by the terminating source device, can approve or disapprove the terminal result and/or transfer of an equivalent of a difference between the terminal result and an approximated result, and/or can finish the suspended storage device update, and cause the suspended storage device update to be executed. In some implementations, the actual update of the host's object storage device can then be executed using a source device identifier provided by the instantiating source device and/or a source device data set the instantiating source device has established with the host. In these implementations, further notifications from the host regarding the update can be transmitted to the instantiating source device.

There are situations, however, in which it may not be possible to use the instantiating source device's source device identification or source device data set to execute the update that results from suspended storage device update. For example, the terminating source device may have added objects to the suspended storage device update, such that the terminal result of the resulting update is greater than the approximated result initially computed for the suspended storage device update. In this example, the terminating source device's information may be used for the additional counter and the instantiating source device's information may be used for the approximated result. In these and other examples, host networks may not be capable of dividing the update between multiple source devices in this manner.

In some implementations, requirements may have been placed on a suspended storage device update such that an source device identifier and/or source device data set for the instantiating source device cannot be used to finish an update. For example, the proxy network may have been configured to hide information about the terminating source device, such as terminator contact data or terminal data, from the instantiating source device. As another example, the proxy network may be configured so that the instantiating source device need only participate in the suspended storage device update once, at the initiation stage. These and other requirements may have been configured by the host, by the proxy network, by the instantiating source device, the terminating source device, or some other entity.

In many cases, a source device identifier or source device data set for a terminating source device may not be usable to finish a suspended storage device update. For example, information such as the initial terminal data provided by the instantiating source device and the approximated result of the suspended storage device update may need to be kept hidden and inaccessible to the terminating source device. In this example, without this information, the terminating source device may not have enough information to finish the suspended storage device update.

Figure 13:
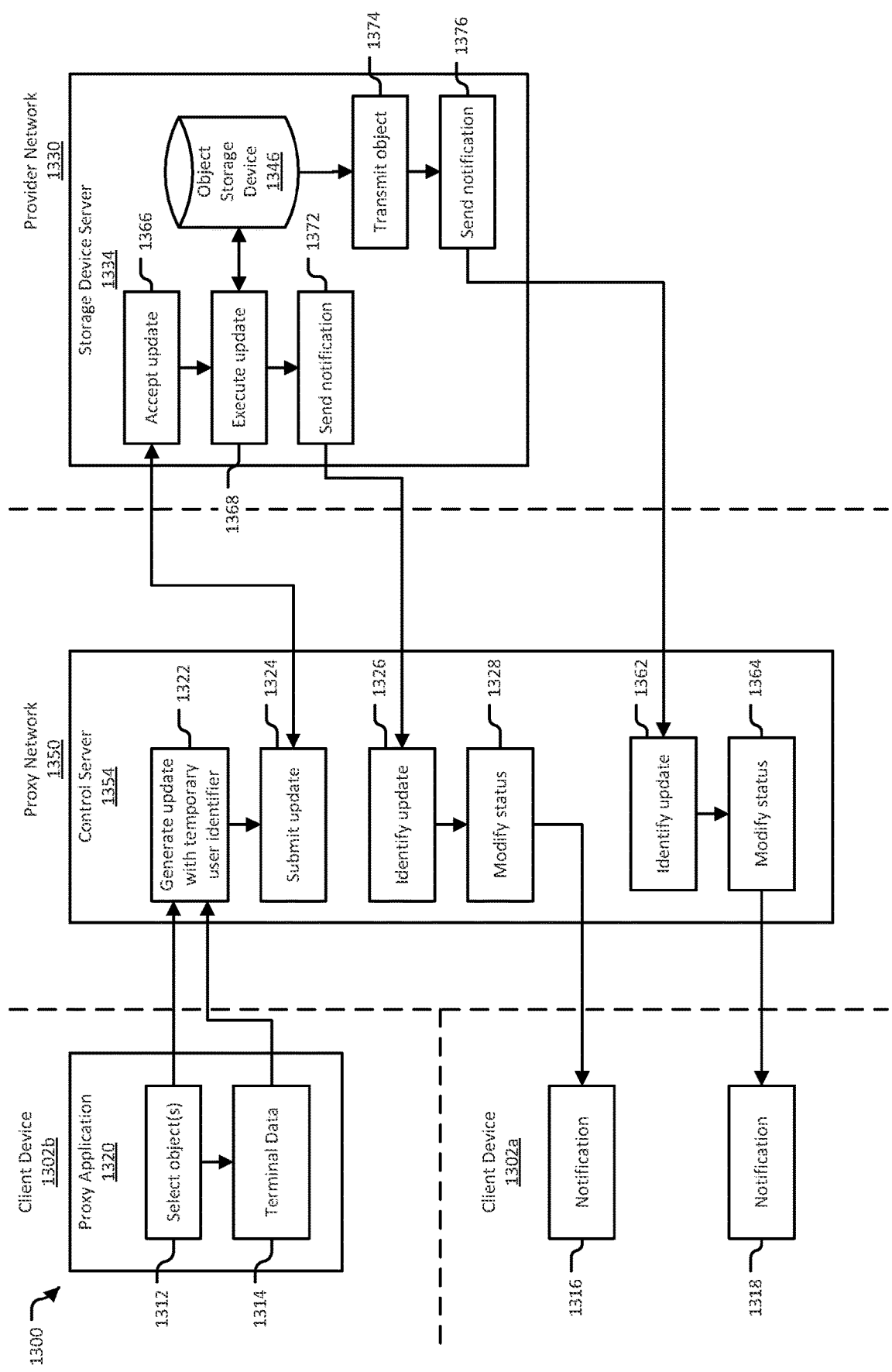
FIG. 13 illustrates an example of a process an proxy network can implement to execute an update of an object storage device on behalf of an instantiating source device and a terminating source device.

In some implementations, the proxy network can generate a temporary source device identifier and/or a temporary source device data set, so that neither the instantiating source device nor the terminating source device has to supply a source device identifier or generate a source device data set with the host network. FIG. 13 illustrates an example of a process 1300 an proxy network 1350 can implement to execute an update of an object storage device 1346 on behalf of an instantiating source device and a terminating source device. In some implementations, the example process 1300 includes operations executed on the terminating source device's client device 1302b and the instantiating source device's client device 1302a. The proxy network 1350 can receive inputs from, and send outputs to, either client device. The proxy network 1350 can further communicate with a host network 1330 to execute the update.

At step 1312, the terminating source device can source device a client device 1302b to select one or more objects for updating, where the objects can come from object sets associated with a suspended storage device update, and/or can be selected from other objects in the host's object storage device 1346. At step 1314, the terminating source device can enter terminal data, such as a destination for the selected objects. In some implementations, an proxy application 1320 executing on the client device 1302b receives the terminating source device's inputs and transmits the inputs to the proxy network 1350.

At step 1322, a control server 1354 in the proxy network 1350 can generate an update for the selected objects. The control server 1354 can also generate a temporary source device identifier for the update. In some implementations, the control server 1354 can reuse a previously generated source device identifier. The source device identifier can be, for example, a physical address, which can be a physical address where the proxy network 1350 can receive physical mail. Alternatively or additionally, a source device identifier can be an email address that directs email received by the email address to the proxy network 1350. In this example, in some implementations, the email address can be uniquely associated with a particular suspended storage device update. For example, the proxy network 1350 can generate an email address when the particular suspended storage device update is initiated and can decommission or delete the email address when the suspended storage device update is finished. In some implementations, the email address can be uniquely associated with a host. In some implementations, the email address can be uniquely associated with the instantiating source device and/or the terminating source device. In some implementations, the proxy network 1350 may maintain multiple temporary email addresses for a particular host, instantiating source device, and/or terminating source device.

At step 1324, the control server 1354 can use the temporary source device identifier to submit the update generated at step 1322 to the host network 1330. In some implementations, at step 1324, the control server 1354 can additionally or alternatively generate a source device data set with the host network 1330, using the temporary source device identifier and other identification and/or location information associated with the proxy network 1350, if needed. In some cases, the control server 1354 can use terminal data provided by the instantiating source device and/or the terminating source device when submitting the update. For example, the terminal data can include counter transfer source provided by the instantiating source device, from which the terminal result for the update will be transferred. As another example, the terminal data can include a destination provided by the terminating source device, to which the updated object or objects will be transmitted. In some cases, the control server 1354 can provide temporary terminal data, such as a counter transfer source associated with the proxy network 1350 and/or a destination where the proxy network 1350 can receive the updated objects. In these cases, the proxy network 1350 can later (such as when the proxy network 1350 receives the updated objects) transfer the terminal result from the instantiating source device, and can further transmit the objects to the terminating source device.

At step 1366, a storage device server 1334 in the host network 1330 can validate and accept the update. Validating the update can include, for example, determining whether the object to be updated is currently available in the object storage device 1346. As another example, validating can include determining whether an equivalent of the terminal result can be transferred to the host, whether from the instantiating source device, the terminating source device, the proxy network 1350, or some combination of entities. In some implementations, the proxy network 1350 can include systems that ensure that the update will be accepted by the host network 1330. These systems are discussed further below. In most cases, when the update is submitted, the storage device server 1334 can send a confirmation to the proxy network 1350, using the temporary source device identifier provided by the control server 1354. The confirmation can include a code or identifier generated by the storage device server 1334, which the host network 1330 can use to identify the update. In some implementations, the control server 1354 can store the code in the updates storage device, with the suspended storage device update.

At step 1368, the storage device server 1334 can execute the update, and modify an entry for the object (or objects) in the object storage device 1346. Modifying the storage device entry can, at step 1372, trigger sending of a notification, where the notification notifies the one who requested the update that the update has taken place. The storage device server 1334 can send the notification to the temporary source device identifier provided with the update. Because the control server 1354 provided a temporary source device identifier, in some implementations, the notification is received, at step 1326, by the control server 1354.

At step 1326, the control server 1354 can identify the suspended storage device update for which the notification was sent. For example, the temporary source device identifier at which the notification is received can indicate which update the notification was for. For example, the temporary source device identifier can be uniquely associated with a suspended storage device update, with a host, with an instantiating source device, and/or with a terminating source device. In this example, the control server 1354 can search the updates storage device using the update identifier. In some cases, the notification can include the code or identifier that the host uses to identify the update. In these cases, the control server 1354 can alternatively or additionally search the updates storage device using use the host's code.

At step 1328, the control server 1354 can modify the status of the suspended storage device update, to indicate that the suspended storage device update has been executed. In some implementations, the control server 1354 can also generate a notification 1316 that is sent to the instantiating source device, and can be received using the instantiating source device's client device 1302a. The notification can inform the instantiating source device that the suspended storage device update has been executed.

In some cases, updating the object storage device 1346 can include, at step 1374, transmitting the updated object or objects. In some cases, the host network 1330 can transfer the object to a transmitter, who can then transmit the object to a destination specified when the update was received at step 1366. Upon transferring the object to the transmitter, the storage device server 1334 can, at step 1376, send a notification to the temporary source device identifier specified with the update.

At step 1362, the control server 1354 can receive the notification that indicates that the object has been transferred to a transmitter. The control server 1354 can use information provided in the notification (e.g., the temporary source device identifier at which the notification was received, a code or identifier provided by the storage device server 1334, or some other information) to identify the suspended storage device update that is associated with the notification. At step 1364, the control server 1354 can modify the status of the suspended storage device update to indicate that the object is in transit to a destination. In some implementations, the control server 1354 can also generate a notification 1318 to the instantiating source device, to inform the instantiating source device that the object is in transit. In some implementations, the control server 1354 can also notify the terminating source device.

Using the example process 1300, the proxy network 1350 can execute a suspended storage device update and monitor the progress of the update. Involvement of the terminating source device and the instantiating source device can be minimized, and details of the update can be hidden from one or both source devices.

As noted previously, there may be a delay between the time an instantiating source device initiates a suspended storage device update and the time when a terminating source device finishes the suspended storage device update. During this time, the host or some other entity may make changes that may result in the approximated result for the suspended storage device update being different than the terminal result computed after the terminating source device has finished the suspended storage device update. For example, the host may change numerical counters associated with objects in an object set for which the suspended storage device update was initiated. As another example, a percentage used to compute fractional counters may change. As another example, the host may end a program, such as a program that would remove a transmission counter that would otherwise be added to the suspended storage device update, or a program that applies a differential that reduces counters associated with the suspended storage device update. Conversely, the host may start a program that removes the transmission counter or applies a differential. As another example, an existing transmission rate used to determine the transmission counter may change.

In some cases, the terminal result determined once a terminating source device has reduced an object set to a particular object may be less than the approximated result determined when an instantiating source device selected the object set. When the terminal result is less than the approximated result, in some implementations, the proxy network can be configured to transfer the difference to the terminating source device and/or to generate a pre-set counter with the host network, and transfer the pre-set counter to the terminating source device. In some implementations, the proxy network can be configured to transfer the difference to the instantiating source device. In some implementations, the proxy network can be configured to retain the difference.

In some cases, the terminal result may be greater than the approximated result. In most cases, the suspended storage device update cannot be finished until the entire terminal result can be provided for.

In some implementations, a suspended storage device update can be configured so that the terminal result for the suspended storage device update will be the same as the approximated result. By ensuring that the terminal result is the same as the approximated result, the proxy network need not request any additional counter from the instantiating source device or the terminating source device.

Figure 14:
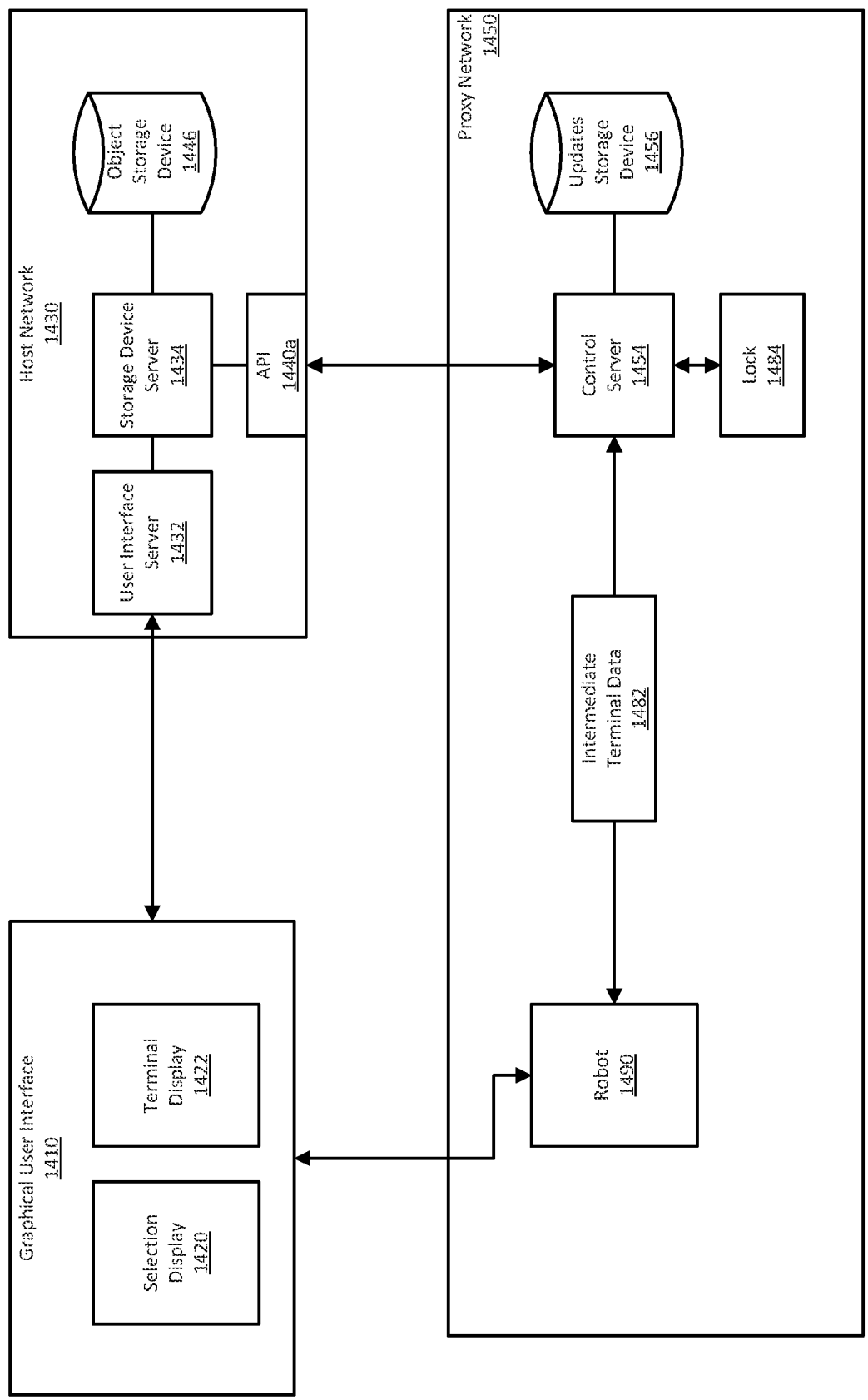
FIG. 14 illustrates an example of systems an proxy network can use for locking the approximate sum.

FIG. 14 illustrates an example of systems an proxy network 1450 can use for locking the approximated result. In some implementations, locking the approximated result can include obtaining a lock 1484 on the objects in an object set. In some implementations, the proxy network 1450 can use an API 1440a of the host network 1430 to communicate directly with a storage device server 1434 of the host network 1430 to obtain the lock 1484. In some implementations, the proxy network 1450 can include a robot 1490 that can communicate with the host's graphical user interface 1410, and through the graphical user interface 1410 can obtain the lock 1484.

In some cases, the host network 1430 can provide an API 1440a that entities outside the host network 1430, such as the proxy network 1450, can use to communicate with a storage device server 1434 (or other systems) within the host network 1430. The API 1440a can include functions and/or routines that can cause the proxy network 1450 to execute a direct update of the host's object storage device 1446. In some cases, a control server 1454 in the proxy network 1450 can execute these functions and/or routines in steps, such as a step to specify the object or objects to update, a step to specify terminal information, and a step to finish and execute the update. To determine which objects to lock, the control server 1454 can look up a suspended storage device update in the updates storage device 1456 operated in the proxy network 1450, and determine the objects in the object set that was specified for the suspended storage device update.

When the storage device server 1434 receives the objects to update, in some cases, the storage device server 1434 may place a lock in the object storage device 1446 on each of the objects being updated. The storage device server 1434 may lock the objects so that another update (originating, for example, at a graphical user interface 1410, at the proxy network 1450, or at another outside entity) cannot also update the objects. When the storage device server 1434 receives terminal information, in some cases the storage device server 1434 can also use information about the objects that have been locked to compute a terminal result for the update.

In these and other cases, by not executing the final step to finish and execute the storage device update, the proxy network 1450 can cause the storage device server 1434 to hold the lock 1484 on the objects (and possibly also the terminal result). The proxy network 1450 can execute the final step and release the lock 1484 once the proxy network 1450 has the completion information from the terminating source device. Alternatively or additionally, the storage device server 1434 may be configured to automatically release the lock 1484 after a specified time period has expired. In the interim, in some cases, the locked objects—including the objects' parameters—cannot be modified, even by the host. In most cases, the terminal result also cannot be changed.

When the proxy network 1450 acquires the completion information before the lock 1484 expires, the proxy network 1450 may be able to modify the terminal information before releasing the lock 1484. The storage device server 1434 may be configured so that, when the lock 1484 is released, the storage device update is executed with the objects, the objects' information, and the terminal result determined when the lock 1484 was generated. When the proxy network 1450 is not able to acquire the completing information before the lock 1484 expires, the proxy network 1450 can source device other techniques, discussed below, to lock 1484 in the approximated result.

In some cases, the host network's API 1440a may have functions and/or routines specifically for obtaining a lock 1484 on a set of objects. These functions and/or routines may cause the control server 1454 to specify which objects to lock and/or a terminal result to lock. The API 1440a may further cause the proxy network 1450 to specify a timeout period, after which the lock 1484 will expire, or the storage device server 1434 may have a pre-determined timeout period. In some cases, the host network 1430 may provide the proxy network 1450 with a token for the lock 1484, which the control server 1454 can store in the updates storage device 1456 along with the suspended storage device update.

In some cases, the host network 1430 may not have functions and/or routines that cause the proxy network 1450 to obtain a lock 1484, or may not have an API at all. In these cases, the proxy network 1450 may have a robot 1490 that can communicate with the host's graphical user interface 1410 to generate a lock 1484. As provided herein, a robot is an automated program configured to execute a set of steps for a set of inputs, without the assistance of a human operator. The steps may vary for different inputs. In some implementations, the robot may be modified for a particular graphical user interface 1410.

In the example of FIG. 14, the robot 1490 is configured to enter inputs into the host's graphical user interface 1410, such as the selection display 1420 and the terminal display 1422. For example, the robot 1490 can execute steps to add objects to the selection display 1420, and can then activate the terminal display 1422. As a further example, the robot 1490 can obtain intermediate terminal data 1482 from the control server 1454, and execute steps to enter intermediate terminal data into the terminal display 1422, and cause the terminal display 1422 to determine a terminal result. The robot 1490 can further activate a finish button in the terminal display 1422 to finish updating of the selected objects.

In some cases, once the terminal display 1422 is activated by the robot 1490, the host network 1430 may lock the selection display 1420. Specifically, in some examples, the source device interface server 1432 in the host network 1430 may capture the objects entered into the selection display 1420 and inform the storage device server 1434 that an update of these objects is about to take place. The storage device server 1434 may then place a lock 1484 on these objects, with the expectation that an update is imminent. In some cases, the source device interface server 1432 can also capture terminal data entered into the terminal display 1422, so that the storage device server 1434 can also lock the terminal result for the objects. Should the robot 1490 withhold activating a finish button or similar graphical element, the selection display 1420 and/or terminal display 1422 can remain locked until the robot 1490 activates the finish button or a time period expires.

In some implementations, when the proxy network 1450 has the completing information from a terminating source device, the robot 1490 can modify the objects input into the selection display 1420 and/or the terminal data entered into the terminal display 1422. The robot 1490 can then activate the finish button and cause the update to occur.

In some implementations, using any of the techniques discussed above, the proxy network 1450 can obtain a lock 1484 on all of the objects in an object set. In some implementations, the proxy network 1450 can determine a representative set of objects, where the representative set of objects include objects from the object set that best represent all of the objects in the object se. Best represents, in this context, can mean, for example, that the representative set of objects includes one of each of the top one, two, three, five (or some other number) most common objects in the object set, where common can be defined in terms of the objects' parameters and/or numerical counters. In some cases, obtaining a lock 1484 on all of the objects in the object set may not be practical, or the host network 1430 may not cause it.

Figure 15:
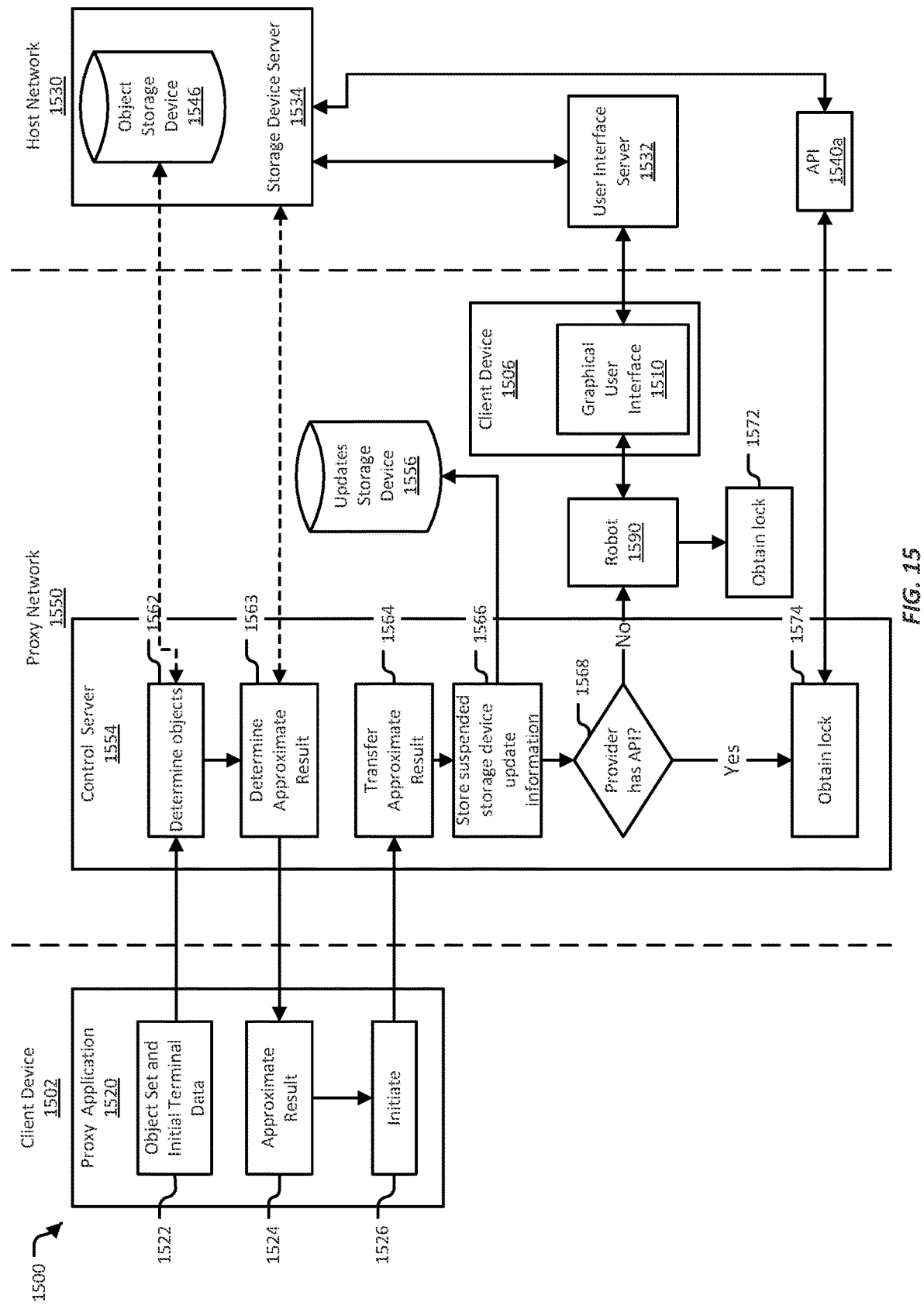
FIG. 15 illustrates an example of a process for obtaining a lock from a host network.

FIG. 15 illustrates an example of a process 1500 for obtaining a lock from a host network 1530. In some implementations, the example process 1500 can include steps executed by an proxy application 1520 executing on a client device 1502 and steps executed by a control server 1554 in an proxy network 1550. The host network 1530 may include an API 1540*a* through which the proxy network 1550 can affect an update of an object storage device 1546 operated by the host network 1530. The host network 1530 may have a storage device server 1534 that manages the object storage device 1546.

At step 1522, the proxy application 1520 can receive as inputs an object set and initial terminal data for a suspended storage device update. The proxy application 1520 can transmit this information, over some intermediate networks, to the control server 1554. At step 1562, the control server 1554 can determine the objects that correspond to the object set. In some implementations, the control server 1554 may communicate with the object storage device 1546 to determine the objects.

At step 1563, the control server 1554 can use information about the objects in the object set and the initial terminal data to determine an approximated result for the suspended storage device update. In some implementations, the control server 1554 may communicate with the storage device server 134 to obtain information such as fractional counters and/or transmission counters that should be added to the approximated result.

At step 1524, the proxy application 1520 can receive the approximated result from the control server 1554, and display the approximated result to the instantiating source device. The instantiating source device can then initiate the suspended storage device update. At step 1526 the proxy application 1520 can receive input indicating the initiation, and can pass this input on to the control server 1554.

At step 1564, in some implementations, the control server 1554 can transfer the approximated result from the instantiating source device's counter transfer source, which the instantiating source device can have specified with the initial terminal data. The proxy network 1550 can retain the approximated result until the suspended storage device update is finished and executed, at which point the proxy network 1550 can transfer the approximated result to the host.

At step 1566, the control server 1554 can store the suspended storage device update in an updates storage device 1556 operated by the proxy network 1550.

At step 1568, the control server 1554 can determine whether the host network 1530 has an API that the control server 1554 can use to obtain a lock on the objects in the object set. Whether the host network 1530 has an API can be determine, for example, using a host-specific storage device and/or a previously-stored listing of information about the host. Alternatively or additionally, the control server 1554 can query the host network 1530 to see if the host network 1530 has an API. When the host network has an API 1540*a*, the control server 1554 can further determine whether the API 1540*a* has the functionality that can cause the control server 1554 to obtain a lock. The API 1540*a* functionality can also be found, for example, in a host-specific storage device and/or listing of information for the host, or by querying the API 1540*a*.

When the host network 1530 has an API 1540*a* with the proper functionality, then, at step 1574, the control server 1554 can communicate with the API 1540*a* to obtain a lock. For example, the control server 1554 can use API functionality for executing an update of the object storage device 1546, but not execute the update, so that the storage device server 1534 locks the objects being updated, at least temporarily. As another example, the API 1540*a* may have functionality that lets the control server 1554 specify objects to lock.

When the host network 1530 does not have an API, or the API does not have functionality that would cause the control server 1554 to obtain a lock, then the control server 1554 can activate a robot 1590. In some implementations, the robot 1590 can be configured to enter inputs into, and read information from, a graphical user interface 1510 provided by the host.

To access the graphical user interface 1510, the graphical user interface 1510, in some implementations, the proxy network 1550 an include a client device 1506. The client device 1506 can be a computing system, such as a desktop computer, a laptop computer, a tablet computer, a handheld computer, or some other type of computing system, located within, connected to, and/or under the control of the proxy network 1550. For example, the client device can be within the same firewall or security perimeter as the proxy network 1550. The client device 1506 has a network connection over which the client device 1506 can get the graphical user interface 1510 from a source device interface server 1532 in the host network 1530. The client device 1506 can also have a display for displaying the graphical user interface 1510.

In some implementations, the robot 1590 can enter inputs into the graphical user interface 1510 in an automated fashion. For example, given a list of the objects in the object set, the robot 1590 can use the graphical user interface 1510 to select each object, and cause the object to be added to a selection display. Similarly, the robot 1590 can enter the initial terminal data and information such as a representative destination into a terminal display. The graphical user interface 1510 may be configured so that activation of the terminal display can lock the selection display. The source device interface server 1532 may communicate the locked selection display to the storage device server 1534 in the host network 1530 so that the storage device server 1534 can place a lock on the objects (or entries for the objects) in the object storage device 1546. The robot 1590 can further to refrain from activating a finish button in the terminal display, so that the lock on the objects is operated. In this way, at step 1572, the robot 1590 can obtain a lock.

As discussed above, the robot 1590 and/or control server 1554 can release the lock once the terminating source device has provided completing information. In some cases, however, the lock may expire before the proxy network 1550 is able to obtain the completing information.

In some cases, it may not be possible for an proxy network to obtain a lock from a host network. The host network may not have an API, or the API may not cause locking, or the host network may not be configured to lock selection displays.

In some cases, the instead of attempting to obtain a lock on objects in the object storage device 1546, the proxy network 1550 can obtain a lock on the approximated result determined for a suspended storage device update. For example, the proxy network 1550 can obtain a pre-set counter from the host.

In some implementations, the proxy network 1550 can obtain a pre-set counter through an API 1540a of the host network 1530. For example, the API 1540a can include a function for requesting a pre-set counter. In this example, a control server 1554 operated by the proxy network 1550 can, for a particular suspended storage device update, make the request, and provide as the requested counter an approximated result associated with the suspended storage device update. In some cases, the host may generate codes for pre-set counters, which can be stored, for example, in an updates storage device 1556 operated by the host network 1530. A storage device server 1534 of the host network 1530 can obtain a code from the updates storage device 1556, and transmit the code to the control server 1554. The control server 1554 can store the code with the suspended storage device updated in the updates storage device 1556.

When a terminating source device finishes the suspended storage device, update, the proxy network 1550 can apply the pre-set counter when submitting an actual object update to the host network 1530. In some cases, the pre-set counter may be more than the terminal result determined for the object update. In these cases, the difference may be made available to the terminating source device, to use to obtain additional objects. In some cases, the pre-set counter may be less than the terminal result. In these cases, the instantiating source device may be contacted for input regarding the difference, or the proxy network 1550 may take other steps.

Figure 16:
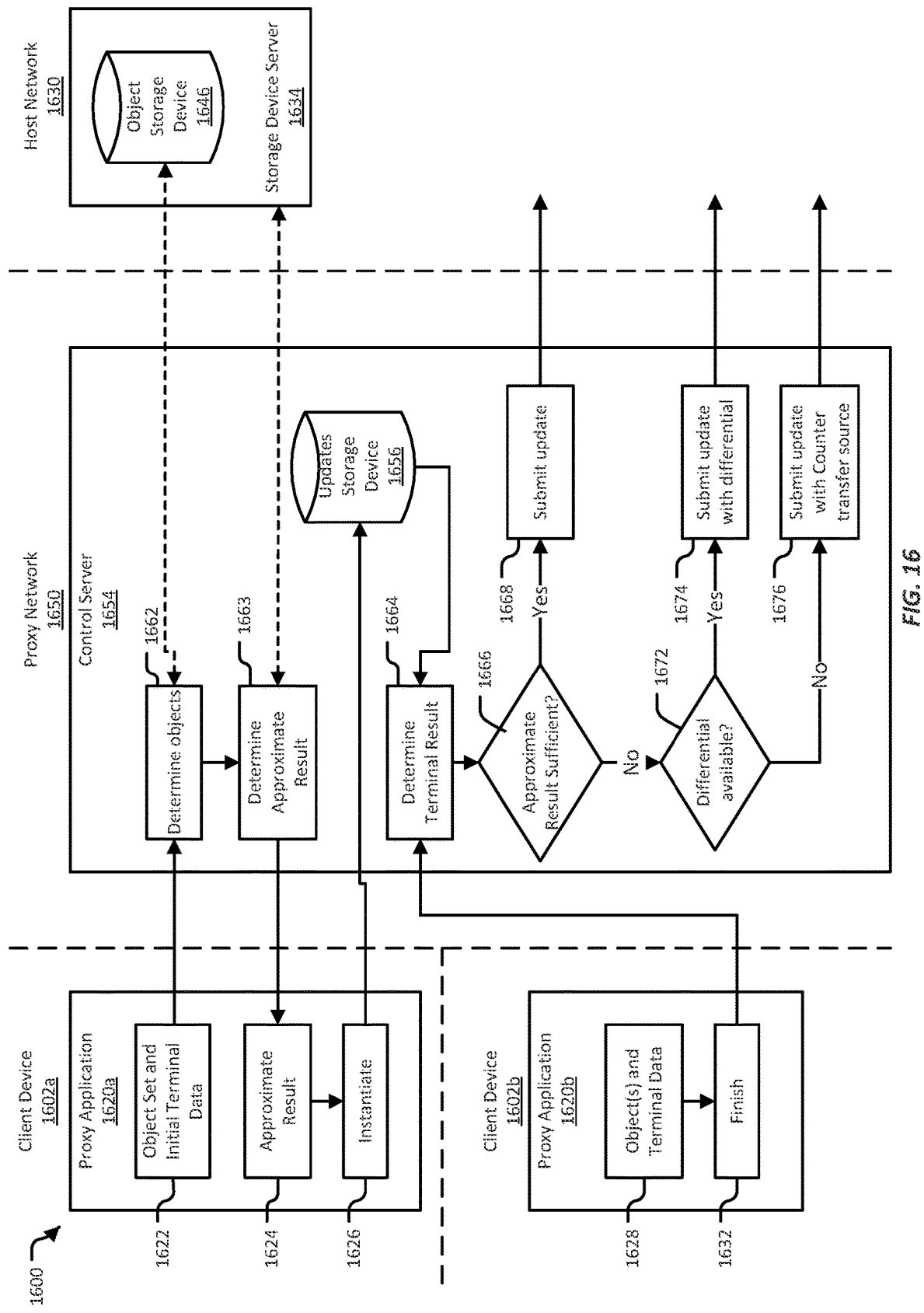
FIG. 16 illustrates an example of different mechanisms the proxy network can use to supply any difference between the terminal result for a suspended storage device update and the approximate result generated when the suspended storage device update was initiated.

In some implementations, the proxy network may have other mechanisms for ensuring that an approximated result is the counter that is transferred from an instantiating source device's counter transfer source, even when the terminal result is different. FIG. 16 illustrates an example of different mechanisms the proxy network 1650 can use to supply any difference between the terminal result for a suspended storage device update and the approximated result generated when the suspended storage device update was initiated. In some implementations, the example process 1600 can include steps executed by an proxy application 1620a executing on a client device 1602a being operated by the instantiating source device and steps executed by an proxy application 1620b executing on a client device 1602b being operated by the terminating source device. The example process can also include steps executed by a control server 1654 in an proxy network 1650. The host network 1630 may have a storage device server 1634 that manages the object storage device 1646.

At step 1622, the proxy application 1620a on the instantiating source device's client device 1602a can receive as inputs an object set and initial terminal data for a suspended storage device update. The proxy application 1620a can transmit this information, over some intermediate networks, to the control server 1654. At step 1662, the control server 1654 can determine the objects that correspond to the object set. In some implementations, the control server 1654 may communicate with the object storage device 1646 to determine the objects.

At step 1663, the control server 1654 can use information about the objects in the object set and the initial terminal data to determine an approximated result for the suspended storage device update. In some implementations, the control server 1654 may communicate with the storage device server 1634 to obtain information such as fractional counters and/or transmission counters that should be added to the approximated result.

At step 1624, the proxy application 1620a can receive the approximated result from the control server 1654, and display the approximated result to the instantiating source device. The instantiating source device can then initiate the suspended storage device update. At step 1626 the proxy application 1620a can receive input indicating the initiation, and can pass this input on to the control server 1654.

At step 1664, in some implementations, the control server 1654 can transfer the approximated result from the instantiating source device's counter transfer source, which the instantiating source device can have specified with the initial terminal data. The proxy network 1650 can retain the approximated result until the suspended storage device update is finished and executed, at which point the proxy network 1650 can transfer the approximated result to the host.

At step 1666, the control server 1654 can store the suspended storage device update in an updates storage device 1656 operated by the proxy network 1650.

At step 1628, the proxy application 1620b on the terminating source device's client device 1602b can receive as inputs selection of an object from the object set and terminal data. At step 1632, the proxy application 1620b can receive an input indicating that the terminating source device is ready to finish the suspended storage device update.

At step 1664, the control server 1654 can use the objects and terminal data provide at step 1628 to determine a terminal result. To determine the terminal result, the control server 1654 may look up the suspended storage device update in the updates storage device 1656, and use the initial terminal data provided at step 1622.

At step 1666, the control server 1654 can determine whether the approximated result determined at step 1663 is sufficient. That is, the control server 1654 can determine whether the approximated result is equal to or greater than the terminal result. When the approximated result is equal to or greater than the terminal result, then, at step 1668, the control server 1654 can submit the update. As discussed above, submitting the update can include transmitting the objects selected at step 1628, the initial terminal data, the terminal data, and possibly other information, to the host network 1630. The host network 1630 can use this information to execute an update in the object storage device 1646 of the objects.

Returning to step 1666, when the approximated result is insufficient, the process 1600 can proceed to step 1672. At step 1672, the control server 1654 can determine whether a differential is available. A differential, when applied to a terminal result, can reduce the terminal result by a percentage, by a pre-set number, or in some other manner. In some cases, the differential can be applied to the numerical counter for specific objects. In some cases, the differential can be applied to a group of objects, to a fractional counter added to the terminal result, to transmission counter, and/or to the terminal result itself. The differential may be provided by the host, a manufacturer or distributer of an object, and/or some other entity.

At step 1672, the control server 1654 can search for a differential that, when applied, can reduce the terminal result to being equal to or less than the approximated result. The proxy network 1650 may have a storage device of previously obtained differentials, which the control server 1654 can search. Alternatively or additionally, the control server 1654 can search, for example, the host network 1630, manufacturer networks, distributor networks, networks that specialize in distributing differentials, other networks, and/or other sources. In some implementations, the control server 1654 can locate a multiple differentials that can be combined to reduce the terminal result.

When the control server 1654 locates a differential that will reduce the final vale to being less than or equal to the approximated result, then, at step 1674, the control server 1654 can submit the update with the differential. Submitting the update with the differential can include, for example, submitting a code for the differential.

When, at step 1666, the control server 1654 determines that there is no differential available, or no differential that will reduce the terminal result to equal to or less than the approximated result, then, at step 1676, the control server 1654 can submit the update with information for a counter transfer source. The counter transfer source, in this case, can be a counter transfer source of the proxy network 1650, so that a counter equivalent to the difference between the terminal result and the approximated result can be transferred from the proxy network 1650. In some implementations, the proxy network 1650 can later request that the host network 1630 transfer the difference back to the proxy network 1650.

In some implementations, the proxy network 1650 and the host network 1630 can jointly implement techniques for ensuring that the terminal result for a suspended storage device update is the same as the approximated result. In some implementations, when the suspended storage device update is initiated, the control server 1654 can communicate with the host network 1630 to determine the approximated result. For example, as discussed above, the control server 1654 can transmit a representative counter to the host network 1630 and obtain from the control server 1654 any applicable fractional counters and/or transmission counters. In some implementations, when the host network 1630 responds to the control server 1654, the host network 1630 can include an encrypted key with the response. The encrypted key can be uniquely associated with the suspended storage device update, as well as the request sent by the control server 1654 to determine the approximated result. The key need not be encrypted, however, because the key may be transmitted between the host network 1630 and the proxy network 1650 over public networks, some form of encryption is preferable. Encryption algorithms such as those used for encrypting passwords and other sensitive information can be used.

In some implementations, when the suspended storage device update is later finished and the control server 1654 is ready to submit an actual update to the host network 1630, the control server 1654 can send the update with the encrypted key. When the host network 1630 receives the encrypted key, the host network 1630 can verify that the key was generated by the host network 1630, and that therefore the update can be trusted. Because the update can be trusted, the host network 1630 can execute the update using the approximated result, regardless of any changes made to the numerical counters for any objects being update, changes to any fractional counters, and/or any changes to transmission counters.

As discussed above, in some cases, a host network can have one or more APIs through which an proxy network can conduct operations such as obtaining information about objects provided by the host and executing an update of one or more of these objects. In some cases, however, a host network may have no externally-facing APIs. The host network may not want to give outside entities access through APIs out of concern for security risks or other concerns. Alternatively, the host network may be constructed from older hardware and/or software, and thus not support external-facing APIs, or may require extensive modifications to support external-facing APIs.

Figure 17A:
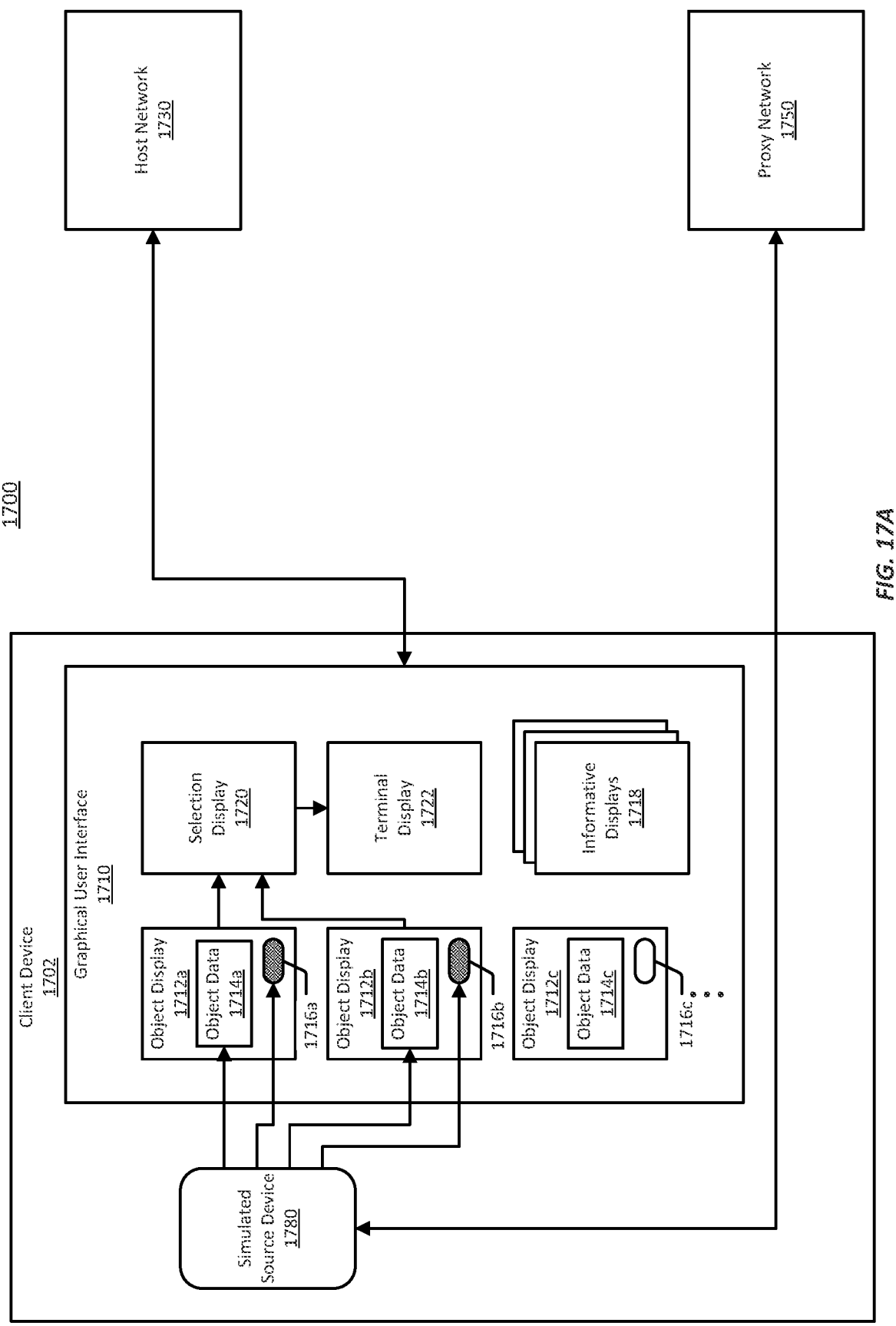

In cases where a host network does not include any external-facing APIs, an proxy network can implement other techniques to execute suspended storage device updates of objects provided by the host network. FIGS. 17A-17B illustrate an example of a system 1700 that can be implemented by an proxy network to communicate with the host network 1730. As illustrated in the example of FIG. 17A, the host network 1730 includes computing systems configured to generate a graphical user interface 1710 on client devices. In this example, an proxy network 1750 can include a client device 1702 that can display the host's graphical user interface 1710. The client device 1702 can be a computing system within, connected to, and/or controlled by the proxy network 1750. For example, the client device 1702 can be within the same firewall or security perimeter as the proxy network 1750.

The graphical user interface 1710 can include object displays 1712a-1712c that can display objects and/or object types. The object displays 1712a-1712c can include object data 1714a-1714c about the object or object types being displayed. The object data 1714a-1714c can also include fixed and/or variable parameters for the displayed object or object type. Each object display 1712a-1712c can also include a button 1716a-1716c or some other graphical element that can be used to select an object with a specified set of parameter values. The graphical user interface 1710 can further include a selection display 1720, with which a source device can view objects selected by the source device, and a terminal display 1722, through which the source device can finish an update of the source device's selected objects. In some cases, the graphical user interface 1710 can also include informative displays 1718, containing information such as information about the host, information about objects, information about current programs for obtaining objects, and so on.

In some implementations, the proxy network 1750 can also have a simulated source device 1780, configured to communicate with the graphical user interface 1710. In some implementations, the simulated source device 1780 can be a process, program, script, and/or series of scripts configured enter input into the graphical user interface 1710 and/or activate buttons or other graphical elements in the graphical user interface 1710. In some implementations, the simulated source device 1780 can execute pre-defined procedures for a given set of inputs, an example of which is provided below. In some implementations, the simulated source device 1780 and/or another process can also read or extract data from the graphical user interface 1710, including, for example, text, graphics, metadata, hidden data, and/or other data that can be determined from the graphical user interface 1710. In some implementations, the simulated source device 1780 can be executing on the client device 1702. In some implementations, the simulated source device 1780 may be executing on a computing system in the proxy network 1750. The simulated source device 1780 can also be referred to as a robot or bot.

In some implementations, the proxy network 1750 can use the simulated source device 1780 to assist in a suspended storage device update. For example, when an instantiating source device initiates a suspended storage device update, the instantiating source device may navigate to object displays provided by the graphical user interface 1710, and select objects to include in the set of objects that will be stored with the suspended storage device update. In some implementations, to determine information about the objects in the object set, the simulated source device 1780 can, using the graphical user interface 1710 executing on the client device 1702, navigate to the same object displays 1712a-1712b that were viewed by the instantiating source device. The simulated source device 1780 can further select the same parameter values in the object data 1714a-1714b in each object display 1712a-1712b. The simulated source device 1780 can be provided with the instantiating source device's selections by a source device interface server and/or control server in the proxy network 1750. The source device interface server and/or control server can obtain the source device's selections from displays injected by the proxy network 1750 into the graphical user interface 1710, as discussed above.

Once the simulated source device 1780 has selected the object displays 1712a-1712b and/or parameter values specified by the instantiating source device, the simulated source device 1780 or some other process can read or extract information about the selected objects from the object displays 1712a-1712b. The object displays 1712a-1712b can provide, for example, possible parameter values for variable parameters, numerical counters for the selected objects, object identifiers for the selected objects, descriptions for the selected objects, images for the selected objects, and so on. This information can be used, along with initial terminal information provided by the instantiating source device, to determine an approximated result for the suspended storage device update. This information can also be stored with the suspended storage device update in the proxy network 1750.

When a terminating source device views the object set for the suspended storage device update, in some implementations, the proxy network 1750 can use the information previously extracted from the graphical user interface 1710 to display the objects in the object set. In some cases, the simulated source device 1780 can again input the instantiating source device's inputs into the graphical user interface 1710 to obtain updated information about the objects, before displaying the objects to the terminating source device.

When the terminating source device finishes the suspended storage device update, the simulated source device 1780 can also be used to finish and execute an actual update of the object (or objects) selected by the terminating source device. FIG. 17B illustrates in greater detail the selection display 1720 and the terminal display 1722 that can be provided through the graphical user interface 1710. When a terminating source device selects parameter values to reduce an object set to a specific object, the source device interface server and/or control server of the proxy network 1750 can provide the terminating source device's selections to the simulated source device 1780. The simulated source device 1780 can then make the same parameters selections in the graphical user interface 1710 executing on the client device 1702, and cause the terminating source device's selected objects 1713a-1713b to be added to the selection display 1720. In some implementations, the simulated source device 1780 or another process can read the selection display 1720 to extract the object identifiers 1724a-1724b, numerical counters 1726a-1726b, and/or parameters 1728a-1728b for each selected object 1713a-1713b. In these implementations, the proxy network 1750 can present some of this information, such as the parameter values, to the terminating source device so that the terminating source device can verify the selections.

To finish the suspended storage device update, the simulated source device 1780 an activate a button or other graphical element that causes the terminal display 1722 to be displayed. The terminal display 1722 may require source device identification data 1742 and source device terminal data 1744. For the source device identification data 1742, the simulated source device 1780 can enter the instantiating source device's information, the terminating source device's information, or a combination of both. In some implementations, the simulated source device 1780 can enter information for the proxy network 1750, so that the proxy network 1750 is the entity that submits the actual object update. For the source device terminal data 1744, the simulate source device 1780 can also enter the instantiating source device's information, the terminating source device's information or a combination of both. In some implementations, for some of the source device terminal data 1744, the simulated source device 1780 can enter information for the proxy network 1750, such as information identifying a counter transfer source of the proxy network 1750. In some cases, the simulated source device 1780 can also enter any differential codes into the terminal display 1722.

Once the source device identification data 1742 and the source device terminal data 1744 have been entered. the simulated source device 1780 can activate a finish button 1746. The finish button 1746 can cause the actual update of the selected objects 1713a-1713b to be sent to the object storage device 1736 in the host network 1730, to be executed. Once the update has been executed, the suspended storage device update is done.

Figure 18A:
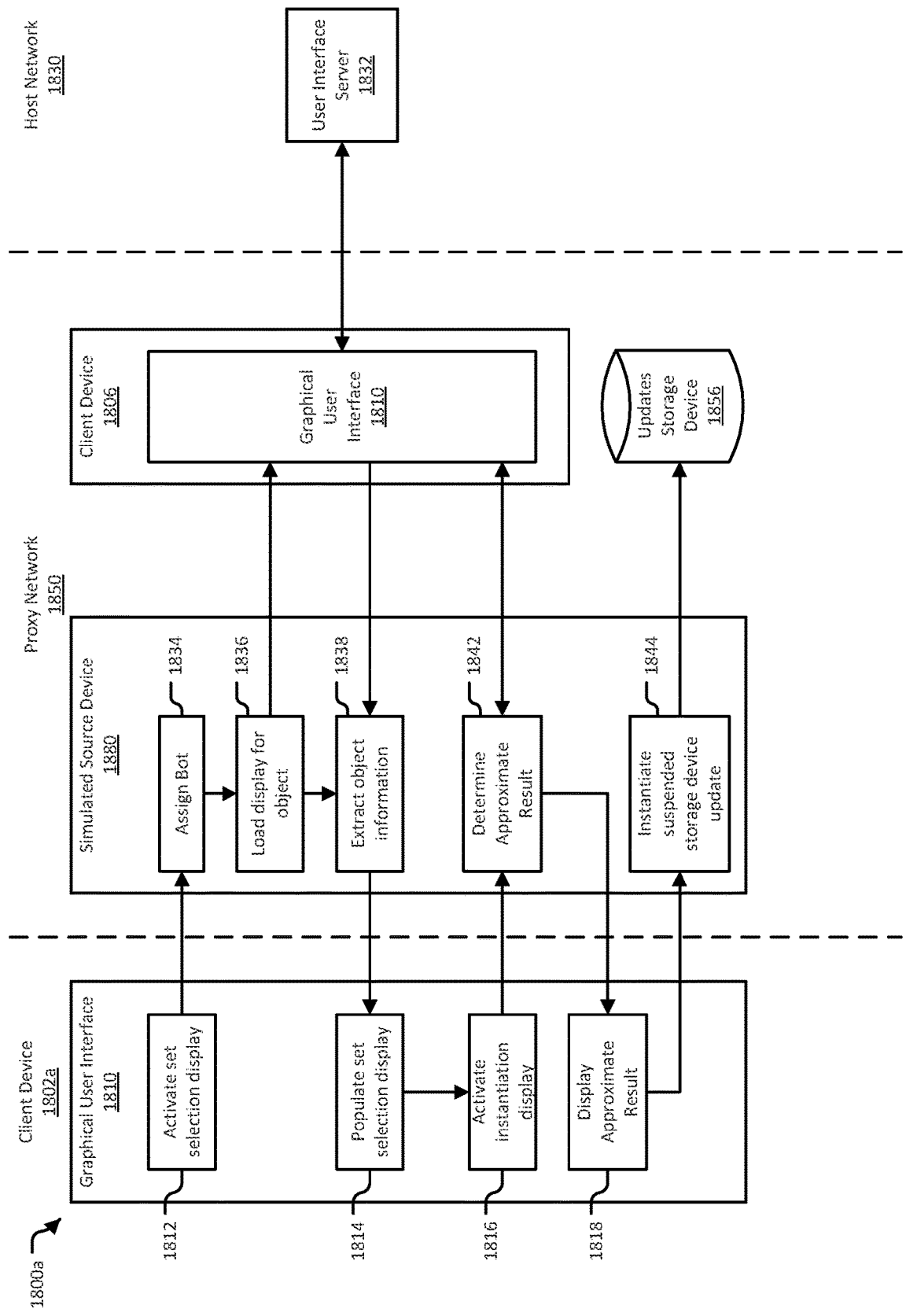
FIGS. 18A-18B illustrate an example of the processes that a simulated source device can implement to support a suspended storage device update.
Figure 18B:
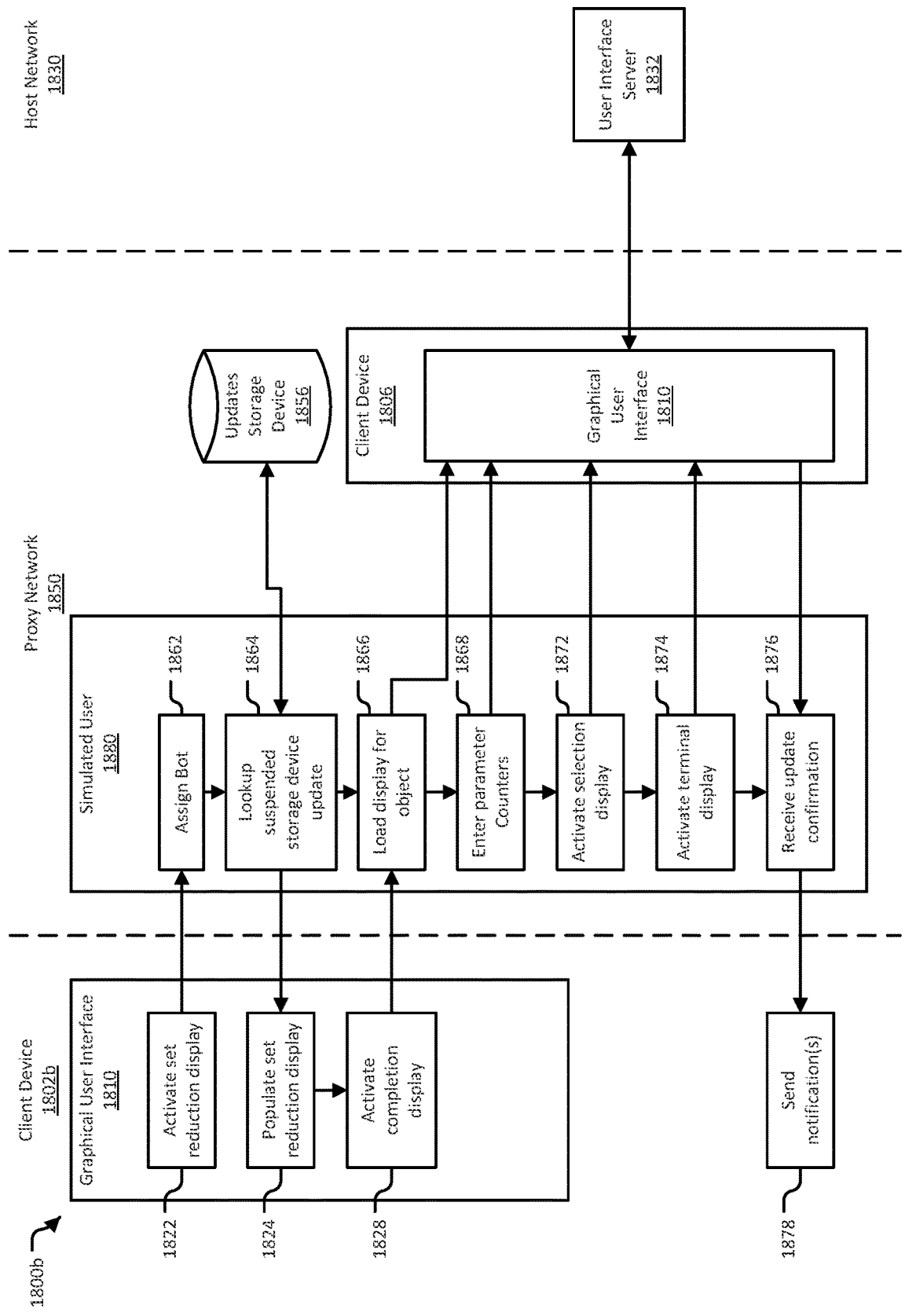

FIGS. 18A-18B illustrate an example of the processes 1800a-1800b that a simulated source device 1880 can implement to support a suspended storage device update. The simulated source device 1880 can be executing in an proxy network 1850. The proxy network 1850 can include a client device 1806 that is able to receive the graphical user interface 1810 generated by the host network 1830. The host network 1830 can include a source device interface server 1832 configured to deliver the graphical user interface 1810.

FIG. 18A illustrates an example of a process 1800a the simulated source device 1880 can implement when an instantiating source device initiates a suspended storage device update. The instantiating source device can initiate the suspended storage device update through the graphical user interface 1810 generated by the host network 1830. The instantiating source device can view the host's graphical user interface 1810 use a client device 1802a.

At step 1812, the instantiating source device can activate a set selection display. As discussed above, the set selection display can be injected into the graphical user interface 1810 by the proxy network 1850. Activation of the set selection display can be communicated to the simulated source device 1880 in the proxy network 1850. For example, an proxy application executing on the instantiating source device's client device 1802a can transmit a message.

At step 1834, in some implementations, the simulated source device 1880 can assign a bot to assist the suspended storage device update. The bot can be a forked thread, a sub-process of the simulated source device 1880, or some other independently executing program or process. The bot can cause the simulated source device 1880 to handle multiple suspended storage device updates at the same time and/or other concurrent operations. In some implementations, the bot can be configured to execute a specific set of steps, such as the steps discussed below. In some implementations, the bot can react to inputs from the instantiating source device, and can execute operations such as populating the set selection display with different objects. In some implementations, the bot can be dedicated to one suspended storage device update, and remains alive and active until the suspended storage device update is finished.

At step 1836, the bot can load a display for an object or object type. To do so, the bot can input selections, text, and any other needed inputs into the graphical user interface 1810 executing on the client device 1806. The bot's inputs can navigate the graphical user interface 1810 to the same objects that were viewed by the instantiating source device.

At step 1838, the bot can extract object information from the displays that were loaded by graphical user interface 1810 upon receiving the inputs entered at step 1836. Extracting the object information can involve, for example, reading text, conducting optical character recognition (OCR), conducting image recognition on images in the display, reading metadata, reading hidden data, parsing and interpreting structured data (e.g., data formatted using XML, JSON, or some other structured format), and so on.

The bot can send the extracted information back to the client device 1802a where the information can be received, for example, by an proxy application. At step 1844, the proxy application can populate the set selection display with the information. Using the set selection display, the instantiating source device can then select a set of objects to include in the suspended storage device update.

At step 1816, the instantiating source device can activate an instantiation display. As discussed above, the proxy network 1850 can inject the instantiation display into the graphical user interface 1810 so that the instantiating source device can initiate the suspended storage device update. Using the instantiation display, the instantiating source device can enter any information that may be needed to initiate the suspended storage device update.

The instantiating source device's inputs into the instantiation display can be communicated back to the bot. At step 1842, the bot can determine the approximated result for the suspended storage device update. To determine the approximated result, the bot can enter the information provided by the instantiating source device into the graphical user interface 1810 executing on the client device 1806. When necessary, the bot can enter approximated data, such as a representative object identifier, a representative numerical counter, and/or a representative destination. The bot can communicate the approximated result back to the instantiating source device's client device 1802a, to be displayed, using the instantiation display, at step 1818.

The instantiating source device can further activate a button or other graphical element to initiate the suspended storage device update. At step 1844, the bot can receive the activation command, and initiate the suspended storage device update. Initiating the suspended storage device update can include, for example, transferring the approximated result from the instantiating source device's counter transfer source, obtaining a lock from the host network, storing the suspended storage device update in the updates storage device 1856, and/or other operations. Once the suspended storage device update has been initiated, the bot can be shut down or deactivated, or be assigned to a different suspended storage device update.

FIG. 18B illustrates an example of a process 1800b the simulated source device 1880 can implement when a terminating source device finishes the suspended storage device update. The terminating source device can finish the suspended storage device update using the host's graphical user interface 1810 generated by the host network 1830. The terminating source device can view the host's graphical user interface 1810 using a client device 1802b.

At step 1822, the terminating source device can activate the set reduction display. As discussed above, the set reduction display can be injected into the graphical user interface 1810 by the proxy network 1850. Activation of the set reduction display can be communicated to the simulated source device 1880 in the proxy network 1850.

At step 1862, the simulated source device 1880 can assign a bot to the suspended storage device update. The bot can be a new process, launched specifically to handle the suspended storage device update, or can be a previously running process that was idle or otherwise not operating on a suspended storage device update.

At step 1864, the bot can look up the suspended storage device update in the updates storage device 1856. The bot can be provided with an update identifier for the suspended storage device update, which was provided when the set reduction display was activated. The both can send information stored with the suspended storage device update back to the terminating source device's client device 1802b.

At step 1824, an proxy application, for example, can populate the set reduction display using the information from the stored suspended storage device update. Populating the set reduction display can include, for example, loading images for objects (e.g., the objects in the object set for the suspended storage device update), as well as parameters for the objects. Using the set reduction display, the terminating source device can reduce the object set to a specific object.

At step 1828, the instantiating source device can activate the completion display, to provide completing information and to finish the suspended storage device update. As discussed above, the completion display can be injected into the graphical user interface 1810 by the proxy network 1850. Using the completing display, the terminating source device can enter any information that may be needed to finish the suspended storage device update.

The terminating source device's inputs into the set reduction display and completion display can be transmitted back to the bot executing in the proxy network 1850. At step 1866, the bot can enter the terminating source device's inputs into the graphical user interface 1810 executing on the client device 1806, to load the display for the object (or objects) selected by the terminating source device. Once the object's display is loaded in the graphical user interface 1810, at step 1868, the bot can enter the parameter values selected by the terminating source device, so that the bot can select the same object (e.g., an object having the same parameters) that was selected by the terminating source device. The bot can then activate a button or other graphical element that causes the graphical user interface 1810 to add the object to the selection display.

At step 1872, the bot can activate the selection display. In the selection display, the bot can, for example, modify parameters for objects, add other objects, verify that the selected objects correspond to the objects selected by the terminating source device, and so on.

At step 1874, the bot can activate the terminal display. The bot can enter any information that may be needed to finish an update of the selected objects. As noted above, this information can come from the instantiating source device's information, the terminating source device's information, information provided by the proxy network 1850, or a combination from each. Using the terminal display, the bot can then finish and actual update, and cause the update to be submitted to the host network 1830.

Once the actual update has been submitted, in some cases, the graphical user interface 1810 may display a confirmation or a notification that the update could not be executed. In these cases, at step 1876, the bot can read the graphical user interface 1810 to determine whether the graphical user interface 1810 is displaying a confirmation or a rejection of the submission. At step 1878, the bot can transmit a notification to the terminating source device and/or the instantiating source device, informing one or the other of the current status of the update. Once the notifications are sent, the bot can be shut down or assigned to another suspended storage device update.

The techniques discussed above for initiating a suspended storage device update involve the instantiating source device identifying an object set using a graphical user interface executing on a computing device. In some implementations, an proxy network can provide other methods by which an instantiating source device can identify an object set for a suspended storage device update. In these implementations, the terminating source device can finish the suspended storage device update in the same manner as discussed above, or in a different manner.

Figure 19A:
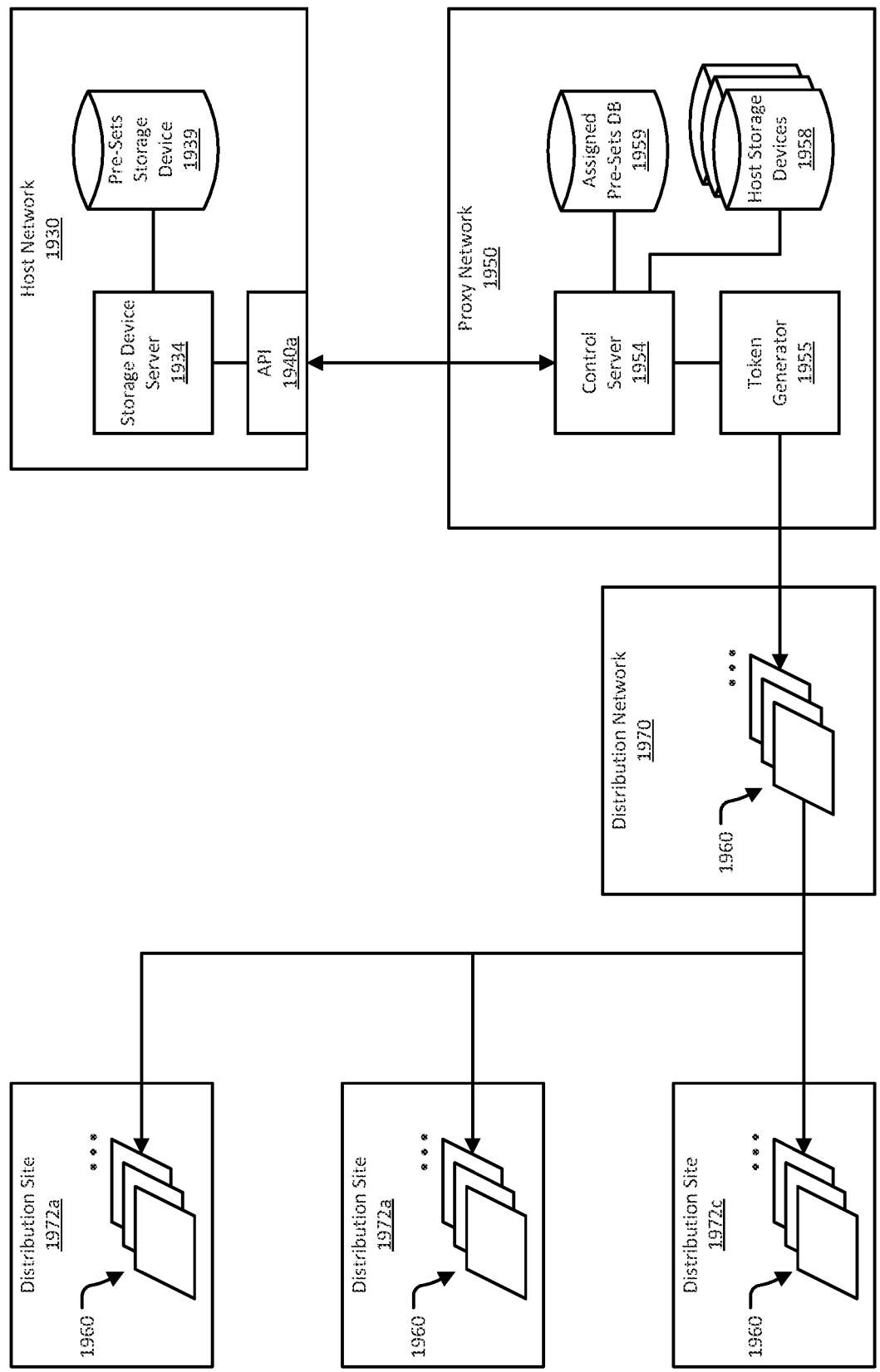
FIGS. 19A-19C illustrates an example of a system in which an proxy network can generate physical tokens that an instantiating source device can use to select an object set, and then use to initiate a suspended storage device update.
Figure 19B:
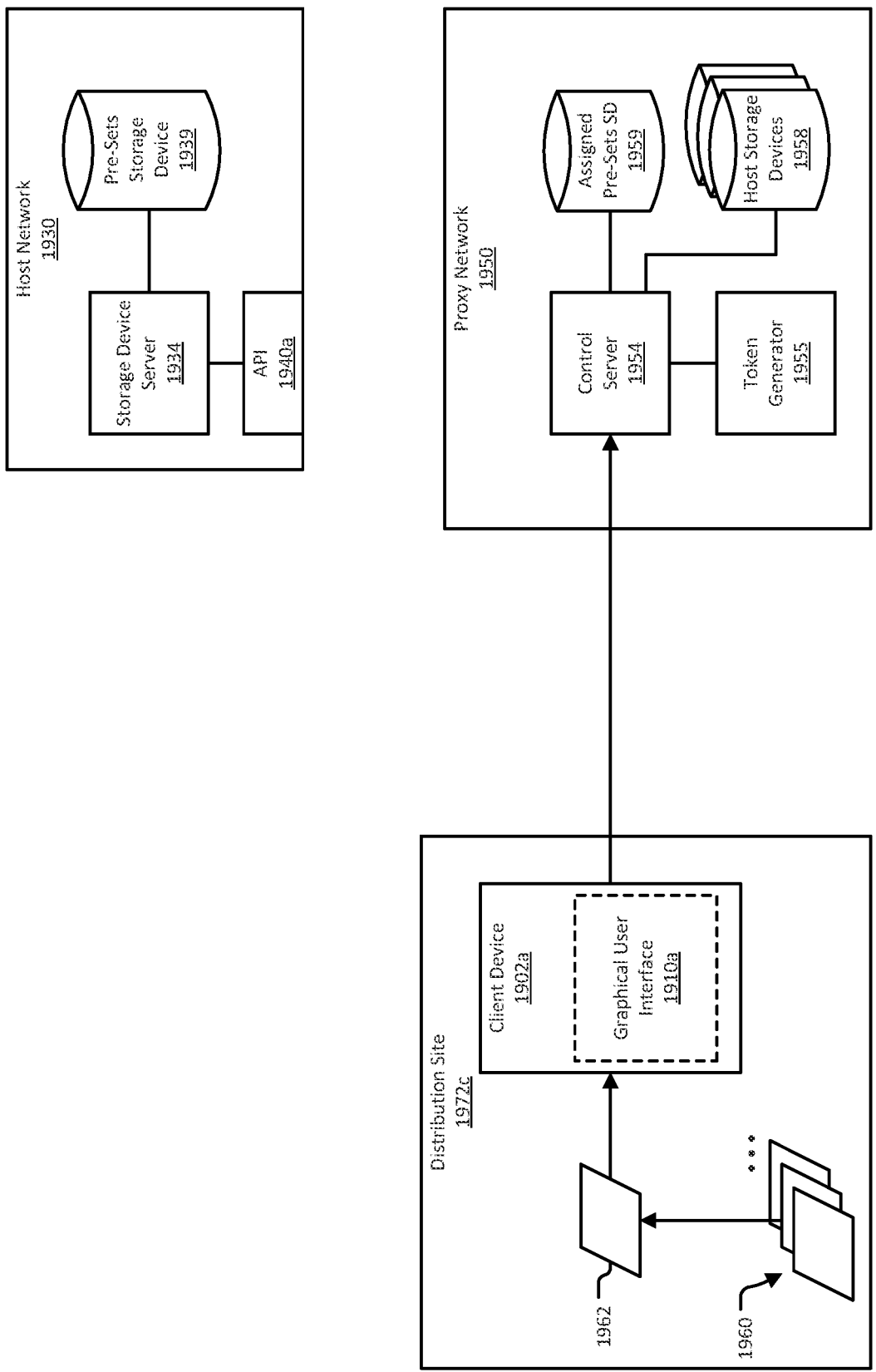
Figure 19C:
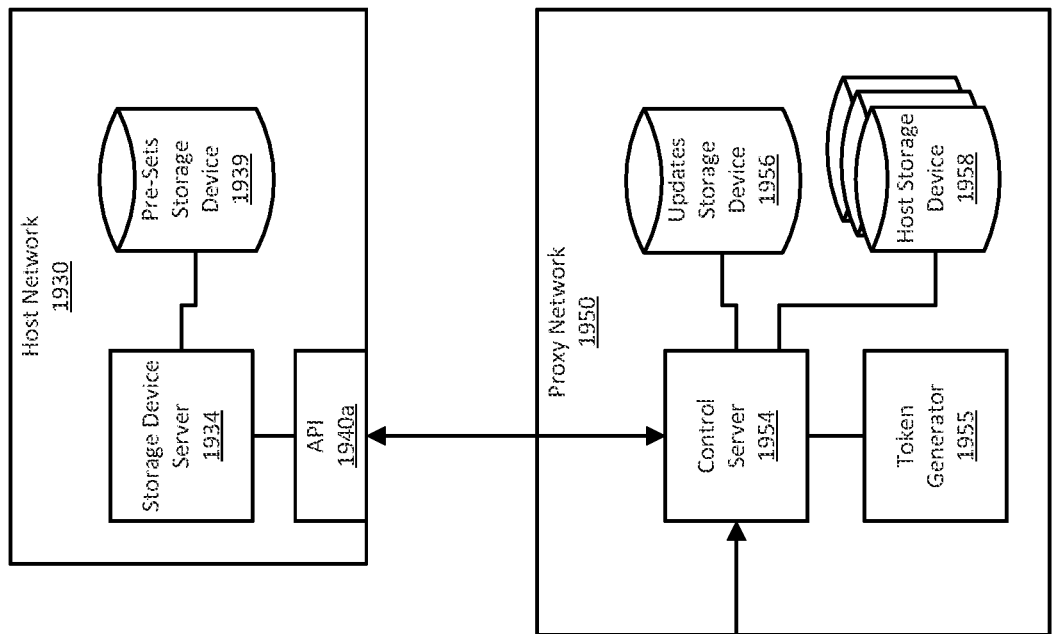
Figure 19C:
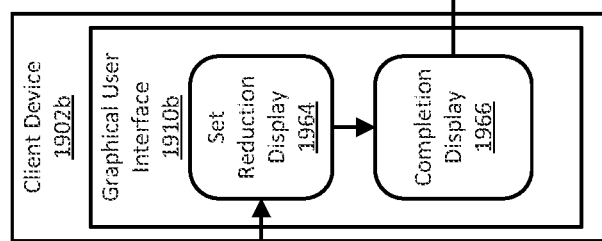

FIGS. 19A-19C illustrates an example of a system 1900 in which an proxy network 1950 can generate modifiable tokens 1960 that an instantiating source device can use to select an object set, and then use to initiate a suspended storage device update. In some implementations, the modifiable tokens 1960 can each be assigned to an object set. The modifiable tokens 1960 can also each be assigned to a pre-set counter from the host. The pre-set counter can cause a distribution site 1972a-1972c to transfer a modifiable token 1960 to an instantiating source device. Distribution sites are physical locations where the host's objects can be transferred to source devices. In some cases, the host can transmit objects to a distribution site, rather than directly to a source device, and the distribution site can transfer the objects to the source device. When an object is transferred at a distribution site to a source device, the distribution site can, in most cases, then update the host's object storage device to record the transfer. A distribution site may be controlled by the host, or may be controlled by another entity.

In most cases, distribution sites can transfer objects or pre-set counters to a source device. As is the case with the host's graphical user interface, the distribution sites may be not able to transfer an object set, where the exact object to transfer is not known and is not transferred to the instantiating source device. Additionally, the instantiating source device may not desire that the terminating source device, who would reduce the object set to a specific object, be present at the time the instantiating source device selects the object set. The distribution site may have pre-set counters that the distribution site can transfer to the instantiating source device, where the pre-set counter is not associated with any object and can be used (e.g., by a terminating source device) to obtain a specific object. A pre-set counter, however, may not cause the instantiating source device to identify an object set, which may be preferable to the instantiating source device.

Modifiable tokens 1960 generated by the proxy network 1950 can cause a distribution site to provide pre-set counters that can be associated with an object set. In the example illustrated in FIG. 19A, the proxy network 1950 can obtain codes for pre-set counters from a host network 1930. For example, a control server 1954 in the proxy network 1950 can communicate with an API 1940a of the host network 1930 to request codes for pre-set counters. Alternatively or additionally, the control server 1954 can inquire for pre-set counters by email or a secure message service, such as when the host network 1930 does not have an API. The inquiry can be handled, for example, by a storage device server 1934 in the host network 1930. The storage device server 1934 can access a pre-sets storage device 1939, which stores available pre-set counters and codes associated with the pre-set counters. The storage device server 1934 can make a set of pre-set counters available to the proxy network 1950. In some cases, the storage device server 1934 can change the status in the pre-sets storage device 1939 to indicate that the codes for these pre-set counters have been sent to the proxy network 1950. In some cases, the codes assigned to the proxy network 1950 can only be used by the proxy network 1950. In some cases, the codes can also be assigned to other entities.

In some implementations, the control server 1954 can store the codes associated with pre-set counters in an assigned pre-sets storage device 1959. In some implementations, the control server 1954 can optionally also associate an object set with a pre-set counter. The control server 1954 can, for example, access a host-specific host storage device 1958 to identify object sets that are eligible for suspended storage device updates. The object sets can have been previously designated by the host, or the proxy network 1950 can have previously determined the object sets. In some implementations, the association between the pre-set counter and the object set can be stored in the assigned pre-sets storage device 1959.

In some implementations, the proxy network 1950 can include a token generator 1955 that can associate a pre-set counter with a modifiable token 1960. In some implementations, a token can be a physical object that is associated with a code generated by the token generator 1955. The physical object can be, for example, a two-dimensional or a three-dimensional object constructed from paper, plastic, metal, or some other material. In these examples, the two- or three-dimensional object can be, for example, in the shape of the objects with which the pre-set counter is associated, or in some other shape (e.g., a gift box). Alternatively or additionally, a picture of the objects can be printed on the token. In cases where the pre-set counter is not associated with an object set, the token can be any shape or size, and/or can have any appealing graphic printed on it. In some implementations, the control server 1954 can store newly generated token codes in the assigned pre-sets storage device 1959 with a "new" state, to indicate that the modifiable tokens 1960 are newly generated and have not yet been transferred to a source device.

In some implementations, the proxy network 1950 can transfer the modifiable tokens 1960 to a distribution network 1970, which can distribute the modifiable tokens 1960 to some distribution sites 1972*a*-1972*c*. Examples of distribution network 1970 include some types of physical transporters. In some implementations, the proxy network 1950 does not transfer physical tokens to the distribution network 1970, and instead transfers the codes that correspond to the modifiable tokens 1960. In these implementations, the distribution network can be, for example, a network.

FIG. 19B illustrates an example of an instantiating source device communicating with a distribution site 1972*c* in order to obtain a modifiable token 1962. In some examples, the instantiating source device can visit the distribution site 1972*c* to examine the objects provided by the host. In some cases, the objects may be physically present for examination. The instantiating source device may select an object, but decide that the particular parameters for the object should be determined by a terminating source device. In these and other examples, the instantiating source device can request a modifiable token 1962.

In some implementations, the modifiable token 1962 can be assigned to an object set at the time when the instantiating source device requests the modifiable token 1962. For example, the distribution site 1972*c* can include a client device 1902*a*, into which a code associated with the modifiable token 1962 and an object identifier can be entered. In some implementations, the proxy network 1950 may provide a graphical user interface 1910*a* for inputting the data. In this example, the proxy network 1950, for example using a control server 1954, can associate the code for the modifiable token 1962 with the object set, and store this association in the assigned pre-sets storage device 1959. In some implementations, the graphical user interface 1910*a* can further include an instantiation display, into which the instantiating source device can enter instantiation identification data, initial terminal data, and/or optionally also terminator contact data.

In some implementations, when the proxy network 1950 receives these inputs, the proxy network 1950 can, for example using the control server 1954, associate the code for the modifiable token 1962 with the object set, and update the status for the modifiable token 1962 to an active state, to indicate that the modifiable token 1962 has been transferred to a source device. The control server 1954 can further initiate a suspended storage device update for the object set, using the processes discussed above.

In some examples, the instantiating source device can leave the distribution site 1972*c* with a physical token. In some implementations, the modifiable token 1962 can be generated at the distribution site 1972*c*, for example using a two-dimensional or three-dimensional printer. In these and other implementations, the modifiable token 1962 can be modified to display or represent the object set with which the modifiable token 1962 is associated.

In other examples, the instantiating source device can view modifiable tokens 1960 at a distribution site 1972*c*. In these examples, the modifiable tokens 1960 may have previously been associated with objects sets, for example by the token generator 1955. In some examples, a illustration of an object set can have been printed on a modifiable token 1960, or the modifiable token 1960 can be shaped in the form of an object from an object set. When the instantiating source device has selected a particular modifiable token 1962 from among the available modifiable tokens 1960, the particular modifiable token 1962 can be activated, for example, using the client device 1902*a* located at the distribution site 1972*c* or using some other client device (e.g., the instantiating source device's client device).

In some examples, the instantiating source device can give the modifiable token 1962 to a terminating source device. FIG. 19C illustrates an example of the terminating source device communication to finish the suspended storage device update that is associated with the modifiable token 1962. In some implementations, the terminating source device can input the code associated with the modifiable token 1962 into a graphical user interface 1910*b*. The terminating source device can access the graphical user interface 1910*b* using a client device 1902*b*, which may be the terminating source device's own client device or can be a client device of another. For example, the client device may be one that can be used at a distribution site. The graphical user interface 1910*b* may be provided by the proxy network 1950, or may be provided by the host network 1930 and include displays injected into the graphical user interface 1910*b* by the proxy network 1950.

For example, the graphical user interface 1910*b* can include a set reduction display 1964 and a completion display 1966 provided by the proxy network 1950. Using the set reduction display 1964, the terminating source device can view the object set that is associated with the modifiable token 1962. To populate the set reduction display 1964, the proxy network 1950, for example using the control server 1964, can look up the suspended storage device update in the updates storage device 1956, and send information about the suspended storage device update to the client device 1902*b*. The terminating source device can further reduce the object set to a specific object, by selecting parameters. Using the completion display 1966, the terminating source device can enter completion information, such as terminator identification data and terminal data. The terminating source device can further finish the suspended storage device update.

In some implementations, when the terminating source device finishes the suspended storage device, the proxy network 1950, for example using the control server 1954, can submit actual update to the host network 1930. For example, the host network 1930 may have API functions that cause the proxy network 1950 to submit an update. Submitting the update can include using the pre-set counter that is associated with the modifiable token 1962, so that the pre-set counter can be used for all or part of the terminal result. The control server 1954 can further update the status for the modifiable token 1962 to "used" or something similar to indicate that the pre-set associated with the modifiable token 1962 counter has been used in an actual update. Once the update has been submitted to the host network 1930, the host network 1930 can update the status of the object that was selected by the terminating source device, and can transmit the object to the terminating source device.

In some implementations, the terminating source device can obtain the object from a distribution site instead of having the object transmitted from the host. In these implementations, the terminating source device can finish the suspended storage device update at the distribution site, for example using a client device provided at the distribution site. In these implementations, the proxy network 1950 can submit the pre-set counter that is associated with the modifiable token to the host network 1930. Upon receiving an acknowledgment from the host network 1930, the proxy network 1950 can send the acknowledgement to the distribution site. The distribution site can then transfer the object to the terminating source device.

Figure 20A:
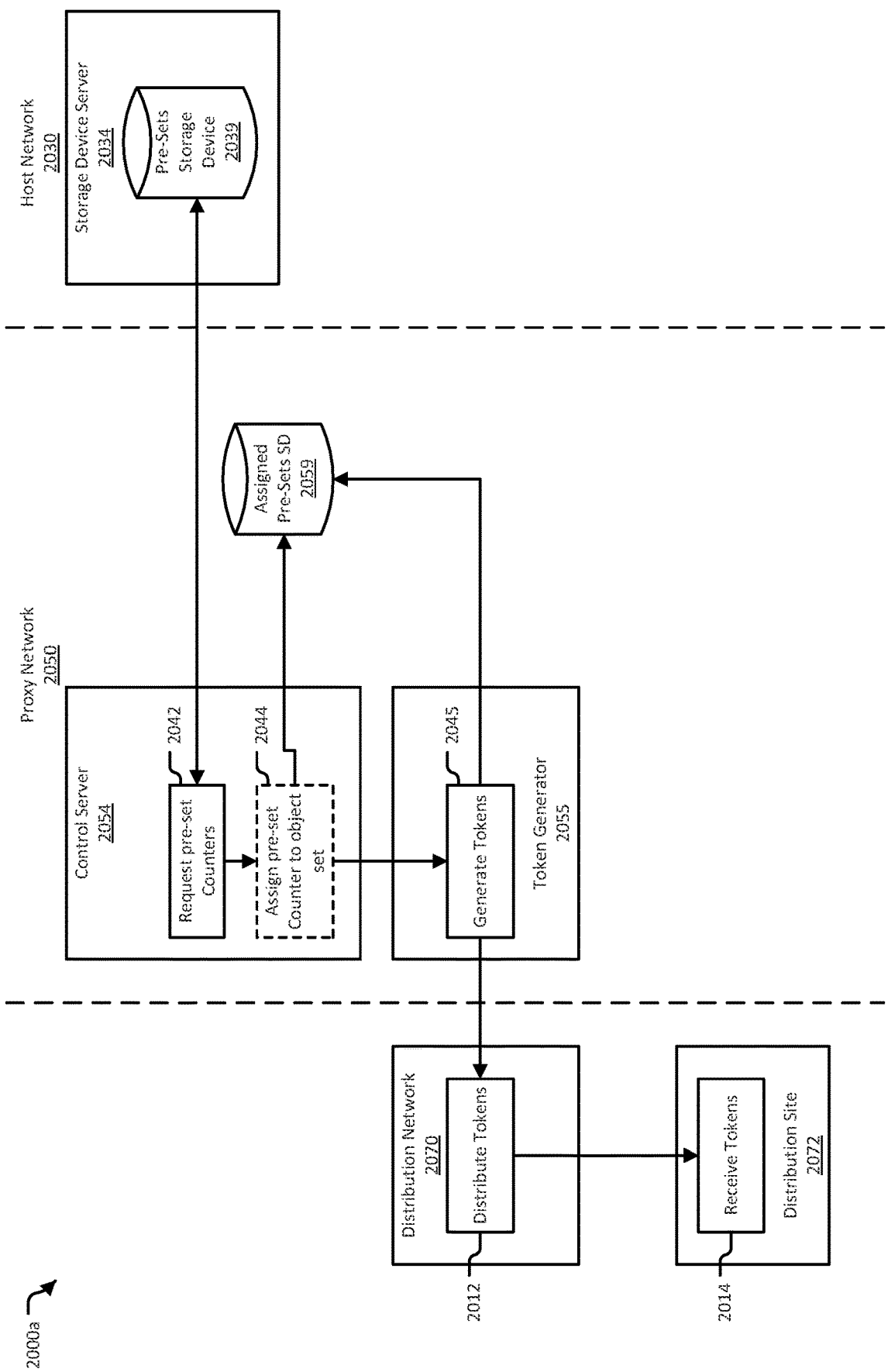
FIG. 20A illustrated an example of a process by which an proxy network can distribute tokens to a distribution site.

FIG. 20A illustrated an example of a process 2000a by which an proxy network 2050 can distribute modifiable tokens to a distribution site 2072. In some implementations, the proxy network 2050 can include a control server 2054 that can be configured to, at step 2042, request pre-set counters from a host network 2030. The host network 2030 can include, for example, a pre-sets storage device 2039 that stores available pre-set counters. The pre-set counters can be associated with one or more codes. In some implementations, the host network 2030 can include a storage device server 2034 that is able to receive received the request from the proxy network 2050, and can select pre-set counters in the pre-sets storage device 2039 that can be assigned to the proxy network 2050. The storage device server 2034 can further update the pre-sets storage device 2039 to indicate that the selected pre-set counters have been assigned to the proxy network 2050.

At step 2044, the proxy network 2050 can optionally associate the pre-set counters obtained at step 2042 to object sets. For example, the proxy network 2050 the host network 2030 may have given the proxy network 2050 lists of object sets that are available for suspended storage device updates. In this example, the control server 2054 can select object sets from the list and associate the object set with a pre-set counter. In some implementations, the control server 2054 can store the association between the pre-set counter and the object set in an assigned pre-sets storage device 2059.

In some implementations, at step 2044, the control server 2054 just stores the pre-set counters obtained at step 2042 in the assigned pre-sets storage device 2059, and does not associate the pre-set counters with object sets.

At step 2045, the proxy network 2050 can use a token generator 2055 to generate modifiable tokens. Generating modifiable tokens can include generating codes for the modifiable tokens. In some implementations, one code can be used any number of times, or can be used a number of times that is specified by the pre-set counter that the modifiable token is associated with. In some implementations, generating modifiable tokens can include generating a physical representation of the modifiable token, such as a two- or three-dimensional object. In some implementations, the token generator 2055 can associate a modifiable token with the pre-set counter in the assigned pre-sets storage device 2059. The token generator 2055 or the control server 2054 can set a status for the modifiable token to "new" or something similar to indicate that the modifiable token is new and not yet transferred to a source device.

At step 2012, the proxy network 2050 can transfer the modifiable tokens to a distribution network 2070 for the distribution network 2070 to distribute the modifiable tokens. Distribution of the modifiable tokens can include distributing physical tokens to a distribution site 2072. Alternatively or additionally, distribution of the modifiable tokens can include distributing the token codes to the distribution site 2072.

At step 2014, the distribution site 2072 can receive the modifiable tokens, and make the modifiable tokens available to source devices.

Figure 20B:
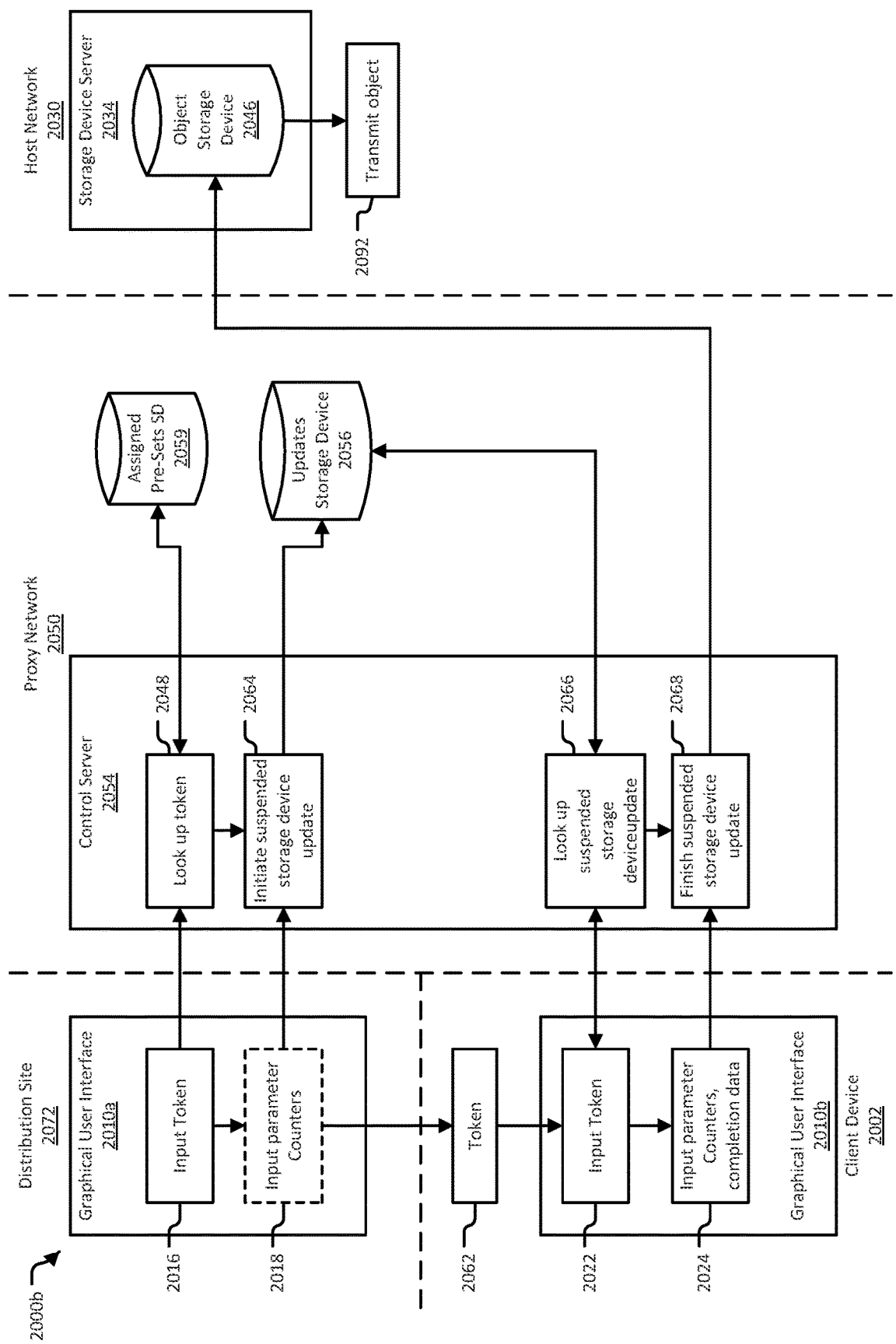
FIG. 20B illustrates an example of a process in which an instantiating source device can use a token to initiate a suspended storage device update, and a terminating source device can use the same token to finish the suspended storage device update.

FIG. 20B illustrates an example of a process 2000b in which an instantiating source device can use a modifiable token 2062 to initiate a suspended storage device update, and a terminating source device can use the same modifiable token 2062 to finish the suspended storage device update. In some examples, the instantiating source device can visit the distribution site 2072 to view either the modifiable tokens or objects that are available at the distribution site 2072. In some cases, the modifiable tokens may be associated with object sets, in which case the instantiating source device can select an object set by selecting the appropriate modifiable token 2062. In some cases, the instantiating source device can modify the modifiable token 2062 by selecting an object set and having the modifiable token 2062 associated with the object set. In some cases, the instantiating source device can have the distribution site 2072 make the association, and in some cases the instantiating source device can make the association at some later time, using a graphical user interface 2010a on a client device.

In any of the above cases, once the instantiating source device has acquired a modifiable token 2062, the instantiating source device can, at step 2016, input the modifiable token 2062 (or the code associated with the modifiable token 2062) into a graphical user interface 2010a. In some implementations, the graphical user interface 2010a is provided by the proxy network 2050. In some implementations, the graphical user interface 2010a is provided by the host network 2030, possibly with displays injected into the graphical user interface 2010a for inputting the modifiable token 2062.

At step 2048, the control server 2054 can look up the modifiable token 2062, for example in the assigned pre-sets storage device 2059. In some implementations, control server 2054 can ensure that the code associated with the modifiable token is valid, and/or can set a status for the modifiable token 2062 as "active" or something similar, to indicate that the modifiable token 2062 has been transferred to a source device.

At step 2018, the instantiating source device can optionally input parameter values. In some implementations, the parameter values can limit or reduce the types of objects that re in the object set. The parameter values can be input into the graphical user interface 2010a, and be received by the proxy network 2050.

At step 2064, the control server 2054 can initiate a suspended storage device update, using the modifiable token 2062 and the object set that was associated with the modifiable token 2062. In some implementations, the control server 2054 can store the suspended storage device update in an updates storage device 2056, along with the code for the modifiable token 2062.

Having obtained the modifiable token 2062 at the distribution site 2072, the instantiating source device can give the modifiable token 2062 to the terminating source device. At step 2022, the terminating source device can input the modifiable token's code into a graphical user interface 2010b that can be accessed using a client device 2002. The graphical user interface 2010b can be provided by the proxy network 2050 or can be provided by the host network 2030, with displays injected into the graphical user interface 2010b by the proxy network 2050.

At step 2066, the control server 2054 can receive the token code from the client device 2002. The control server 2054 can use the token code to look up the suspended storage device update in the updates storage device 2056, including the object set that is associated with the suspended storage device update. The control server 2054 can use the stored data to display the object on the client device 2002, through the graphical user interface 2010*b*. This can cause the terminating source device to view the object set.

At step 2024, the terminating source device can input parameter values to reduce the object set to a particular object. The terminating source device can further input completion data that might be needed to finish the suspended storage device update.

At step 2068, the control server 2054 can use the parameters and completion data input into the graphical user interface 2010*b* to finished the suspended storage device update. Finalizing the suspended storage device update can include formulating and submitting an actual update to the host network 2030. The update can cause the object that was selected by the terminating source device to be updated in an object storage device 2046 in the host network 2030. In some cases, at step 2092, the object can be transmitted to the terminating source device or some other entity.

In some implementations, an proxy network can include compromise detection systems, to prevent compromised object updates of a host's object storage device. A compromised update is one in which the object update is submitted with deceptive intent, possibly resulting in objects from the host's object storage device being transferred to an unknown destination address and without the proper counter being transferred to the host. An object update can have compromised when the object update was submitted, for example, with falsified data.

A host network can include compromise detection systems to determine whether a suspended storage device update has been compromised. These compromise detection systems may rely on the destination address to which an object is to be transmitted. False destination addresses can be difficult to generate, and often the falsity of the destination address can be discovered when transmission of an object to the destination address fails. Thus the host network's compromise detection system can examine statistical usage of the destination address to determine whether an update is compromised. For example, a destination address that is used frequently for object updates, that is used for many apparently unrelated object updates, that is used by different source devices, and so on, may be suspect. Object updates that use suspect transmission destination addresses can be denied, and can be caused only after additional compromise detection steps have been conducted.

In a suspended storage device update, it may be desirable to determine whether the suspended storage device update is compromised when the suspended storage device update is initiated. If the suspended storage device update is compromised, then the suspended storage device updated can be blocked before any object update is submitted to the host network.

Figure 21:
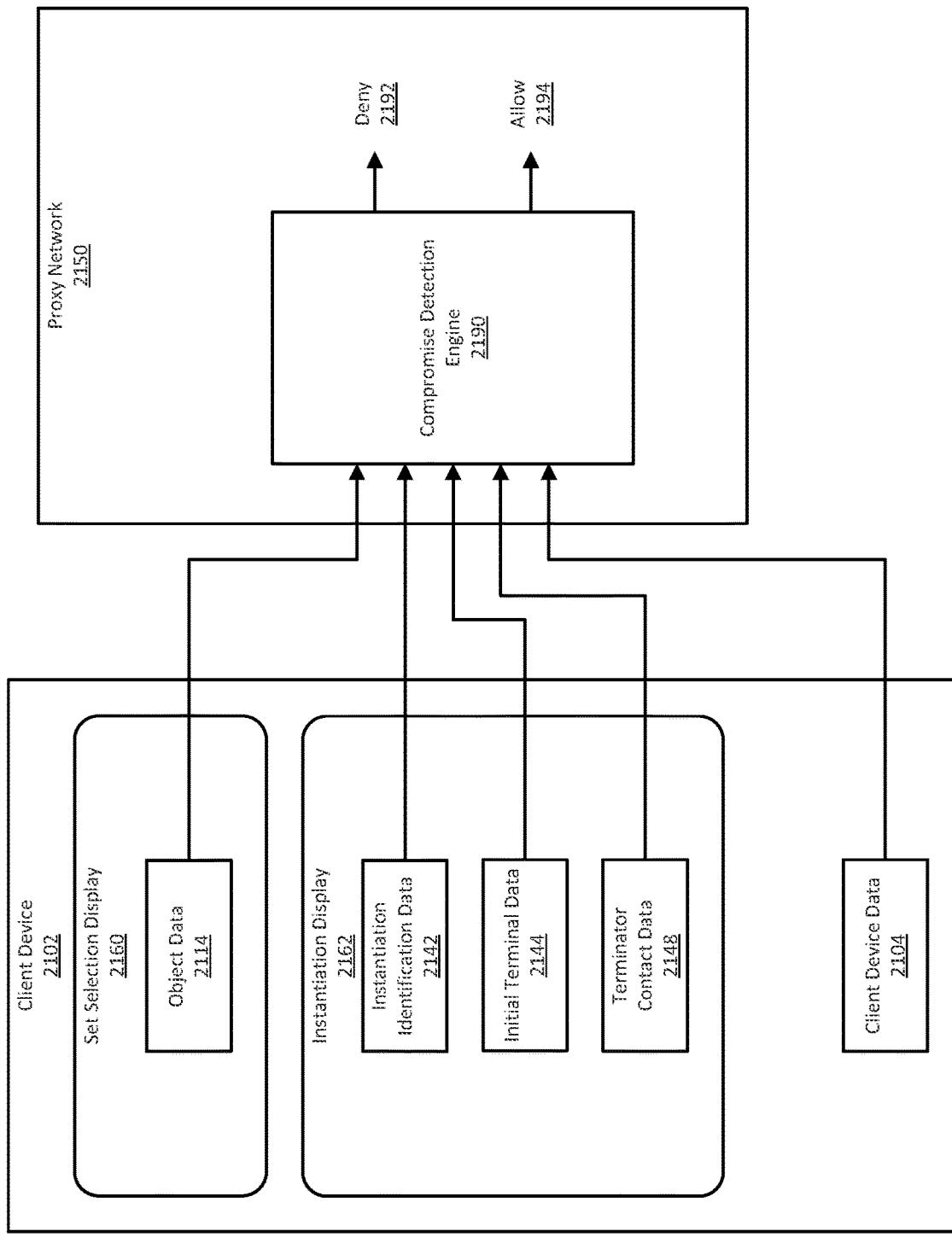
FIG. 21 illustrates an example of a validation engine implemented in an proxy network.

FIG. 21 illustrates an example of a compromise detection engine 2190 implemented in an proxy network 2150. In some implementations, the compromise detection engine 2190 can use information other than, or in addition to, a transmission destination address to determine whether a suspended storage device update is has been compromised. In some implementations, the compromise detection engine 2190 can use this other information to do a more comprehensive analysis of the suspended storage device update than may be possible using just the destination address.

In some implementations, the compromise detection engine 2190 can receive information input by the instantiating source device into a client device 2102 and/or information that can be derived from the instantiating source device's client device 2102. An proxy application, for example, can be executing on the client device 2102, and capture typing, mouse clicks, touch-screen inputs, voice inputs, motion inputs, and so on. In some implementations, the proxy application can query the client device 2102 for information about the client device 2102, such as location information, the device's hardware configuration and/or software configuration, and/or historical usage information. In these and other examples, the proxy application can transmit the information obtained by the proxy application to the proxy network 2150, for receipt by the compromise detection engine 2190.

Examples of inputs by the instantiating source device that can be provided to the compromise detection engine 2190 include inputs into set selection display 2160 and/or instantiation display 2162 that are injected into a graphical user interface by the proxy network 2150. From the set selection display 2160, the compromise detection engine 2190 can receive information such as object data 2114. The object data 2114 can include, for example, object identifiers, selected parameter values, a quantity of objects selected, and so on. From the instantiation display 2162, the compromise detection engine 2190 can receive information such as the instantiation identification data 2142, initial terminal data 2144, and/or terminator contact data 2148.

Examples of data that can be derived from the client device, or client device data 2104, can include current data, historical data, and/or other data about the client device 2102. Current data can include, for example, the client device's current location, such as a geographical location and/or a network location (e.g., the current network the client device 2102 is connected to, the device's current IP address, a domain name for the network the device is connected to, etc.). Current data can further include currently available and/or executing applications on the client device 2102, the device's operating system and/or operating system version, currently available memory, current memory usage. Historical data can include, for example, a log of previously launched applications, a log of previous inputs (e.g., typing, mouse clicks, touch screen inputs, voice inputs, etc.), a log of previous geographical and/or network locations, and/or a log of recently visited websites or other network locations, among other things. Other data about the client device 2102 can include a device type (e.g., whether the client device 2102 is a handheld device, a desktop computer, a laptop computer, etc.), a manufacturer of the device, information identifying the client device's processor, the device's available communication channels, the device's available peripherals, and so on.

In some implementations, the compromise detection engine 2190 can use the data from the client device 2102 to determine a likelihood that a suspended storage device update is compromised. For example, the compromise detection engine 2190 can examine the history of updates submitted by the particular client device 2102 and/or submitted from a particular geographical or network location, and correlate the results against historical records of compromised object updates. For example, historical record may indicate that updates submitted from a particular domain have often been compromised. As another example, updates from the particular client device 2102 may be for objects that have no apparent relationship with each other (e.g., these objects would only infrequently be updated by the same source device), or may often by very objects with very high numerical counters. As another example, updates submitted by the same client device 2102 may include many different, seemingly unrelated destination addresses. Or, conversely, many different client devices may have been used to submit updates using the same destination address.

In some examples, the compromise detection engine 2190 can also look at other behavioral data points. For example, the compromise detection engine 2190 can look at the frequency of inputs into the client device 2102, which can indicate, among other things, that the inputs are being provided in an automated manner (e.g., by a program or robot program). As another example, the compromise detection engine 2190 can examine the history of websites or other network locations visited by source devices of the client device 2102. For example, frequent visits to many different graphical user interfaces of different hosts may indicate suspect behavior.

In some implementations, to determine whether a particular data point indicates that a suspended storage device update is compromised, the compromise detection engine 2190 can assign a threshold to the data point. For example, for occurrences of unrelated objects updated from the same client device 2102 and/or being transmitted to the same destination address, the compromise detection engine 2190 can be configured with a threshold of (for example) 20%. In this example, when there are 12 out of 50 occurrences of unrelated objects being updated from the same client device 2102 and/or being transmitted to the same destination address, the compromise detection engine 2190 can determine that the data point indicates a likelihood of compromise. As another example, for occurrences of different client devices using the same destination address when submitting an object update, the compromise detection engine 2190 can be configured with a threshold of (for example) 8. In this example, when 8 or more different client devices use the same destination address, then the data point indicates a likelihood that the update is compromised. As another example, the compromise detection engine 2190 can be configured with a threshold of 1000 ms, such that, when typing input, mouse clicks, touchscreen inputs, and other inputs are being input into the compromise detection engine 2190 at a rate faster than 900 ms, it is likely that the inputs are being generated by a robot. In this example, use of the robot may be to generate many more object updates than a human may be capable of submitting.

In some implementations, the compromise detection engine 2190 can assign weights to the some data points that the compromise detection engine 2190 examines. In these implementations, one data point may be sufficient for the compromise detection engine 2190 to issue a deny 2192 signal for a suspended storage device update. Alternatively or additionally, one data point alone may not be sufficient for a deny 2192 signal, but a combination of data points, weighed together, may be enough for a deny 2192 signal. For example, in some implementations, the compromise detection engine 2190 can generate a score for each data point (e.g., a values between 0 and 100, or 0 to indicate compromise and 1 to indicate compromise, or some other score), and multiply each score by a corresponding weight. In this example, when the sum of the products is greater than a threshold, then the compromise detection engine 2190 can issue a deny 2192 signal result, Otherwise, when the data points, when weighed together, do not indicate that the suspended storage device update is compromised, the compromise detection engine 2190 can issue an cause 2194 signal.

In some implementations, the deny 2192 signal or cause 2194 signal from the compromise detection engine 2190 can be received by other systems in the compromise detection engine 2190, such as a control server that is managing the suspended storage device update. In these and other implementations, when the result is a deny 2192 signal, the control server can communicate the deny 2192 signal back to the instantiating source device. The control server can also notify an administrator of the proxy network 2150 and/or log the incident. In some implementations, the proxy network 2150 can be configured to request additional information from the instantiating source device, so that the compromise detection engine 2190 has more information for determining compromise, and/or so that an administrator can manually examine the suspended storage device update. In some implementations, the deny 2192 signal may not be communicated back to the client device 2102, so that the instantiating source device is lead to believe that the suspended storage device update occurred. In these and other implementations, an administrator can manually inspect the suspended storage device update and determine whether to cause the update, or to obtain more information about the instantiating source device by causing the update. Causing a possibly compromised object update can cause the proxy network 2150 to gather more information when the suspended storage device update is finished.

In some implementations, the compromise detection engine 2190 can also determine whether a suspended storage device update is compromised when the suspended storage device update is finished. For example, the compromise detection engine 2190 can look at the amount of elapsed time between initiation and completion of a suspended storage device update, where a short amount of time can indicate compromise. As another example, the compromise detection engine 2190 can look at the selections made, such as for example identifying cases where the same terminating source device selected inconsistent objects (e.g., having different values for the same parameter). As another example, the compromise detection engine 2190 can request validation of the instantiating source device's counter transfer source, from the maintainer of the transfer source. In this example, when the maintainer reports suspicious activity, the compromise detection engine 2190 can determine to issue a deny 2192 signal when the suspended storage device update is finished (or when the suspended storage device update is initiated). In some implementations, denying a suspended storage device update at the point of completion can still insulates the host from receiving a compromised object update, so that the host's object storage device is unaffected.

Figure 22:
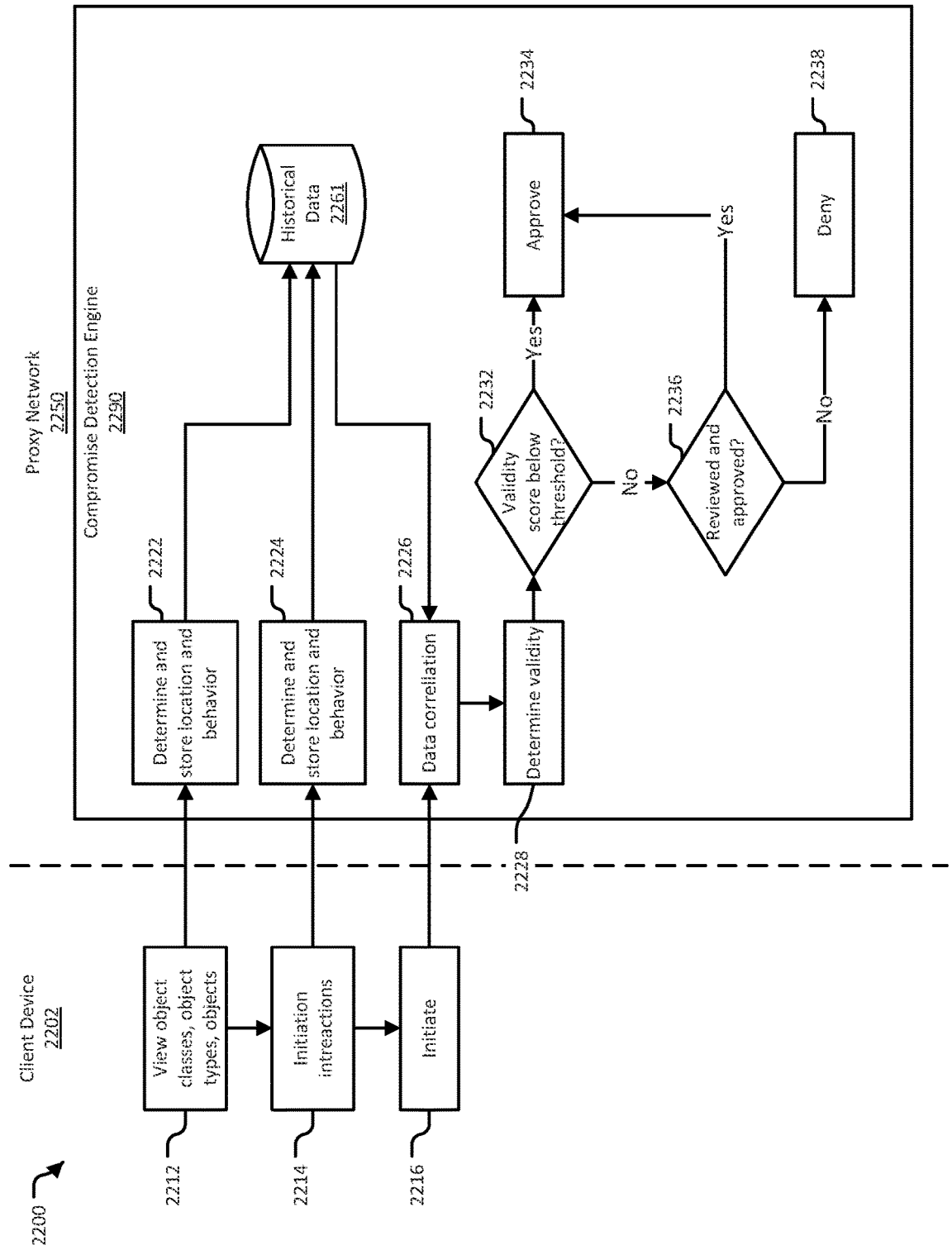
FIG. 22 illustrates an example of a process that can be implemented by a validation engine to verify the validity of a suspended storage device update.

FIG. 22 illustrates an example of a process 2200 that can be implemented by a compromise detection engine 2290 to verify whether a suspended storage device update is compromised. The compromise detection engine 2290 can be executing on a system in an proxy network 2250. In some implementations, the compromise detection engine 2290 can be executing on a client device 2202, for example as part of an proxy application. Alternatively, part of the compromise detection engine 2290 can be executing on the client device 2202 while the rest executes in the proxy network 2250.

At step 2212, the instantiating source device's actions, such as viewing object classes, object types, objects, and other displays in a graphical user interface can be captured. In some implementations, inputs into the displays injected by the proxy network 2250 into the graphical user interface can be provided to the compromise detection engine 2290. When available, an application executing on the client device 2202, such as an proxy application, can also capture the instantiating source device's inputs into other applications. In some cases, the application may also be able to access information about the client device 2202, including, for example, geographic location information, network location information (e.g., a network address, domain name, Internet Service Host, etc.), historical information, the hardware configuration of the client device 2202, and/or the software configuration of the client device 2202.

At step 2222, the compromise detection engine 2290 can store the location and/or behavior information derived at step 2212. In some implementations, the information can be stored in a storage device for storing historical data 2261. In the historical data 2261 storage device, the information can be indexed by, for example, an identity associated with the instantiating source device, an identity associated with the client device 2202, an identity of a counter transfer source, the geographical and/or network location of the client device 2202 at the time the inputs were captured, the objects selected for the suspended storage device update, and/or using other data associated with the location and behavior.

At step 2214, the instantiating source device's instantiation communications can be captured. The initiation actions can include, for example, the speed at which inputs for initiating the suspended storage device update were received, the values input for initiating the suspended storage device update, other inputs into the client device 2202 input during the course of initiating the suspended storage device update, and/or other activities that can be captured from the client device 2202 at the time the suspended storage device update is initiated. In some implementations, other information, such as location information, can additionally or alternatively be captured in this step.

At step 2224, the compromise detection engine 2290 can store the location and/or behavior information derived at step 2214 in the historical data 2261 storage device. In some implementations, the additional information can be added to existing data, and/or can be compared to existing data. The existing data can include the data stored at step 2222 and/or data that were previously identified as having been input by the instantiating source device, from the same client device 2202, and/or from the same network address. In some implementations, the compromise detection engine 2290 can stored the result of the comparison in the historical data 2261 storage device.

At step 2216, the instantiating source device can initiate the suspended storage device update. When the suspended storage device update is initiated, at step 2226, the compromise detection engine 2290 can execute data correlation. Data correlation can include analyzing the data stored at steps 2222 and 2224 in view of the historical data 2261. For example, the compromise detection engine 2290 can analyze historical data that may be associated with the same terminating source device, the same client device 2202, the same network address, the same counter transfer source, and/or the same terminator contact information, among other things, to look for a pattern. The pattern can include, for example, a frequency of initiating suspended storage device updates, the speed at which suspended storage device updates are initiated, consistency or lack of consistency in the objects selected, consistency or lack of consistency in the client device 2202 used, consistency of lack of consistency in the terminator contact information used, and so on.

At step 2228, the compromise detection engine 2290 can consider the correlation results from step 2226, and determine whether the suspended storage device update is compromised. In some implementations, the compromise detection engine 2290 can assign a weight to each data point considered in step 2226, where the weight can signify whether a data point is likely associated with a compromised suspended storage device update. In some implementations, one data point may be sufficient for the suspended storage device update to be deemed compromised. In some implementations, a combination of data points may be required for the suspended storage device update to be considered compromised. In some implementations, the compromise detection engine 2290 can also use data available from other sources, such as compromise information that can be obtained from a counter transfer source or from a validation agency.

In some implementations, the compromise detection engine 2290 can use the data points and/or weights to determine a compromise score for the suspended storage device update. At step 2232, the compromise detection engine 2290 and determine whether the compromise score is below a threshold. When the compromise score is below the threshold, then, at step 2234, the compromise detection engine 2290 can approve the suspended storage device update. When the suspended storage device update is approved, the suspended storage device can proceed as discussed above.

When the compromise score is below the threshold, then, at step 2236, in some implementations the suspended storage device update may be manually reviewed. For example, an alert may be sent to a security administrator, who can review the suspended storage device update and the historical data used to determine the compromise score. In some cases, the security administrator may contact the instantiating source device and/or the terminating source device to verify the validity of the suspended storage device update.

When the suspended storage device update has been reviewed and is approved, then the process 2200 can proceed to step 2234. When the suspended storage device update is not approved after manual review, then at step 2238, the 2290 can deny the suspended storage device update. When the suspended storage device update is denied, in some implementations, the instantiating source device may be informed. In some implementations, the instantiating source device may not be informed, so that the suspended storage device update will appear to have been initiated. In these implementations, any additional inputs by the instantiating source device and/or the terminating source device (e.g., to investigate whether the suspended storage device update is in progress) can be used to collect additional data points about the instantiating source device or the terminating source device.

Some examples of a suspended storage device update are described in U.S. patent application Ser. No. 15/130,627, which is incorporated by reference herein in its entirety.

FIGS. 23A-23D illustrate an example of a cross-network system 2300 for computing a sum that can be assigned to a set of objects from which a particular object will be selected. In various implementations, the system 2300 includes a host network 2320, a graphical user interface 2310 generated and controlled by the host network 2320, and a proxy network 2330.

The host network 2320 can include various servers that enable the host network 2320 to maintain a data store of objects. The servers can further enable the host network to display objects in the graphical user interface 2310. For example, the host network 2320 can include a user interface server 2322, a data store server 2324, an object data store 2326, and a rules data store 2328. The user interface server 2322 can be configured to provide the graphical user interface 2310 on client devices, including generating object displays 2312*a*-2312*c* within the graphical user interface 2310 and interacting with a user that is using the graphical user interface 2310. The user interface server 2322 may communicate with the data store server 2324 to obtain object information from the object data store 2326 and to obtain differential information from the rules data store 2328, if needed. One example of a user interface server 2322 is a web server.

The host network's data store server 2324 may be responsible for managing the object data store 2326 and/or the rules data store 2328. In some implementations, the host network 2320 may include separate servers for managing the object data store 2326 and rules data store 2328. The data store server 2324 can, for example, accept queries for the data stores and provide the information by querying the data stores.

The object data store 2326 can store information related to objects provided by the host network 2320. Object information can include, for example, which objects are currently available and the parameters that describe each object. For example, an object can have two parameters, a color (e.g., red, blue, and green) and a size (e.g., small, medium, and large). In these and other examples, selection of parameters (e.g., red and medium) specifies a particular object. The object data can further include a numerical value for an object. The object data can further include a quantity of an object that is available.

The rules data store 2328 can store rules for computing sums for different objects. Data stored in the rules data store 2328 can include, for example, objects to which the rules apply and conditions under which a rule is valid. The conditions can include, for example time periods, types or categories of users, groups of users, and so on.

The host network 2320 can provide users access to the objects in the object data store 2326 through the host's graphical user interface 2310. Using the graphical user interface 2310, users can also enable rules, upon which the host network 2320 uses the rules to compute a sum, the value of which can be assigned to objects. In various implementations, the graphical user interface 2310 can be provided over the Internet to client devices such as desktop computers, laptop computers, smart phones, tablet computers, in-store kiosks, and so on. Alternatively or additionally, the graphical user interface 2310 can be provided to a client device that is within the host network 2320 and made available to user. The graphical user interface 2310 can be implemented, for example, as a website. Alternatively or additionally, the graphical user interface 2310 can be implemented as a software application for a desktop or laptop computer and/or a hand-held computing device such as a smart phone or tablet.

The graphical user interface 2310 can present the host's objects to a user, and provide an interface for the user to select and obtain one or more objects. For example, an object, class or category of objects, or other grouping of objects can be displayed on various object displays 2312a-2312c. The object displays 2312a-2312c can provide information about an object or group of objects, including an object value 2314, among other things. Using the object displays 2312a-2312c, a user can select an object and the specific parameters for the object. In some examples, the host can also display, in the graphical user interface 2310, current and rules 2340 for objects. The graphical user interface 2310 can further provide a finalization display, not illustrated here, through which the user can enter transfer information and destination information, if needed.

Figure 23A:
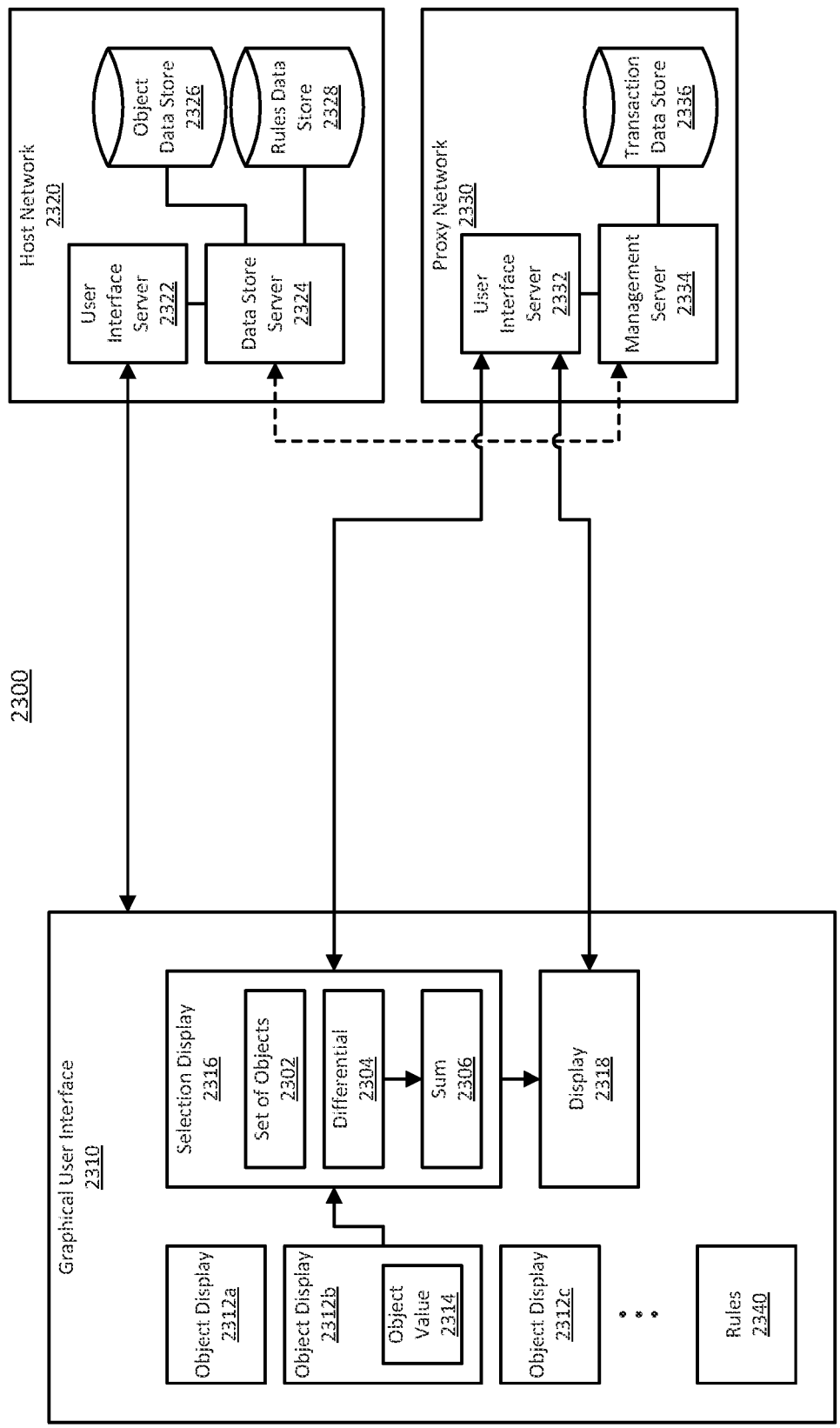
FIGS. 23A-23D illustrate an example of a cross-network system for determining a differential for a set of items from which a gift item will be selected.

In some cases, a first user may want initiate an update of an object in the object data store 2326 of the host network 2320, where the update is completed by a second user, and the object is transferred to the second user. The host network 2320, however, may not be capable of executing an update of the object data store 2326 that involves more than one user. In various implementations, the proxy network 2330 can intervene and provide an interface through which the first user can initiate an update. FIG. 23A illustrates an example where, when a first user has selected an object that is to be transferred to a second user, the proxy network 2330 has injected or embedded a selection display 2316 into the host's graphical user interface 2310. While the hosts graphical user interface 2310 is controlled by the host network, the selection display 2316 is controlled by the proxy network 2330, and is inserted into the graphical user interface 2310 with permission of the host. In various implementations, the selection display 2316 is configured to seamlessly integrate into the graphical user interface 2310, including using graphics that mimic the graphics of the graphical user interface 2310. For example, the selection display 2316 can be configured to resemble the object displays 2312a-2312c and other displays provided by the graphical user interface 2310, such that the selection display 2316 appears to be part of the services provided by the host, rather than as a service provided by an external party.

In some implementations, the selection display 2316 can be provided externally to the host's graphical user interface 2310, for example as an independent graphical interface. In these implementations, the selection display 2316 can be configured to mimic the host's graphical user interface 2310, or can be configured to be presented as an independent service external to the host's services. In these implementations, the selection display 2316 can be provided, for example, using a website or a software application.

In various implementations, the selection display 2316 can provide an interface through which a first user can specify a set of objects 2302 from which a second user can, at a later time, select a particular object. The first user can select the set of objects 2302, for example, by selecting an object and leaving one or more parameters for the object unspecified. For example, when the object includes a color parameter and a size parameter, the first user can select a value for the color parameter and leave the size parameter unspecified. In this example, the set of objects 2302 can include objects defined by different possible combinations of parameter values (e.g., red/small, red/medium, and red/large). In some examples, the first user can use the selection display 2316 to specifying multiple sets of objects.

In various implementations, the selection display 2316 can also display information derived from rules from the rules data store 2328, from rules provided by the proxy network 2330, and/or from another host. The rules can be used to determine a differential 2304 that can be applied to the object value 2314 to compute a sum 2306. The sum 2306 can be assigned to the set of objects 2302, and can be a value required to update the object data store 2326. In some examples, when the first user has specified multiple sets of objects, the rules may apply to one or more sets of objects or to all sets of objects in the set selection display. In these examples, the rules may specify different differentials for different sets of objects, or may specify differentials for only some sets of objects, or may one differential for all the sets of objects. In these examples, the sum 2306 can reflect application of one or more differentials to the multiple sets of objects.

Once the first user buyer has, through the selection display 2316, selected the set of objects 2302, the first user can be directed to an initiation display 2318, also embedded into the graphical user interface 2310 by the proxy network 2330. The initiation display 2318 can provide an interface through which the first user can enter source information, such as a source identification number and the first user's address. Alternatively or additionally, through the initiation display 2318, the first can interact with a service to provide source information for the set of objects 2302. In various implementations, the first user can also enter contact information for the second user through the initiation display 2318. As discussed further below, the proxy network 2330 can use the contact information to inform the second user that an update of the object data store 2326 has been initiated. In some implementations, the first user can alternatively or additionally provide the second user's contact information through the selection display 2316.

To provide the selection display 2316, the proxy network 2330 can include a user interface server 2332. The user interface server 2332 can be configured to generate and insert the selection display 2316 when, through an object display 2312*b*, an object is selected for the second user. The user interface server 2332 can further be configured to manage the first user's interactions with the selection display 2316, including dynamically updating the selection display 2316 in response to inputs from the first user. The user interface server 2332 can also generate the initiation display 2318, and capture information provided by the first user through the initiation display 2318.

In various implementations, the user interface server 2332 can communicate with a management server 2334 in the proxy network 2330. The management server 2334 can be configured to manage an update of the object data store 2326, including generating the transaction when the first user selects the set of objects 2302 and provides source information. Once generated, the management server 2334 can hold the update suspended, meaning that the object data store 2326 is not yet updated at the conclusion of the first user's interaction with the graphical user interface 2310. Instead, the management server 2334 can store an entry in a updates data store 2336, which records information that can be used to complete an update of the object data store 2326 once additional information is received from the second user, as discussed further below.

In some implementations, the management server 2334 may have a direct communication channel with the data store server 2324 in the host network 2320. For example, the host network may provide an API through which authorized other networks, such as the proxy network 2330, can access information in the host network 2320. Using such an API, the management server 2334 can, for example, query the object data store 2326 to determine objects currently available from the host. As another example, the management server 2334 can use the API to identify rules that can be applied to objects, as discussed further below. Communications between the management server 2334 and the host network 2320 can include an exchange of data packets between management server 2334 and the host network 2320.

Figure 23B:
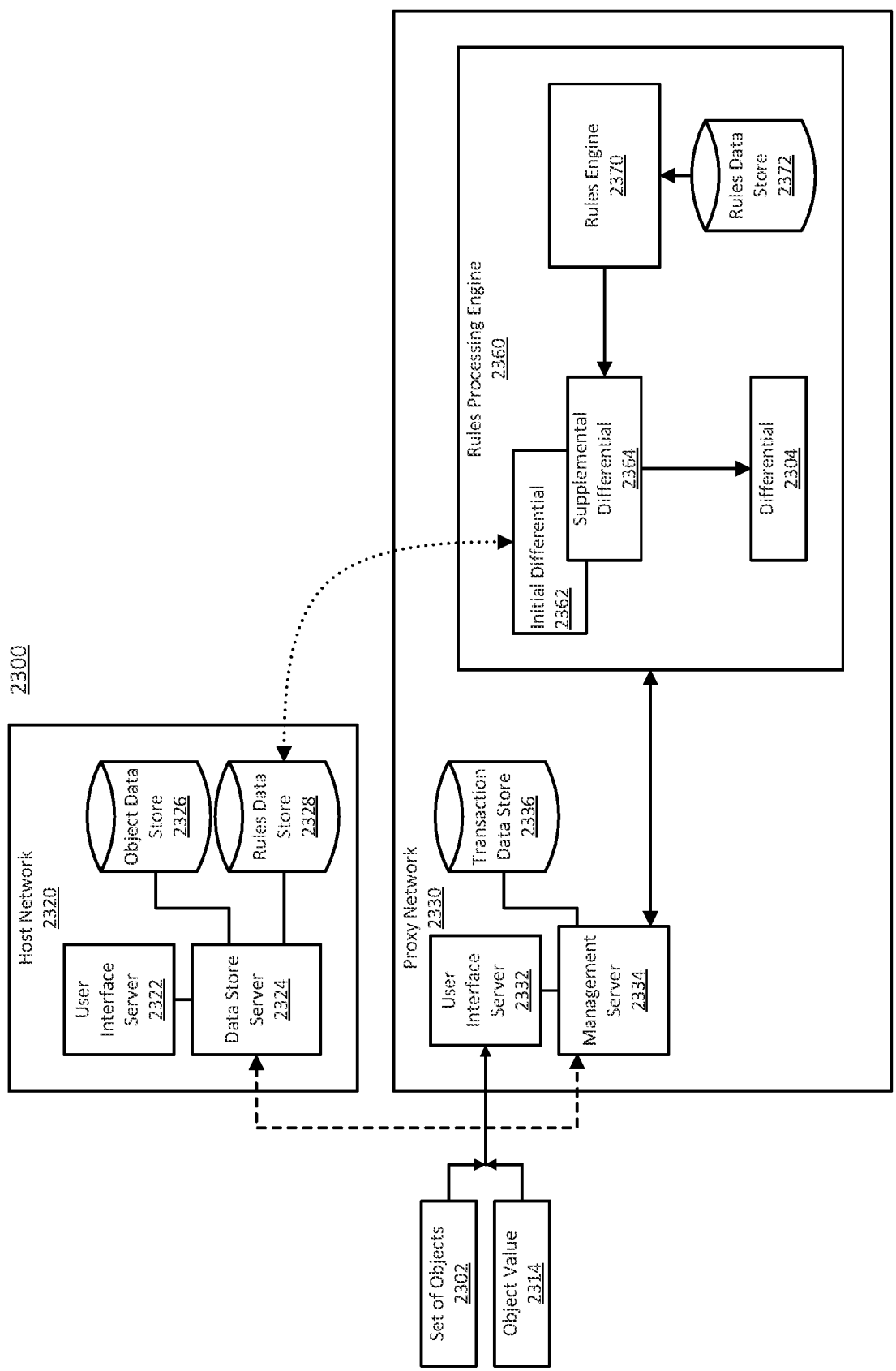

As noted above, when a first user is presented with the selection display 2316, the first user may be presented with rules that can be applied to the set of objects 2302 selected by the first user, where the rules can be used to determine a differential 2304 and a sum 2306 that is assigned to the set of objects 2302. In various implementations, the proxy network 2330 can include various engines for determining the rules, computing the differential 2304, and computing the sum 2306. FIG. 23B illustrates an example of a back-end system that may be included in the proxy network 2330. In this example, the back-end system includes rules processing engine 2360.

In various implementations, when a first user selects a set of objects 2302, the set of objects 2302 and the object value 2314 can be directed by the user interface server 2332 to the rules processing engine 2360. The rules processing engine 2360 can then determine whether any rules in the host network's rules data store 2328 apply to the set of objects 2302. For example, the rules processing engine 2360 can query the rules data store 2328, for example, through an API provided by the host network 2320 to request any rules that may apply to the set of objects 2302. In these examples, the rules data store 2328 can respond with a rule code that the rules processing engine 2360 can use to identify the rules when applying an update to the object data store 2326. Alternatively or additionally, when the host network 2320 does not provide an API, the rules processing engine 2360 can obtain rules information through the graphical user interface 2310. For example, the rules processing engine 2360 can automatically locate rules 2340 that can be displayed in the graphical user interface 2310, and automatically parse the information provided by the rules 2340. Interacting with the graphical user interface 2310 can involve the rules processing engine 2360 sending data packets to the graphical user interface 2310 and receiving data packets in response.

As another example, the rules processing engine 2360 may have rule codes previously distributed by the host network 2320, which may or may not be current. In this example, the rules processing engine 2360 can query the rules data store 2328, for example through an API provided by the host network 2320, to determine whether any of the rule codes are current, and to obtain the rules that are associated with the rule codes.

Using the mechanisms discussed above, the rules processing engine 2360 can determine rules that apply to the set of objects 2302, and can use the rules to compute a primary differential 2362. The primary differential 2362 can be a fractional value, such as 0.15, 0.25, 0.50, or some other fraction that can be from the object value 2314 can be reduced. Alternatively or additionally, the primary differential 2362 can be an absolute value, such as 1, 5, 10, or some other amount by which the object value 2314 can be reduced. Alternatively or additionally, the primary differential 2362 can vary based on the object value 2314. For example, for an object value 2314 that is greater than or equal to 150, the primary differential 2362 can be 0.10, and/or if the object value 2314 is greater than or equal to 2400, the primary differential 2362 can be 0.20. Alternatively or additionally, the primary differential 2362 can be based on something other than the object value 2314. For example, the primary differential 2362 can be based on points obtained by the first user, where certain amounts of points may be equivalent to a certain differential (e.g., a fractional amount or an absolute value).

In some implementations, the rules processing engine 2360 can determine the primary differential 2362 based on the object value 2314 and other values that may be included in the sum 2306. For example, the sum 2306 can include a fractional value and a transmission value. In this and other examples, the primary differential 2362 can be based a sum that includes additional fractional values and/or transmission values.

As noted previously, the rules processing engine 2360 can compute the primary differential 2362 using rules from the host network's rules data store 2328. In some examples, the rules may be associated with a time frame, outside of which the rules are not valid. In some examples, the rules may only apply to certain objects, which may exclude the set of objects 2302. In some examples, the rules may be valid for only certain users or types of users. In these and other examples, the rules processing engine 2360 can verify the validity of the rules when determining the primary differential 2362. For example, the rules processing engine 2360 can parse the rules to determine whether the rules apply to the set of objects 2302. As another example, the rules processing engine 2360 can parse the rules to determine whether the current time falls within a time frame during which the rules are valid. As another example, the rules processing engine 2360 can use information provided by the first user to determine whether the user falls within categories or types of users to which the rules apply. When the rules processing engine 2360 determines that the rules are not valid, the rules processing engine 2360 may determine that the primary differential 2362 should be zero.

In various implementations, the rules processing engine 2360 can also additionally or alternatively determine a supplemental differential 2364. In various implementations, the rules processing engine 2360 can include a rules engine 2370 that can determine the supplemental differential 2364 from rules maintained by the proxy network 2330, for example in a rules data store 2372. The rules in the rules data store 2372 can be associated with, for example, a particular host network, groups of host networks, certain types or classes of objects, certain time frames, and/or users or categories of users, among other things. In some examples, the rules engine 2370 can, for the set of objects 2302, determine whether any rules in the rules data store 2372 apply the set of objects 2302. In these examples, the rules engine 2370 can, for example, parse the rules to determine, for example, whether the current time is within the time frame within which a rule applies, whether the first user is within the users to which a rule applies, and/or whether a rule is available for the host network 2320.

When the rules engine 2370 identifies an applicable rule or rules, the rules engine 2370 can use the rule or rules to compute the supplemental differential 2364. In some examples, the supplemental differential 2364 is determined from the object value 2314. For example, the rules engine 2370 can determine that the supplemental differential 2364 is a fractional value that is based on the object value 2314. In some examples, the supplemental differential 2364 is an absolute value. In these and other examples, a value computed using the additional supplemental differential 2364 can be transferred from the proxy network 2330 when the object update is completed.

In some examples, the rules may provide that the supplemental differential 2364 be based on the interaction between the host networks 2320 and the proxy network 2330. For example, when the proxy network 2330 manages a suspended update on behalf of the host network 2320, when the update completes the host network 2320 may transfer a value to the proxy network 2330. In this example, the rules may provide that the additional supplemental differential 2364 be a fraction of the value transferred from the host network 2320, where the fraction may be greater than or less than the value. In some example, the fraction may scale with the object value.

In some implementations, the proxy network 2330 can simultaneously support updates to object data stores for multiple host networks. In these implementations, the first use may be able to select multiple sets of objects, where one set of objects is from one host network and another set of objects is from another host network. In these cases, the supplemental differential 2364 can be based on the combined multiple sets of objects. Additionally, the supplemental differential 2364 can apply to some or all of the multiple sets of objects, equally, proportionately, or using some other measure.

When the rules processing engine 2360 determines that both a primary differential 2362 and a supplemental differential 2364 can be applied to the set of objects 2302, the rules processing engine 2360 can combine the primary differential 2362 and the supplemental differential 2364 into a final differential 2304. The final differential 2304 can be applied to the object value 2314 to determine the sum 2306, and both the final differential 2304 and the sum 2306 can be displayed to the first use in the graphical user interface 2310.

As noted above, once the first selects the set of objects 2302 and provides any information that can be used to update the object data store 2326 with respect to any object from the set of objects 2302, such as transfer information, no object is actually updated. Instead, the proxy network 2330 can generate a suspended update, which the proxy network 2330 can store for later completion.

The proxy network 2330 can also generate a notification that informs the second user recipient that an object update has been initiated on behalf of the second user. In some cases, the proxy network 2330 can transmit the notification directly to the second user, for example using an email address of the second user, a social media account identifier, and/or some other online or digital account information. Alternatively or additionally, the proxy network 2330 can send a physical postcard or letter to a physical address. In various implementations, the notification can include a link or code or some other identifier that is associated with the suspended update. In some cases, the proxy network 2330 can provide the link or code or other identifier to the first user, who can then notify the second user of the suspended update. For example, the proxy network 2330 can enable the first user to print a notification.

Figure 23C:
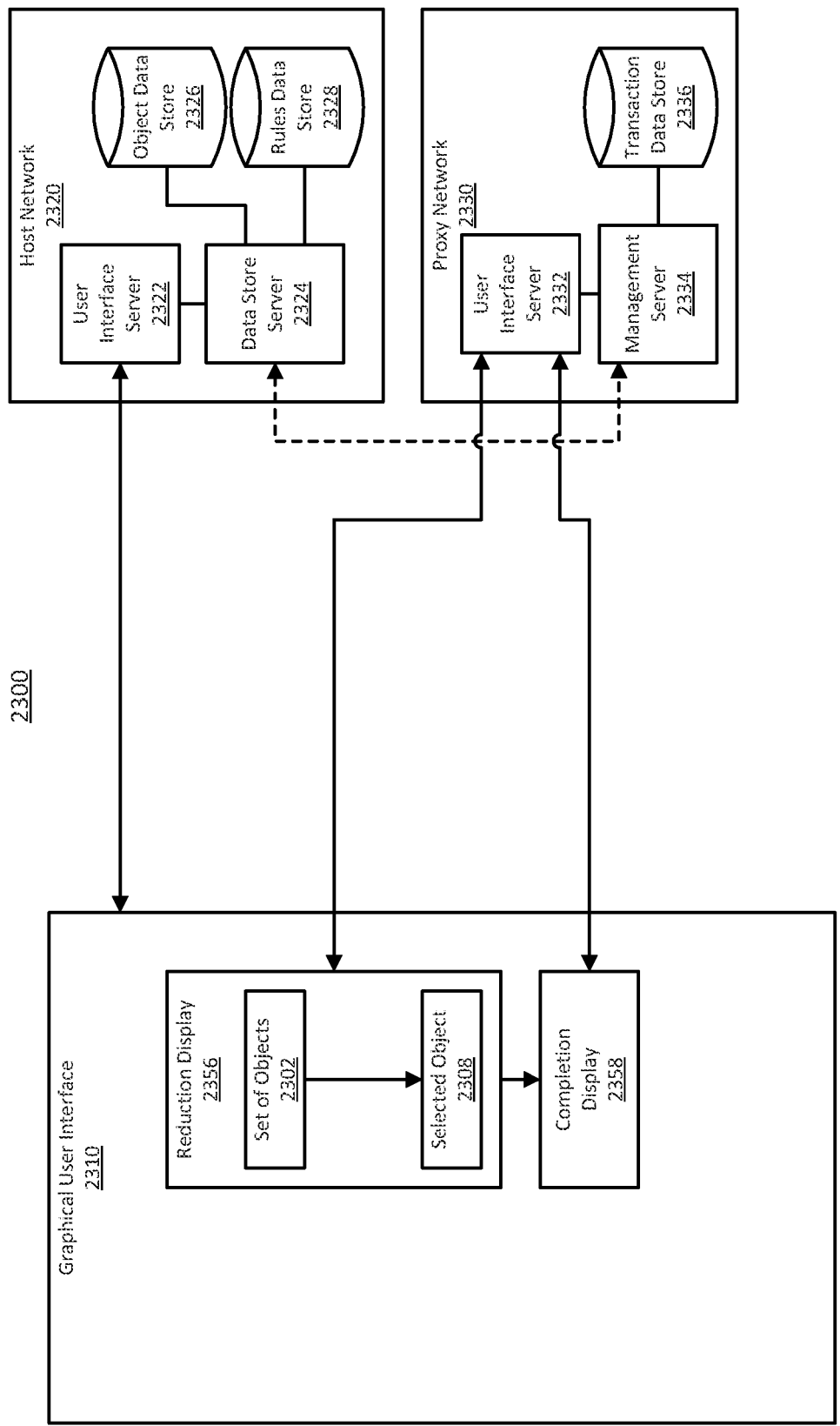

In various implementations, the second user can use the link, code, or other identifier to view the suspended update. FIG. 23C illustrates an example where a second user has chosen to see the suspended update, and determine whether to complete the update. The notification received by the second user can identify the host network 2320 through which the first user selected the set of objects from which an object can be updated. For example, the second user may be directed to the graphical user interface 2310 through a network link, by being given the host's network address, or by being given identification information for the host network 2320. A link directly to the suspended update can cause the proxy network 2330 to inject or embed a reduction display 2356 in the graphical user interface 2310. Alternatively or additionally, when the second visits the graphical user interface 2310 and enters a code or identifier for the suspended update, the second user can be directed to the reduction display 2356.

The reduction display 2356 can provide an interface through which the second user can select specific parameters for a set of objects, and thereby reduce the set of objects 2302 to a specific, selected object 2308. For example, the set of objects 2302 can include two parameters, a color and a size, for which the first user specified the color red but did not specify a value for the size. In this example, the second user can specify a specific value the size. In this example, selection of the parameters reduces the set of objects 2302 selected by the first user to a specific object (e.g., the selected object 2308).

In various implementations, the reduction display 2356 can be configured to resemble the graphical user interface 2310, including using similar graphics and user interface objects, such that the reduction display 2356 appears to be an integrated part of the graphical user interface 2310, rather than a service provided by an outside party. Alternatively or additionally, is some implementations, the reduction display 2356 can be provided to the second user as an independent graphical interface, outside of the graphical user interface 2310. In these implementations, the reduction display 2356 can be configured to resemble the graphical user interface 2310, or can be configured to look like an independent interface.

To generate the reduction display 2356, the user interface server 2332 of the proxy network 2330 can look up the suspended update in the updates data store 2336, using a link, a code, or other identifier provided to the second user. The user interface server 2332 can then extract and present the set of objects 2302 to the second user. Other information may also be presented to the second, such as the identification of the first user, while some information may be withheld from the second user, such as the sum 2306 assigned to of the set of objects and/or any differential that was applied.

In some cases, the second user may choose not to complete the update for any object in the set of objects, and may so indicate through the reduction display 2356. Alternatively, the second user may ignore the notification or may, after having investigated the suspended update, take no further action. In these cases, the suspended update may expire after a pre-determined period. Alternatively or additionally, the second user may be notified at pre-set intervals that the suspended update is waiting. Alternatively or additionally, the proxy network 2330 may periodically generate notification to the second user until the suspended update has expired.

Alternatively, using the reduction display 2356, the second user can complete the suspended update by selecting parameters and indicating intent to continue (e.g., by pressing an "continue" button provided through the reduction display 2356). The second user can then be directed to a completion display 2358, which can be injected into the graphical user interface 2310 by the proxy network 2330. Using the completion display 2358, the second user can provide any necessary information for completing the update, such as destination information.

Figure 23D:
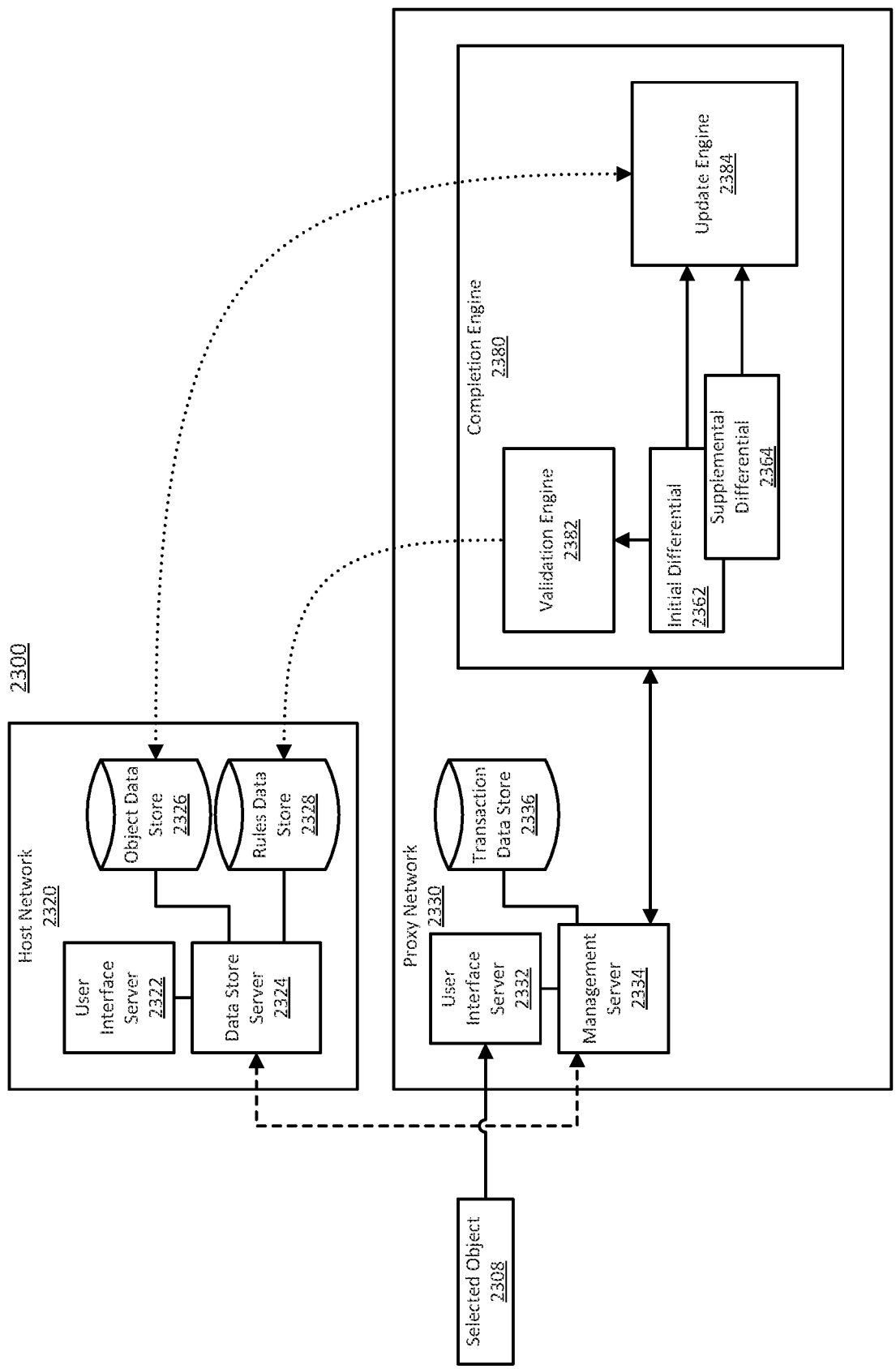

Once the second user has provided the information that can be used to complete the object update, the proxy network 2330 can execute the steps to complete an update of the object data store 2326. FIG. 23D illustrates an example of a back-end system that may be included in the proxy network 2330. In this example, the back-end system includes a completion engine 2380.

In various implementations, once the second user has determined the selected object 2308, the selected object 2308 can be directed by the user interface server 2332 to the completion engine 2380. In various implementations, the completion engine 2380 can determine a final sum required to execute an update of the selected object 2308. For example, a primary differential 2362 and/or a supplemental differential 2364 may have been applied when the first user originally initiated the update. When a primary differential 2362 was applied, the completion engine 2380 may verify whether the rules under which the the primary differential 2362 is still apply. In some cases, the second user may be completing the object update days or weeks after the first user initiated the update. In these cases, the rules associated with the primary differential 2362 may no longer apply.

To validate the primary differential 2362, the completion engine 2380 can include a validation engine 2382. In various implementations, the validation engine 2382 can have access to the rules that apply to the primary differential 2362. For example, the proxy network 2330 may have obtained the rules when the proxy network 2330 received the rule code associated with the primary differential 2362, or may have extracted the rules from the host network 2320 when the object update was initiated. Alternatively or additionally, the validation engine 2382 can be configured to extract the rules from the host network 2320, for example by querying the rules data store 2328 through an API provided by the host network 2320. Alternatively or additionally, the validation engine 2382 can query the host network 2320 through the graphical user interface 2310. Communication between the validation engine 2382 and the host network 2320 can include an exchange of data packets between the validation engine 2382 and the host network 2320.

Alternatively or additionally, instead of examining any rules that apply to the primary differential 2362, the validation engine 2382 can test the differential code for the primary differential 2362. For example, the validation engine 2382 can enter the rule code through the graphical user interface 2310 and see if the code is accepted. In this example, the graphical user interface 2310 can send the rule code to the data store server 2324, which can query the rules data store 2328 to determine whether the rules associated with the rule code currently apply.

In cases where the primary differential 2362 is no longer valid when the object update is being completed, in some implementations, the validation engine 2382 can search for a rules that result in a differential of the same or possibly greater value, so that the final sum assigned to the update is the same is or less than the sum computed when the first user initiated the update. In various implementations, the validation engine 2382 can, for example, query the rules data store 2328 through an API provided by the host network 2320. Alternatively or additionally, in some implementations, the validation engine 2382 can obtain differential information through the graphical user interface 2310. For example, the reconciliation engine can automatically locate differential information provided through the graphical user interface 2310, and automatically parse the information to obtain current differential codes.

In some cases, the rules may still be valid, object value upon which the primary differential 2362 is based may be different from the object value used to when the first user initiated the object update. For example, the object value may have increased or decreased. As another example, the object value for the set of objects may have been determined to be one value, while the object value for the selected object 2308 is a different value. In these and other examples, the completion engine 2380 may compute a smaller value for primary differential 2362 than the value computed by the rules processing engine 2360.

In various implementations, the completion engine 2380 can make adjustments so that the sum computed when the second user completes the update is as close as possible to the sum computed when the first user initiated the update. For example, when the rules are no longer valid or the primary differential 2362 has become a lesser amount, the completion engine 2380 can look for other rules that may instead be applied, for example by querying the rules data store 2328 of the host network 2320. Alternatively or additionally, the completion engine 2380 can assign any difference to the proxy network 2330.

In some implementations, instead of needing to validate the rules used to compute the primary differential 2362, the proxy network 2330, when object update is initiated, can "lock" the update information, and store the locked information with the suspended update in the updates data store 2336. For example, some host networks 2320 provide the ability to lock a selection display, such that the objects in the selection display and any applicable values are held in suspension by the host network 2320. The selection display can remain locked until a completion procedure occurs, or until some other event occurs (e.g., a period of time passes, the objects in the selection display become unavailable, or some other event). In these and other examples, the proxy network 2330 can maintain a token, cookie, identifier, or some other piece of data that can be provided to the host network 2320 to identify the locked selection display.

Once the proxy network 2330 has established an association with a locked update information, and/or has validated the rules for the primary differential 2362, the completion engine 2380 can determine a final sum needed to complete the update. In various implementations, the completion engine 2380 can include a update engine 2384 that can combine the object value, the primary differential 2362, and the additional supplemental differential 2364 to determine the final sum. The completion engine 2380 can further initiate an actual update of the selected object 2308. In some examples, the host networks 2320 receives the final sum at the time the first user initiated the object update, less the primary differential 2362. In these examples, any supplemental differential 2364 value can be transmitted by the proxy network 2330. In some examples, the host network 2320 receives the final sum at the time the second user completes the object update, less the primary differential 2362. In these examples, any difference between the final sum and the sum transferred from the first user can be transferred from the proxy network 2330. In these and other examples, the sum transferred from the first user is unchanged from the sum presented to the first user when the first user initiated the object update.

In some implementations, the completion engine 2380 can determine an additional differential, in addition to or instead of the supplemental differential 2364 determined at the time the first user initiated the object update. This additional differential can be based on, for example, the particular selected object 2308 and/or the time of year when the second user completed the object update, and/or on some other factor. In some examples, the additional differential can result in the final sum being less than the sum presented to the first user when the first user initiated the object update. In these examples, the difference can be transferred back to the first user.

In some examples, the second user may add other objects to the object update. For example, the second user may be presented with objects that compliment or coordinate with the selected object 2308. When the second user adds other objects to the object update, in various implementations, the completion engine 2380 can determine whether any rules apply to these other objects. Additionally, the completion engine 2380 can determine whether a rules of the proxy network 2330 allow a supplemental differential can be applied. Any differential and/or supplemental differential can be used to reduce the final sum transferred from second user the additional objects.

In some examples, the second user may select an alternate object rather than selecting an object from the object set. In some examples, to facilitate selection of an alternate object, the reduction display 2356 can display alternative objects that are interchangeable with objects from the set of objects 2302, for example by having the same object value. Alternatively or additionally, the alternative objects can be ones to which rules that can be applied, where the rules are the same rules that can be applied to the selected objects and/or rules that, when applied, have a same result as when the rules are applied to the selected objects.

When the second user selects an object or objects other than an object from the set of objects, in various implementations, the completion engine 2380 can determine applicable rules such that the sum computed to update the object is nearly the same as the sum computed when the first user initiated the update. For example, the completion engine 2380 can determine rules from the rules data store 2328 of the host network 2320 that can be used to determine a primary differential 2362 that results in the final sum being less than or equal to the sum computed when the first user initiated the update. In some examples, the completion engine 2380 can alternatively or additionally identify rules from the rules data store of the proxy network 2330 that provide the same result. In some examples, the completion engine 2380 may determine that the final sum is greater than the sum computed when the first user initiated the object update. In these examples, the first user and/or the second user can be informed that the object update cannot be completed until the first user or the second user enables the transfer of the difference between the sums.

In some examples, the second user may select no object. In these examples, the proxy network 2330 can generate a token, and transmit the token to the second user. In some examples, the proxy network 2330 determines the token to be equivalent to the sum computed when the first user initiated the object update. In some examples, the proxy network 2330 determines the token to be the sum without any differentials applied. Alternatively, in some examples, the proxy network 2330 cancels the object update. In these examples, the sum can be transferred back to the first user.

In various implementations, the update engine 2384 can execute the actual update of the selected object 2308, and also of any additional objects added by the second user. For example, the host network 2320 may include an API through which the update engine 2384 can provide an identifier for the selected object 2308, the first user's source information, the second user's destination information, and any other information needed to execute the update. Alternatively or additionally, the update engine 2384 may enter this information into the graphical user interface 2310, and use mechanisms provided by the graphical user interface 2310 to complete the update. Executing the update can involve an exchange of data packets between the update engine 2384 and the host network 2320. Once the update is made to the object data store 2326, the update of the object is complete.

Figure 24A:
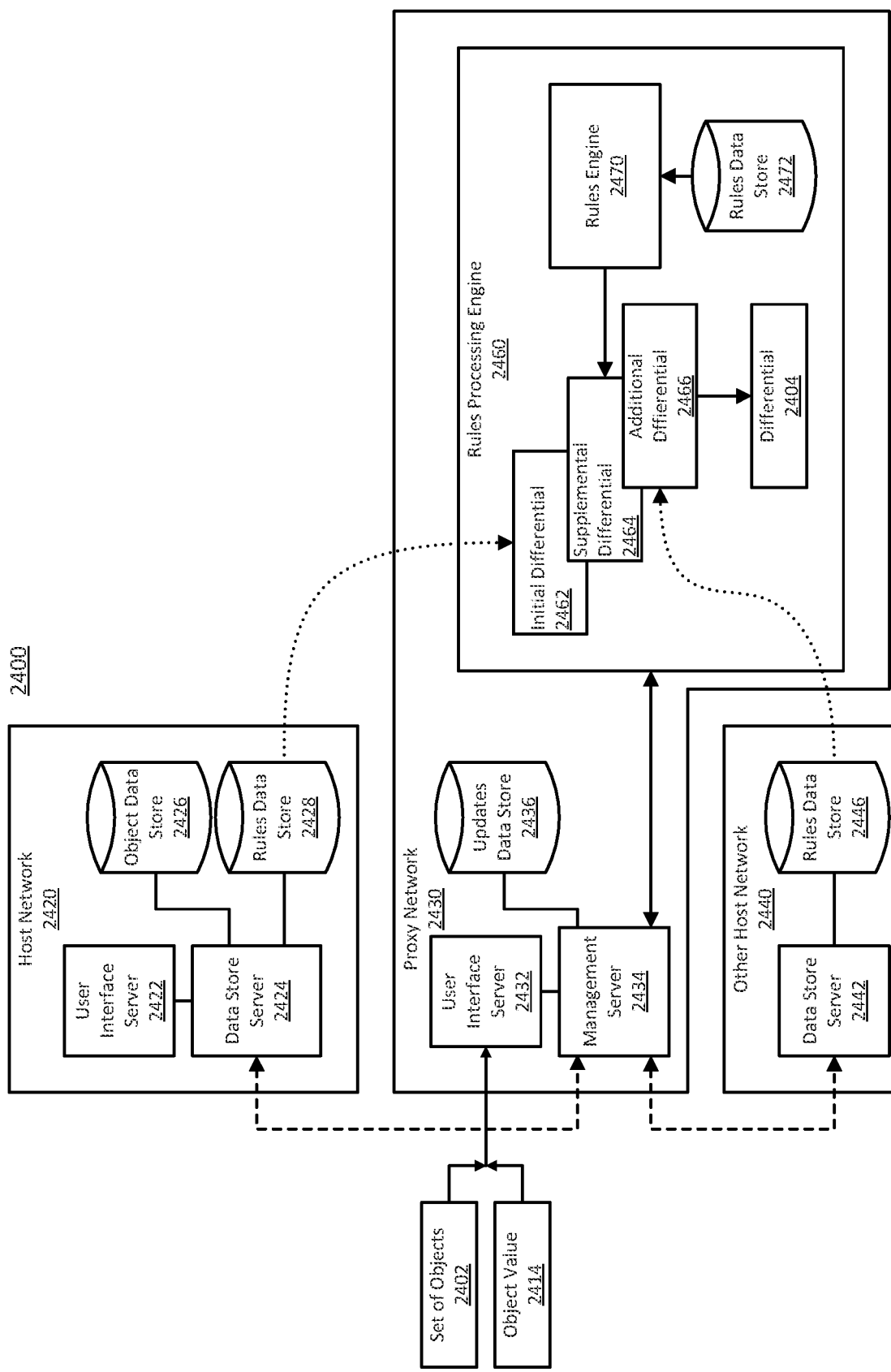
FIGS. 24A-24B illustrate an example of a cross-network system that includes a host network, a proxy network, and another host network.
Figure 24B:
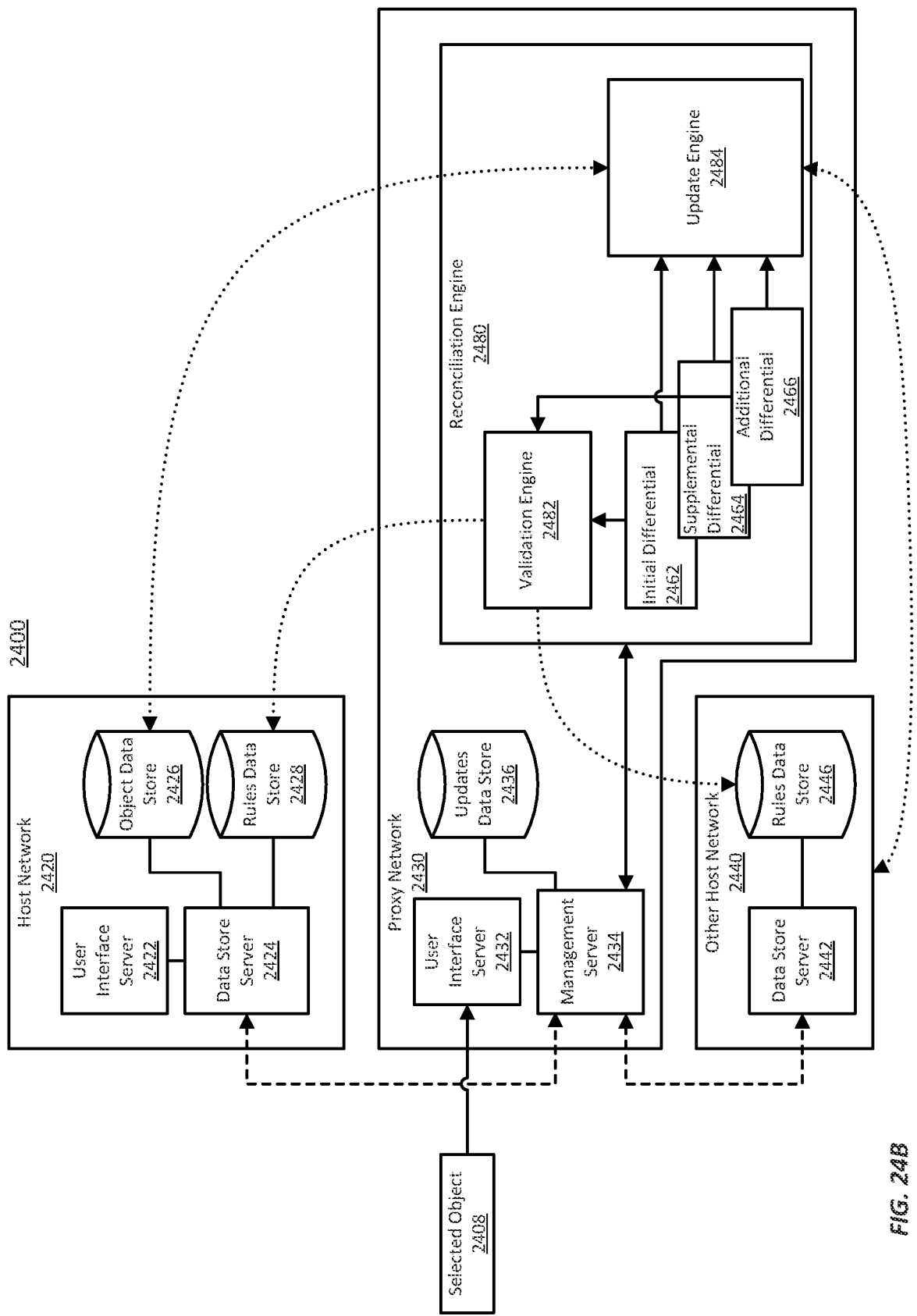

In various implementations, the value of a set of objects from which a particular will be selected can be further reduced, and/or additional reductions can be obtained by the second user, through other hosts. FIGS. 24A-24B illustrate an example of a cross-network system 2400 that includes a host network 2420, a proxy network 2430, and another host network 2440. The other host network 2440 can be independent from both the host network 2420 and the proxy network 2430. For example the other host network 2440 can be owned and controlled by an entity that is unrelated to the entities that own and/or control the host network 2420 or the proxy network 2430.

The host network 2420 can include various servers and data stores that enable the host network 2420 to manage an object data store 2426, and provide the objects in the object data store 2426 through the graphical user interface, as discussed above. In the illustrated example, the host network 2420 includes a user interface server 2422, a data store server 2424, an object data store 2426, and a rules data store 2428. The user interface server 2422 can be configured to provide the graphical user interface and can interact with a user that is using the graphical user interface. The user interface server 2422 may communicate with the data store server 2424 to obtain object information from the object data store 2426 and to obtain rules from the rules data store 2428, if needed. The object data store 2426 can store information related to the objects provided by the host network 2420. The rules data store 2428 can store various rules that can be applied to objects in the object data store 2426. The host network's data store server 2424 may be responsible for managing the object data store 2426 and/or the rules data store 2428. The data store server 2424 can, for example, accept queries for the data stores and provide the information by querying the data stores. In some implementations, the host network 2420 may include separate servers for managing the object data store 2426 and rules data store 2428.

The proxy network 2430 can include a user interface server 2432, a management server 2434, a updates data store 2436, and various back-end engines. In the example illustrated in FIG. 24A, the proxy network 2430 includes a rules processing engine 2460. The user interface server 2432 can be configured to generate and insert an object selection display and/or other displays into the host network's graphical user interface. Using displays injected into the graphical user interface by the user interface server 2432, a first user can select a set of objects 2402 from which a particular can be selected. The first user can also enter source information and/or any other information that can be used to complete an update of the object data store 2426.

In various implementations, the set of objects 2402 selected by the first user and the object value 2414 can be directed by the user interface server 2432 to the rules processing engine 2460. The rules processing engine 2460 can then determine whether any rules apply to the set of objects 2402, which can be used to determine a primary differential 2462. For example, the rules processing engine 2460 can query the rules data store 2428 through an API provided by the host network 2420, can automatically enter information into the host network's graphical user interface, and/or can search for rules information provided through the graphical user interface. In various implementations, the rules processing engine 2460 can also or alternatively determine whether a rules data store 2472 hosted by the proxy network 2430 includes any rules that apply to the objects 2402, from which a supplemental differential 2464 can be determined. The rules for the supplemental differential 2464 can be based on the set of objects 2402 selected, the identity of the host network 2420, the current date, an interaction between the host network 2420 and the proxy network 2430, a combination of these factors, or some other factor. In various implementations, the rules processing engine 2460 can include a rules engine 2470 that can determine an appropriate supplemental differential 2464.

In various implementations, the rules processing engine 2460 can also determine whether the other host network 2440 has rules that can be applied to the objects 2402, to compute an additional differential 2466. The other host network 2440 can be related to the host network 2320, the objects in the host network's object data store 2326, the first user, the second user, or some other entity.

The rules from the other host network 2440 can provide that the additional differential 2466 be a fractional value that is based on the object value 2414 or an absolute value based on the objects 2402. In some examples, the rules can apply to certain host networks or all host networks. In some examples, the rules provide that the additional differential 2466 is a value to be transferred to the first user when the object update is completed, and/or when the first user performs some additional actions. In some examples, the rules may provide that the other host network 2440 will transfer a value to the first user or to the host network 2420 when the object update is completed and/or some other actions are taken by the first user or the host network 2420.

In some examples, other host network 2440 can provide the additional differential 2466 as an alternate to, or in addition to, the sum that is transferred from the first user. For example, the other host network 2440 can include a point system, and the first user can accumulate points with the other host network 2440. In this example, the rules of the other host network 2440 can provide that some number of points have a certain value, which the other host network 2440 can transfer to the host network 2420 when the object update is completed.

In some cases, the additional differential 2466 may not have a direct effect on the final differential 2404 computed by the rules processing engine 2460. For example, the additional differential 2466 can be in the form of points. For example, when the first users uses a particular transfer source to complete the object update, the first user may receive points equal to twice the sum used to complete the object update than when the first user completes the object update directly with the host network 2420. Other examples of indirect benefits include points gained with the organization that runs the other host network 2440, automatic transfer of a sum to another entity, and so on.

In various cases, the rules processing engine 2460 may determine that only a primary differential 2462 applies to the set of objects 2402, only the a supplemental differential 2464 applies, only an additional differential 2466 applies, or a combination of two or three or more differential applies.

The other host network 2440 can include various servers and data stores, such as a data store server 2442 and a rules data store 2446. The rules data store 2446 can include rules that the other host network 2440 can apply to objects. The data store server 2442 can provide an API to networked entities that want to query the rules data store 2446. For example, the proxy network's management server 2434 may use the API to query the other host network 2440 to determine rules for an additional differential 2466 that may apply to the set of objects 2402. Alternatively or additionally, the management server 2434 may search publically available information published by the other host network 2440 to find any rules that the other host network 2440 may apply.

Once the rules processing engine 2460 has determined an additional differential 2466 that may apply to the set of objects 2402, the rules processing engine 2460 can determine the final differential 2404. The final differential 2404 can then be displayed to the first user. As noted above, the final differential 2404 may reduce a final sum for the objects 2402 and may also include an indirect value for the first user or another entity.

Once the first user has executed update initiation steps, including providing source information and contact information for the second user, the proxy network 2430 can generate and store a suspended update. The proxy network 2430 may then generate a notification to the second user, and/or may provide the first user with a code or other identifier that the first user can give to the second user so that the second user can see and complete the suspended update.

When the second user uses the code or otherwise wants to see the suspended update, the proxy network 2430 can inject a reduction display and/or other displays into the host network's graphical user interface, as discussed above. Using the reduction display, the second user can select the parameters that can reduce the set of objects 2402 to a selected object 2408, and can enter any information that may be needed to complete the object update.

In the example illustrated in FIG. 24B, the proxy network 2430 includes a completion engine 2480, which can determine a final sum needed to complete the object updated and can complete the update of the selected object 2408. The completion engine 2480 can include a validation engine 2482, which can determine whether the rules used to determine the primary differential 2462, determined at the time the first user initiated the update, are still valid, and optionally can find other rules when the original rules are no longer be valid. In some implementations, validation engine 2482 can also determine whether the rules used to determine additional differential 2466, also determined when the object update was initiated, are still valid. In some cases, the validation engine 2482 can attempt to find an alternate rule when the additional differential 2466 has is no longer valid, for example by querying or searching the other host network 2440.

In various implementations, completion engine 2480 can also include a update engine 2484. The update engine 2484 can initiate the update of the selected object 2408. In cases where the additional differential 2466 is provided by the host network 2420, the update engine 2484 can supply the necessary information to obtain pertinent rules from the host network 2420, and cause the host network 2420 to change the required sum accordingly. In examples where the additional differential 2466 is provided by the other host network 2440 the completion engine 2480 may determine that the proxy network 2430 will transfer the value of the additional differential 2466 to the host network 2420. In these examples, the completion engine 2480 may obtain the additional differential 2466 from the other host network 2440 after the update has been completed.

In various implementations, the update engine 2484 can also update other host network 2440. For example, the update engine 2484 can notify the other host network 2440 that the object update has completed and that the first user's status with the other host network 2440 should be updated. Alternatively or additionally, the update engine 2484 can conduct any communications with the other host network 2440 that may be needed to complete the update or that may occur after the update completes. For example, when a sum is to be transferred from the other host network 2440 to the host network 2420 or the first user, the update engine 2484 can manage the transfer.

The example of FIGS. 24A-24B illustrate a system 2400 where one other host network 2440 provides a rules which, through the proxy network 2430, can be applied to an object being updated in the host network 2420. In other examples, the system 2400 can include two or more other host networks, which each may be providing similar or different rules. In these examples, the rules processing engine 2460 can determine whether one or more these rules apply to the object 2408. Also in these examples, the completion engine 2480 can determine the validity of each set of rules, compute any applicable differential, determine a sum needed to complete the object update, and/or transfer values from each additional other host network.

Specific details were given in the preceding description to provide a thorough understanding of some implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the implementations in unnecessary detail. In other instances, well-known circuits, processes, algorithms, structures, and techniques may be shown without unnecessary detail in order to avoid obscuring the implementations.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are finished, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can cause the computing device to temporarily or permanently store data. A network interface, such as a wireless or wired interface, can cause the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable data storage devices, optical data storage devices, and some other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The some examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The some illustrative logical blocks, modules, circuits, and algorithm steps described in connection with the implementations disclosed herein may be implemented as electronic hardware, computer software, firmware, or combinations thereof. To clearly illustrate this interchangeability of hardware and software, some illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended storage device update system.

What is claimed is:

1. A computer-implemented method executed by a proxy network in communication with a host network, comprising:

injecting one or more graphical elements into an object display provided through a proxy application executing on an instantiating source device, wherein the proxy application is in communication with the proxy network, wherein the object display corresponds to an object type, and wherein one or more graphical elements provide an indication that the object type qualifies for a suspended storage device update;

receiving a request to initiate the suspended storage device update, wherein the request includes an indication of the object type and a first subset of parameters from a set of parameters that define different objects associated with the object type, and wherein the request is received in response to selection of the one or more graphical elements;

identifying a set of object identifiers corresponding to a set of objects from the different objects, wherein the set of objects is associated with the object type and the first subset of parameters, and wherein the set of object identifiers is identified through a host storage device associated with the proxy network;

updating the object display to provide an object result corresponding to a representative numerical counter associated with the set of objects, wherein when the object result is displayed through the proxy application executing on the instantiating source device, the proxy application transfers the object result from a counter transfer source to the host network; and injecting one or more displays into a graphical user interface corresponding to the host network to initiate the suspended storage device update, wherein when the suspended storage device update is initiated, a terminating source device selects a second subset of parameters from the set of parameters through the one or more displays, and wherein the first subset of parameters and the second subset of parameters are used collectively to select a unique object from the set of objects for completion of the suspended storage device update.

2. The computer-implemented method of claim 1, further comprising:
transmitting the representative numerical counter and instantiation identification data corresponding to the instantiating source device through an application programming interface (API) associated with the host network, wherein when the host network receives the representative numerical counter and the instantiation identification data, the host network computes the object result.

3. The computer-implemented method of claim 1, wherein the representative numerical counter is generated by calculating an average numerical value from a set of numerical counters associated with the set of objects, and wherein the set of numerical counters is identified using the set of object identifiers.

4. The computer-implemented method of claim 1, wherein the representative numerical counter is generated based on a specific numerical counter corresponding to a specific object having a greater number of parameters in common with the first subset of parameters.

5. The computer-implemented method of claim 1, wherein:
the unique object is associated with an actual terminal result; and
the computer-implemented method further comprises transferring a difference between the actual terminal result and the object result to the host network.

6. The computer-implemented method of claim 1, wherein injecting the one or more displays to initiate the suspended storage device update further comprises:
generating an update identifier corresponding to the suspended storage device update; and
providing the update identifier, wherein when the update identifier is selected by the terminating source device, the terminating source device accesses the suspended storage device update to select the second subset of parameters.

7. The computer-implemented method of claim 1, further comprising:
obtaining terminator contact data corresponding to the terminating source device; and
providing the unique object according to the terminator contact data.

8. A proxy network system in communication with a host network, comprising:
one or more processors; and
memory storing thereon instructions that, as a result of being executed by the one or more processors, cause the proxy network system to:
inject one or more graphical elements into an object display provided through a proxy application executing on an instantiating source device, wherein the proxy application is in communication with a proxy network, wherein the object display corresponds to an object type, and wherein one or more graphical elements provide an indication that the object type qualifies for a suspended storage device update;
receive a request to initiate the suspended storage device update, wherein the request includes an indication of the object type and a first subset of parameters from a set of parameters that define different objects associated with the object type, and wherein the request is received in response to selection of the one or more graphical elements;
identify a set of object identifiers corresponding to a set of objects from the different objects, wherein the set of objects is associated with the object type and the first subset of parameters, and wherein the set of object identifiers is identified through a host storage device associated with the proxy network;
update the object display to provide an object result corresponding to a representative numerical counter associated with the set of objects, wherein when the object result is displayed through the proxy application executing on the instantiating source device, the proxy application transfers the object result from a counter transfer source to the host network; and
inject one or more displays into a graphical user interface corresponding to the host network to initiate the suspended storage device update, wherein when the suspended storage device update is initiated, a terminating source device selects a second subset of parameters from the set of parameters through the one or more displays, and wherein the first subset of parameters and the second subset of parameters are used collectively to select a unique object from the set of objects for completion of the suspended storage device update.

9. The proxy network system of claim 8, wherein the instructions further cause the proxy network system to:
transmit the representative numerical counter and instantiation identification data corresponding to the instantiating source device through an application programming interface (API) associated with the host network, wherein when the host network receives the representative numerical counter and the instantiation identification data, the host network computes the object result.

10. The proxy network system of claim 8, wherein the representative numerical counter is generated by calculating an average numerical value from a set of numerical counters associated with the set of objects, and wherein the set of numerical counters is identified using the set of object identifiers.

11. The proxy network system of claim 8, wherein the representative numerical counter is generated based on a specific numerical counter corresponding to a specific object having a greater number of parameters in common with the first subset of parameters.

12. The proxy network system of claim 8, wherein:
the unique object is associated with an actual terminal result; and
the instructions further cause the proxy network system to transfer a difference between the actual terminal result and the object result to the host network.

13. The proxy network system of claim 8, wherein the instructions that cause the proxy network system to inject the one or more displays to initiate the suspended storage device update further cause the proxy network system to:
generate an update identifier corresponding to the suspended storage device update; and
provide the update identifier, wherein when the update identifier is selected by the terminating source device, the terminating source device accesses the suspended storage device update to select the second subset of parameters.

14. The proxy network system of claim 8, wherein the instructions further cause the proxy network system to:

obtain terminator contact data corresponding to the terminating source device; and provide the unique object according to the terminator contact data.

15. A non-transitory, computer-readable storage medium storing thereon executable instructions that, as a result of being executed by one or more processors of a proxy network system in communication with a host network, cause the proxy network system to:

inject one or more graphical elements into an object display provided through a proxy application executing on an instantiating source device, wherein the proxy application is in communication with a proxy network, wherein the object display corresponds to an object type, and wherein one or more graphical elements provide an indication that the object type qualifies for a suspended storage device update;

receive a request to initiate the suspended storage device update, wherein the request includes an indication of the object type and a first subset of parameters from a set of parameters that define different objects associated with the object type, and wherein the request is received in response to selection of the one or more graphical elements;

identify a set of object identifiers corresponding to a set of objects from the different objects, wherein the set of objects is associated with the object type and the first subset of parameters, and wherein the set of object identifiers is identified through a host storage device associated with the proxy network;

update the object display to provide an object result corresponding to a representative numerical counter associated with the set of objects, wherein when the object result is displayed through the proxy application executing on the instantiating source device, the proxy application transfers the object result from a counter transfer source to the host network; and inject one or more displays into a graphical user interface corresponding to the host network to initiate the suspended storage device update, wherein when the suspended storage device update is initiated, a terminating source device selects a second subset of parameters from the set of parameters through the one or more displays, and wherein the first subset of parameters and the second subset of parameters are used collectively to select a unique object from the set of objects for completion of the suspended storage device update.

16. The non-transitory, computer-readable storage medium of claim 15, wherein the executable instructions further cause the proxy network system to:

transmit the representative numerical counter and instantiation identification data corresponding to the instantiating source device through an application programming interface (API) associated with the host network, wherein when the host network receives the representative numerical counter and the instantiation identification data, the host network computes the object result.

17. The non-transitory, computer-readable storage medium of claim 15, wherein the representative numerical counter is generated by calculating an average numerical value from a set of numerical counters associated with the set of objects, and wherein the set of numerical counters is identified using the set of object identifiers.

18. The non-transitory, computer-readable storage medium of claim 15, wherein the representative numerical counter is generated based on a specific numerical counter corresponding to a specific object having a greater number of parameters in common with the first subset of parameters.

19. The non-transitory, computer-readable storage medium of claim 15, wherein:

the unique object is associated with an actual terminal result; and the executable instructions further cause the proxy network system to transfer a difference between the actual terminal result and the object result to the host network.

20. The non-transitory, computer-readable storage medium of claim 15, wherein the executable instructions that cause the proxy network system to inject the one or more displays to initiate the suspended storage device update further cause the proxy network system to:

generate an update identifier corresponding to the suspended storage device update; and provide the update identifier, wherein when the update identifier is selected by the terminating source device, the terminating source device accesses the suspended storage device update to select the second subset of parameters.

21. The non-transitory, computer-readable storage medium of claim 15, wherein the executable instructions further cause the proxy network system to:

obtain terminator contact data corresponding to the terminating source device; and provide the unique object according to the terminator contact data.

* * * * *